(12) United States Patent
Phani et al.

(10) Patent No.: US 12,560,626 B2
(45) Date of Patent: Feb. 24, 2026

(54) TRANSITIONAL TAPPING ATOMIC FORCE MICROSCOPY FOR HIGH-RESOLUTION IMAGING

(71) Applicant: UTI LIMITED PARTNERSHIP, Calgary (CA)

(72) Inventors: Arindam Phani, Calgary (CA); Seonghwan Kim, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 341 days.

(21) Appl. No.: 18/282,136

(22) PCT Filed: Mar. 15, 2022

(86) PCT No.: PCT/CA2022/050383
§ 371 (c)(1),
(2) Date: Sep. 14, 2023

(87) PCT Pub. No.: WO2022/193001
PCT Pub. Date: Sep. 22, 2022

(65) Prior Publication Data
US 2024/0151742 A1 May 9, 2024

Related U.S. Application Data

(60) Provisional application No. 63/161,145, filed on Mar. 15, 2021.

(51) Int. Cl.
*G01Q 60/34* (2010.01)
*G01Q 30/04* (2010.01)

(52) U.S. Cl.
CPC ............. *G01Q 60/34* (2013.01); *G01Q 30/04* (2013.01)

(58) Field of Classification Search
CPC .............................. G01Q 60/34; G01Q 30/04
See application file for complete search history.

(56) References Cited

U.S. PATENT DOCUMENTS

| | | | |
|---|---|---|---|
| 5,412,980 A | 5/1995 | Elings et al. | |
| 2009/0222958 A1* | 9/2009 | Su | G01Q 60/366 850/33 |
| 2017/0199219 A1 | 7/2017 | Zou et al. | |
| 2020/0041541 A1* | 2/2020 | Osechinskiy | G01Q 10/04 |

FOREIGN PATENT DOCUMENTS

| | | |
|---|---|---|
| KR | 20180077307 A | 7/2018 |
| WO | 2012078415 A2 | 6/2012 |

OTHER PUBLICATIONS

Paulo et al., "Tip-surface Forces, Amplitude, and Energy Dissipation in Amplitude-modulation (Tapping Mode) Force Microscopy," Physical Review, 2001, vol. 64 (19), pp. 1-4.
Pethica et al., "Tip Surface Interactions in STM and AFM," Physica Scripta, 1987, vol. T19, pp. 61-66.
Phani et al., "Role of Dissipation in Resonance: a Variational Principle Approach," University of Alberta, 2017, 191 pages.
Rani et al., "Formulation Development and in-vitro Evaluation of Minoxidil Bearing Glycerosomes," American Journal of Biomedical Research, 2016, vol. 4 (2), pp. 27-37.

(Continued)

*Primary Examiner* — Nicole M Ippolito

(57) ABSTRACT

An atomic force microscopy transitional tapping method for surface imaging.

20 Claims, 34 Drawing Sheets

(56)　　　　　References Cited

OTHER PUBLICATIONS

Sader et al., "Quantitative Force Measurements Using Frequency Modulation Atomic Force Microscopy-theoretical Foundations," Nanotechnology, 2005, vol. 16 (3), pp. S94-S101.

Santos et al., "Quantifying Dissipative Contributions in Nanoscale Interactions," Nanoscale, 2012, vol. 4 (3), pp. 792-800.

Sato et al., "On the Relation Between Fluctuation and Response in Biological Systems," Proceedings of the National Academy of Sciences, 2003, vol. 100 (24), pp. 14086-14090.

Schryvers. D., "Scanning Force Microscopy," Materials Research Bulletin, 1996, vol. 31 (6), pp. 759.

Shuttleworth R., "The Surface Tension of Solids," Proceedings of the Physical Society, 1950, vol. 63 (5), pp. 444-457.

Sollich et al., "Rheology of Soft Glassy Materials," Physical Review Letters, 2020, vol. 78 (10), 4 pages.

Sollich. P., "Rheological Constitutive Equation for a Model of Soft Glassy Materials," Physical Review, 1998, vol. 58 (1), pp. 738-759.

Stark et al., "From Images to Interactions: High-resolution Phase Imaging in Tapping-mode Atomic Force Microscopy," Biophysical Journal, 2001, vol. 80 (6), pp. 3009-3018.

Tai et al., "Nanoscale Heterogeneity Promotes Energy Dissipation in Bone," Nature Materials, 2007, vol. 6, pp. 454-462.

Tamayo et al., "Deformation, Contact Time, and Phase Contrast in Tapping Mode Scanning Force Microscopy," Langmuir, 1996, vol. 12, pp. 4430-4435.

Tamayo et al., "Relationship Between Phase Shift and Energy Dissipation in Tapping-mode Scanning Force Microscopy," Applied Physics Letters, 1998, vol. 73, pp. 2926-2928.

Thoren et al., "Imaging High-speed Friction at the Nanometer Scale," Nature Communications, 2016, vol. 11 (12), pp. 1032-1037.

Thundat et al., "Stretched Dna Structures Observed With Atomic Force Microscopy," Nucleic Acids Research, 1994, vol. 22 (20), pp. 1-5.

Warren et al., "Responsive and Nonequilibrium Nanomaterials," The Journal of Physical Chemistry Letters, 2012, vol. 3 (15), pp. 2103-2111.

Zhu et al., "Cell Mechanics: Mechanical Response, Cell Adhesion, and Molecular Deformation," Annual Review of Biomedical Engineering, 2000, vol. 2 (1), pp. 189-226.

Zitzler et al., "Capillary Forces in Tapping Mode Atomic Force Microscopy," Physical Review, 2002, vol. B 66, pp. 1-8.

Atalaya et al., "Diffusion-Induced Bistability of Driven Nanomechanical Resonators," Physical Review Letters, 2011, vol. 106 (22), pp. 1-4.

Battle et al., "Broken Detailed Balance at Mesoscopic Scales in Active Biological Systems," Science, 2016, vol. 352 (6285), pp. 604-607.

Best et al., "Force Mode Atomic Force Microscopy as a Tool for Protein Folding Studies," Analytica Chimica Acta, 2003, vol. 479 (1), pp. 87-105.

Biggio et al., Transient Dynamics of an Adiabatic NEMS, Annals of Physics, 2014, vol. 526 (11-12), pp. 541-554.

Bilalis et al., "PH-sensitive Nanogates Based on Poly(L-histidine) for Controlled Drug Release From Mesoporous Silica Nanoparticles," Polymer Chemistry, 2016, vol. 7 (7), pp. 1-29.

Binnig et al., "Atomic Force Microscope," Physical Review Letters, 1986, vol. 56 (9), pp. 930-933.

Brandsch et al., "On the Factors Affecting the Contrast of Height and Phase Images in Tapping Mode Atomic Force Microscopy," Langmuir, 1997, vol. 13, pp. 6349-6353.

Brangwynne et al., "Cytoplasmic Diffusion: Molecular Motors Mix It Up," Journal of Cell Biology, 2008, vol. 183 (4), pp. 583-587.

Bustamante, C., "Unfolding Single RNA Molecules: Bridging the Gap Between Equilibrium and Non-equilibrium Statistical Thermodynamics," Quarterly Reviews of Biophysics, 2005, vol. 38 (4), pp. 291-301.

Bustamante et al., "The Nonequilibrium Thermodynamics of Small Systems," Physics Today, 2005, vol. 58 (7), pp. 43-48.

Cleveland et al., "Energy Dissipation in Tapping-mode Atomic Force Microscopy," Applied Physics Letters, 1998, vol. 72 (20) , pp. 2613-2615.

Dai et al., "Doxorubicin Conjugated Nayf4:yb3+/tm3+ Nanoparticles for Therapy and Sensing of Drug Delivery by Luminescence Resonance Energy Transfer," Biomaterials, 2012, vol. 33 (33), pp. 8704-8713.

Deng et al., "Adhesion-dependent Negative Friction Coefficient on Chemically Modified Graphite at the Nanoscale," Nature Materials, 2012, vol. 11, pp. 1032-1037.

Estrada et al., "High Strain-rate Soft Material Characterization via Inertial Cavitation," Journal of the Mechanics and Physics of Solids, Journal of the Mechanics and Physics of Solids, 2018, vol. 112, pp. 291-317.

Farrell et al., "Conservative and Dissipative Force Imaging of Switchable Rotaxanes With Frequency-modulation Atomic Force Microscopy," Physical Review, 2005, vol. B 72, pp. 1-6.

Gadelrab et al., "Heterogeneous Dissipation and Size Dependencies of Dissipative Processes in Nanoscale Interactions," Langmuir, 2013, vol. 29 (7), pp. 2200-2206.

Ganassin et al., "Nanocapsules for the Co-delivery of Selol and Doxorubicin to Breast Adenocarcinoma 4t1 Cells in Vitro," Artificial Cells, Nanomedicine and Biotechnology, 2017, pp. 1-12.

Garcia et al., "Identification of Nanoscale Dissipation Processes by Dynamic Atomic Force Microscopy," Physical Review, 2006, vol. 97 (1), pp. 1-4.

Garcia et al., "Nanoscale Compositional Mapping With Gentle Forces," Nature Materials, 2007, vol. 6, pp. 405-411.

Garcia. R "Nanomechanical Mapping of Soft Materials With the Atomic Force Microscope: Methods, Theory and Applications," Chemical Society Reviews, 2020, vol. 49, pp. 1-45.

Gauthier et al., "Damping Mechanism in Dynamic Force Microscopy," Physical Review, 2000, vol. 85 (25), pp. 5348-5351.

Giessibl "Advances in Atomic Force Microscopy," Reviews of Modern Physics, 2003, vol. 75, pp. 949-983.

Giessibl F., "Atomic Resolution of the Silicon (111)–(7×7) Surface by Atomic Force Microscopy," Science, 1995, vol. 267 (5194), pp. 68-71.

Greving et al., "Shear-induced Self-assembly of Native Silk Proteins Into Fibrils Studied by Atomic Force Microscopy," Biomacromolecules, 2012, vol. 13 (3), pp. 676-682.

Groot et al., "The Stationary State," Chapter 4, pp. 42-57.

Gross et al., "The Chemical Structure of a Molecule Resolved by Atomic Force Microscopy," Science, 2009, vol. 325 (5944), pp. 1110-1114.

Grzybowski et al., "Self-assembly: From Crystals to Cells," Soft Matter, 2009, vol. 5 (6), pp. 1110-1128.

Hedgeland et al., "Measurement of Single-molecule Frictional Dissipation in a Prototypical Nanoscale System," Nature Physics, 2009, vol. 5 (8), pp. 561-564.

Hoffmann et al., "Energy Dissipation in Atomic Force Microscopy and Atomic Loss Processes," Physical Review Letters, 2001, vol. 87 (26), pp. 1-4.

International Patent Application No. PCT/CA2022/050383 International Preliminary Report on Patentability, dated Sep. 28, 2023.

International Patent Application No. PCT/CA2022/050383 International Search Report and Written Opinion dated Jun. 15, 2022.

John et al., "Calibration of rectangular atomic force microscope cantilevers," Review of Scientific Instruments, 1999, vol. 70(10), pp. 3967-3969.

Kawai et al., "Atomic-scale Dissipation Processes in Dynamic Force Spectroscopy," Physical Review, 2011, vol. 84, pp. 1-9.

Kim et al., "High-fidelity Probing of the Structure and Heterogeneity of Extracellular Vesicles by Resonance-enhanced Atomic Force Microscopy Infrared Spectroscopy," Nature Protocols, 2019, vol. 14, pp. 1-20.

Krieg, et al., "Atomic Force Microscopy-based Mechanobiology," Nature Reviews Physics, 2019, vol. 41-57, pp. 41-57.

Labuda et al., "Decoupling Conservative and Dissipative Forces in Frequency Modulation Atomic Force Microscopy," Physical Review, 2011, vol. B 84, pp. 1-11.

Landau et al., "Statistical Physics," Institute of Physical Problems, vol. 5, pp. 497.

Lavenda, "Mean Entropies," arXiv, 2008, pp. 1-6.

(56)          References Cited

OTHER PUBLICATIONS

Lemus E., "Nonequilibrium Thermodynamics of Cell Signaling," Journal of Thermodynamics vol. 2012, pp. 1-10.

Liu et al., "Characterization of Nanoscale Mechanical Heterogeneity in a Metallic Glass by Dynamic Force Microscopy," Physical Review Letters, 2011, vol. 106, pp. 1-4.

Liu et al., "Graphene and Graphene Oxide as New Nanocarriers for Drug Delivery Applications," Acta Biomaterialia, 2013, vol. 12 (9), pp. 9243-9257.

Liu et al., "Mechanical Properties of Graphene Oxides," Nanoscale, 2012, vol. 4 (19), pp. 5910-5916.

Magonov et al., "Phase Imaging and Stiffness in Tapping-mode Atomic Force Microscopy," Surface Science, 1997, vol. 375, pp. L385-L391.

Martin, et al., "Atomic Force Microscope-force Mapping and Profiling on a Sub 100-A Scale," Journal of Applied Physics, 1987, vol. 61, pp. 4723-4729.

Martinez et al., "Molecular Scale Energy Dissipation in Oligothiophene Monolayers Measured by Dynamic Force Microscopy," Nanotechnology, 2009, vol. 20 (43), pp. 1-6.

Martin-Jimenez et al., "Bond-level Imaging of the 3d Conformation of Adsorbed Organic Molecules Using Atomic Force Microscopy With Simultaneous Tunneling Feedback," Physical Review Letters, 2019, vol. 122, pp. 1-6.

Mathurin et al., "How to Unravel the Chemical Structure and Component Localization of Individual Drug-loaded Polymeric Nanoparticles by Using Tapping AFM-IR," Analyst, 2018, vol. 143, pp. 5940-5949.

Mccallion et al., "Graphene in Therapeutics Delivery: Problems, Solutions and Future Opportunities," European Journal of Pharmaceutics and Biopharmaceutics, 2016, vol. 104, pp. 235-250.

Muthu et al., "Scaled Quantum Chemical Studies of the Molecular Structure and Vibrational Spectra of Minoxidil," Spectroscopy Letters, 2014, vol. 48 (1), pp. 63-73.

Ollila et al., "Rotational Dynamics of Proteins From Spin Relaxation Times and Molecular Dynamics Simulations," The Journal of Physical Chemistry B, 2018, vol. 122 (25), 35 pages.

* cited by examiner

(a)    DxO@mGO

TRANSITIONAL TAPPING ATOMIC FORCE MICROSCOPY FOR HIGH-RESOLUTION IMAGING

CROSS REFERENCE TO RELATED APPLICATION

This application claims priority to U.S. Provisional Patent Application No. 63/161,145, filed Mar. 15, 2021, the entire contents of which is hereby incorporated by reference.

FIELD

The present disclosure relates generally to operational modes of atomic force microscopy. More particularly, the present disclosure relates to transitional tapping atomic force microscopy for high-resolution imaging.

BACKGROUND

Since inception atomic force microscopy (AFM) has emerged as a key nanoscale surface metrology tool for scientists and engineers alike. Tapping Mode AFM (TM-AFM) deserves special mention in this regard for its ability to nondestructively characterize soft bio-interfaces at the nanoscale. In recent years it has found renewed popularity in the study of non-equilibrium (NE) energetics of protein and DNA/RNA folding landscapes. NE energy routes underpin fundamental bio-physical mechanisms like cell migration, cell signaling, tissue—self-repair, damage evolution and toughening, among others. An apparent homogeneous surface locally deviates off equilibrium to new metastable states and eventually restores back via NE dissipative routes. Fluctuations mediate this thermodynamic cost. These are important to the evolution of mechano-biological functions that closely imitate soft glassy dynamics yielding to viscous relaxations at nanoscale heterogeneities.

New knowledge in macroscopic and biological phenomena from nanoscale and molecular heterogeneity perspectives has emerged. Yet, the predictability of NE pathways in biology is still at its infancy. This is because of the general lack of understanding of the role of heterogeneities in NE dissipative pathways. Novel methods that can connect local fluctuations at heterogeneities to energy losses are thus becoming more general and broader to elucidate new insights on such mechanisms.

SUMMARY

Phase-contrast in tapping mode AFM (TM-AFM) results from dynamic tip-surface interaction losses which are constitutive in distinguishing soft and hard features at the nanoscale. Generally, phase-contrast has been explained via equilibrium/steady-state losses that essentially entail homogeneous Boltzmann-like distributions. Described herein, the origins of phase-contrast were revisited with ultra-light tapping (A<3 nm), A being the tapping amplitude, and a surprising two-stage distribution response was found. Said two-stage distribution response was explained by considering fluctuational transitions. This allowed decoupling of a heterogeneous loss component, which alluded to metastable viscous relaxations that originated from surface perturbations during the small amplitude tapping operation. The ultra-small amplitude operation recorded information of the metastable relaxations, since the tip and surface were in continuous interaction during its complete oscillation cycle. Elastic and viscous coefficients were also quantitatively estimated against the resulting strain rate from surface deformations at the fixed tapping frequency. Interestingly, the transitional heterogeneous losses emerged as the dominant loss mechanism, outweighing homogeneous losses for a soft-material. Analogous fluctuation mediated phase-contrast was also apparent in contact resonance enhanced AFM-infrared (IR), showing promise in decoupling competing thermal loss mechanisms via radiative and non-radiative pathways. Such fluctuational phase-contrast may provide new insights on the bio-physical origins of heterogeneities in soft-bio-matter e.g., single cancer cell, tumors, and soft-tissues.

In an aspect of the present disclosure, there is provided an atomic force microscopy tapping method for imaging a surface of a sample, the method comprising, the method comprising: determining and setting a free amplitude ($A_0$) of a cantilever of an atomic force microscope (AFM); determining and setting an operational tapping amplitude (A) of the cantilever based on the free amplitude ($A_0$); initializing and setting a steady-state timescale ($\tau_c$) of the cantilever interacting with the surface of the sample to be imaged; determining an average deformation amplitude ($\Delta a$) relative to the operational tapping amplitude (A), the average deformation amplitude ($\Delta a$) resulting from the cantilever tapping and deforming the surface of the sample; optimizing the steady-state timescale ($\tau_c$) to correspond with a relaxation timescale ($\tau_{surf}$) of the surface following deformation by the cantilever by setting the condition of reaching the set operational tapping amplitude (A) when the average deformation amplitude ($\Delta a$)≠0; scanning the surface of the sample by tapping the surface with the cantilever; and collecting imaging parameters for generating an image of the surface.

In an embodiment of the present disclosure, there is provided a method wherein determining and setting a free amplitude ($A_0$) comprises: generating a deflection vs. displacement curve from the cantilever tip interacting with the surface of the sample; and determining a cantilever tip-surface distance ($z_c$) from the deflection vs. displacement curve.

In another embodiment, there is provided a method wherein determining and setting an operational tapping amplitude (A) comprises: enforcing a setpoint amplitude ($A_{sp}$) by setting a setpoint ratio (SPR) having a value between 0 to 1.

In another embodiment, there is provided a method wherein initializing and setting a steady-state timescale ($\tau_c$) comprises: setting initial proportional gain (P) and integral gain (I) values of a PI controller of the AFM.

In another embodiment, there is provided a method initializing and setting a steady-state timescale ($\tau_c$) comprises: syncing the timescale ($\tau_c$) with stochastic resonance dynamics of the cantilever for measuring relaxation mechanisms of the surface following deformation by the cantilever.

In another embodiment, there is provided a method wherein optimizing the steady-state timescale ($\tau_c$) comprises: decreasing by about 1% an initial proportional gain (P) value of a PI controller of the AFM, and increasing by about 1% an initial integral gain (I) value of a PI controller of the AFM.

In another embodiment, there is provided a method wherein collecting imaging parameters comprises: collecting any one or more of the imaging parameter deflection, amplitude, phase, or frequency under optimized tapping conditions.

In another embodiment, there is provided a method wherein the free amplitude ($A_0$) is set at about 10 nm or <10 nm.

In another embodiment, there is provided a method wherein the operational tapping amplitude (A) is set at about 1 to about 3 nm; is set at and restricted to about 1 nm to 3 nm; or <3 nm.

In another embodiment, there is provided a method wherein the surface of the sample comprises soft-matter that exhibits viscoelasticity.

In another embodiment, there is provided a method wherein the surface of the sample comprises a drug, a drug cluster, a cancer cell, or a cluster of cancer cells to be imaged.

In another embodiment, there is provided a method wherein the atomic force microscopy tapping method is an ultra-light tapping method.

In another embodiment, there is provided a method wherein the atomic force microscopy tapping method comprises an ultra-light tapping method.

In another embodiment, there is provided a method wherein the atomic force microscopy tapping method is a transitional tapping method.

In another aspect of the present disclosure, there is provided a use of the method described herein for imaging a surface of a sample by AFM-IR. In an embodiment, there is provided a use of the method described herein for imaging a surface of a sample by AFM-IR for chemical species and/or chemical bond identification.

In another aspect of the present disclosure, there is provided a use of the method described herein for imaging a drug or a drug cluster, on a surface of a sample.

In another aspect of the present disclosure, there is provided a use of the method described herein for imaging biological soft-matter on a surface of a sample.

In another aspect of the present disclosure, there is provided a use of the method described herein for imaging cancer cells on a surface of a sample.

In another aspect of the present disclosure, there is provided a computer program product comprising a computer readable memory storing computer executable instructions thereon that when executed by a computer to perform the method steps described herein.

In another aspect of the present disclosure, there is provided a computer readable medium having recorded thereon statements and instructions for execution by a computerised atomic force microscope to carry out the method described herein.

In another aspect of the present disclosure, there is provided a computer-implemented method of imaging a surface of a sample via atomic force microscopy, comprising: performing the tapping method described herein on a computerized atomic force microscope; receiving data from the computerized atomic force microscope; processing the data on a computer; optimizing the tapping method on the basis of the processed data; receiving imaging parameters from the computerized atomic force microscope performing the optimized tapping method; processing the imaging parameters on a computer; and displaying images of the surface of the sample.

In another embodiment of the present disclosure, there is provided a method wherein processing the data on a computer comprises using at least one algorithm.

In another embodiment, there is provided a method wherein the at least one algorithm comprises an optimizing algorithm for optimizing proportional gain (P) and integral gain (I) under a condition of $A+\Delta a \cong A_0 - A_{sp}$ and $\Delta a \neq 0$.

In another aspect of the present disclosure, there is provided a system for imaging a surface of a sample via atomic force microscopy, comprising: an atomic force microscope comprising a cantilever configured for tapping the surface of the sample; a module configured for receiving data from the cantilever when tapping the surface of the sample; a processor configured for applying an algorithm to the data received from the cantilever and instructing the atomic force microscope to perform the tapping method steps described herein; a module configured for receiving imaging parameters acquired from the atomic force microscope performing the tapping method; a processor configured for applying an algorithm to the imaging parameters for generating images of the surface of the sample; and a display configured to present the images of the surface of the sample.

BRIEF DESCRIPTION OF THE FIGURES

Embodiments of the present disclosure will now be described, by way of example only, with reference to the attached Figures.

DETAILED DESCRIPTION

Definitions

Figure 1:
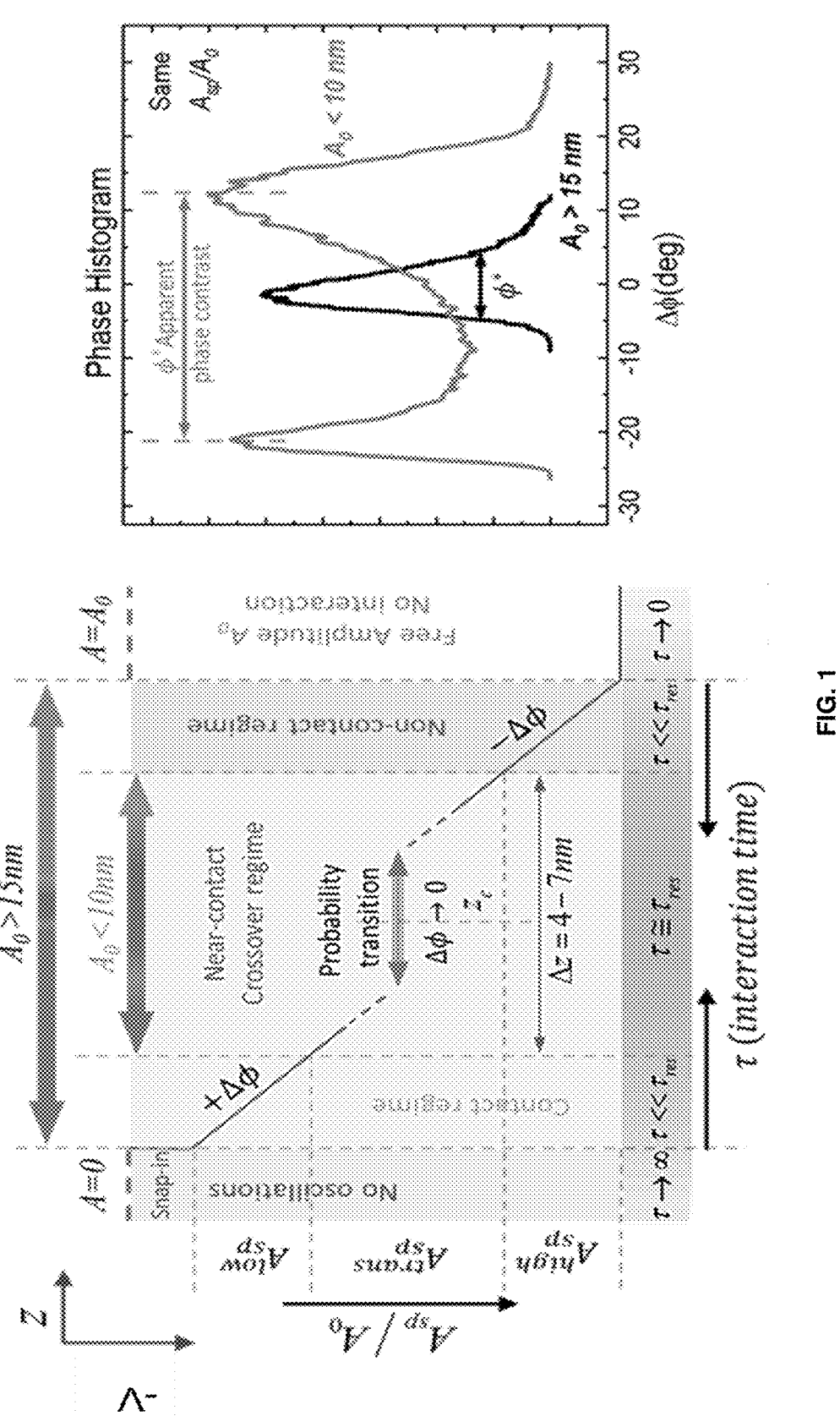
FIG. 1 depicts exploitation of fluctuations in the near-contact crossover regime at tip-surface separations $z_c=2.5$-3.5 nm with ultra-light tapping (A<3 nm). The dynamic response of interaction with soft drug clusters lead to a two-stage distribution in phase giving an apparent phase-contrast.
Figure 1:
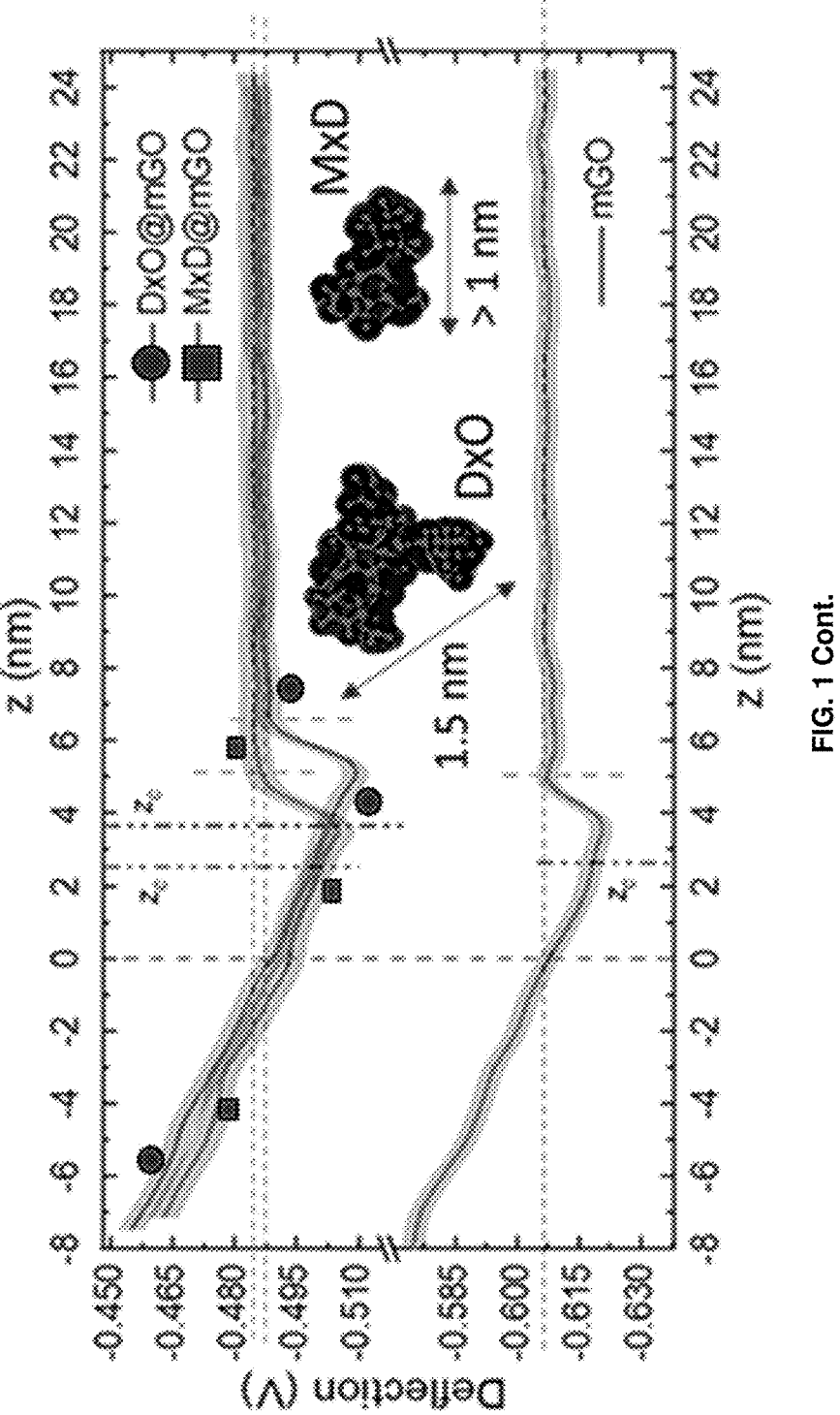

Unless defined otherwise, all technical and scientific terms used herein have the same meaning as commonly understood by one of ordinary skill in the art to which this present disclosure belongs.

As used in the specification and claims, the singular forms "a", "an" and "the" include plural references unless the context clearly dictates otherwise.

The term "comprising" as used herein will be understood to mean that the list following is non-exhaustive and may or may not include any other additional suitable items, for example one or more further feature(s), component(s) and/or ingredient(s) as appropriate.

Generally, the present disclosure provides an atomic force microscopy tapping method for imaging a surface of a sample, the method comprising: determining and setting a free amplitude ($A_0$) of a cantilever of an atomic force microscope (AFM); determining and setting an operational tapping amplitude (A) of the cantilever based on the free amplitude ($A_0$); initializing and setting a steady-state timescale ($\tau_c$) of the cantilever interacting with the surface of the sample to be imaged; determining an average deformation amplitude (Δa) relative to the operational tapping amplitude (A), the average deformation amplitude (Δa) resulting from the cantilever tapping and deforming the surface of the sample; optimizing the steady-state timescale ($\tau_c$) to correspond with a relaxation timescale ($\tau_{surf}$) of the surface following deformation by the cantilever by setting the condition of reaching the set operational tapping amplitude (A) when the average deformation amplitude (Δa)≠0; scanning the surface of the sample by tapping the surface with the cantilever; and collecting imaging parameters for generating an image of the surface.

In an example of the present disclosure, there is provided a method wherein determining and setting a free amplitude ($A_0$) comprises: generating a deflection vs. displacement curve from the cantilever tip interacting with the surface of the sample; and determining a cantilever tip-surface distance ($z_c$) from the deflection vs. displacement curve.

In another example, there is provided a method wherein determining and setting an operational tapping amplitude (A) comprises: enforcing a setpoint amplitude ($A_{sp}$) by setting a setpoint ratio (SPR) having a value between 0 to 1.

In another example, there is provided a method wherein initializing and setting a steady-state timescale ($\tau_c$) comprises: setting initial proportional gain (P) and integral gain (I) values of a PI controller of the AFM.

In another example, there is provided a method initializing and setting a steady-state timescale ($\tau_c$) comprises: syncing the timescale ($\tau_c$) with stochastic resonance dynamics of the cantilever for measuring relaxation mechanisms of the surface following deformation by the cantilever.

In another example, there is provided a method wherein optimizing the steady-state timescale ($\tau_c$) comprises: decreasing by about 1% an initial proportional gain (P) value of a PI controller of the AFM, and increasing by about 1% an initial integral gain (I) value of a PI controller of the AFM.

In another example, there is provided a method wherein collecting imaging parameters comprises: collecting any one or more of the imaging parameter deflection, amplitude, phase, or frequency under optimized tapping conditions.

In another example, there is provided a method wherein the free amplitude ($A_0$) is set at about 10 nm or <10 nm.

In another example, there is provided a method wherein the operational tapping amplitude (A) is set at about 1 to about 3 nm; is set at and restricted to about 1 nm to 3 nm; or <3 nm.

In another example, there is provided a method wherein the surface of the sample comprises soft-matter that exhibits viscoelasticity.

In another example, there is provided a method wherein the surface of the sample comprises a drug, a drug cluster, a cancer cell, or a cluster of cancer cells to be imaged.

In another example, there is provided a method wherein the atomic force microscopy tapping method is an ultra-light tapping method.

In another example, there is provided a method wherein the atomic force microscopy tapping method comprises an ultra-light tapping method.

In another example, there is provided a method wherein the atomic force microscopy tapping method is a transitional tapping method.

In another example of the present disclosure, there is provided a use of the method described herein for imaging a surface of a sample by AFM-IR. In an example, there is provided a use of the method described herein for imaging a surface of a sample by AFM-IR for chemical species and/or chemical bond identification.

In another example of the present disclosure, there is provided a use of the method described herein for imaging a drug or a drug cluster, on a surface of a sample.

In another example of the present disclosure, there is provided a use of the method described herein for imaging biological soft-matter on a surface of a sample.

In another example of the present disclosure, there is provided a use of the method described herein for imaging cancer cells on a surface of a sample.

In another example of the present disclosure, there is provided a computer program product comprising a computer readable memory storing computer executable instructions thereon that when executed by a computer to perform the method steps described herein.

In another example of the present disclosure, there is provided a computer readable medium having recorded thereon statements and instructions for execution by a computerised atomic force microscope to carry out the method described herein.

In another example of the present disclosure, there is provided a computer-implemented method of imaging a surface of a sample via atomic force microscopy, comprising: performing the tapping method described herein on a computerized atomic force microscope; receiving data from the computerized atomic force microscope; processing the data on a computer; optimizing the tapping method on the basis of the processed data; receiving imaging parameters from the computerized atomic force microscope performing the optimized tapping method; processing the imaging parameters on a computer; and displaying images of the surface of the sample.

In another example of the present disclosure, there is provided a method wherein processing the data on a computer comprises using at least one algorithm.

In another example, there is provided a method wherein the at least one algorithm comprises an optimizing algorithm for optimizing proportional gain (P) and integral gain (I) under a condition of $A \pm \Delta \Delta a \cong A_0 - A_{sp}$ and $\Delta a \neq 0$.

In another example of the present disclosure, there is provided a system for imaging a surface of a sample via atomic force microscopy, comprising: an atomic force microscope comprising a cantilever configured for tapping the surface of the sample; a module configured for receiving data from the cantilever when tapping the surface of the sample; a processor configured for applying an algorithm to the data received from the cantilever and instructing the atomic force microscope to perform the tapping method steps described herein; a module configured for receiving imaging parameters acquired from the atomic force microscope performing the tapping method; a processor configured for applying an algorithm to the imaging parameters for generating images of the surface of the sample; and a display configured to present the images of the surface of the sample.

Tapping Mode—Atomic Force Microscopy (TM-AFM)

TM-AFM with microcantilevers which have tapping frequencies in the order of $\sim 10^2$ kHz is a unique platform to study such intricate energetics in soft-bio-matter at the nanoscale. Typically, non-destructive bio-TM-AFM has been executed at large tip-surface separations with high amplitude tapping ensuring that the tip-surface interaction potentials remain predominantly conservative. Yet, losses originate from inelastic interactions and reflect as a phase-contrast. These constitute loss contributions that are intrinsic to the cantilever and from tip-surface interactions, including the hysteretic losses from indentations that cannot be decoupled. This is because the tip is invariably exposed to non-conservative interaction potentials every cycle on tip-approach, even if for a fraction of its oscillation-period. The conservative interactions typically overshadow the non-conservative effects at large oscillation amplitudes since a greater percentage of cantilever motion occur at large separations. However, at small separations, non-conservative or inelastic effects dominate which are of particular interest from a bio-physical perspective, since they carry the signatures of the NE loss pathways.

Deconvoluting the non-conservative loss mechanisms is thus needed to gain new insights on the role of nanoscale heterogeneities, and for that herein the origins of phase-contrast are revisited. Ultra-light tapping was used at near-contact separations. This exploits the fact that surfaces begin to deform even without indentation at small separations. The very nature of such induced deformation introduces two possibilities depending on the material's relaxation characteristics at the tapping perturbation rate. If the perturbation rate is high enough, the surface deformations would exhibit inelastic viscous relaxations manifesting over multiple-length and timescales adopting NE dissipative routes. Interrogating such non-conservative losses without indentation may prove invaluable in deciphering the signature of multiscale NE relaxation mechanisms, which in essence are constitutive to complex biophysical mechanisms that relentlessly compete over local fluctuations in a bio-evolutionary processes. E.g., at room temperature single biomolecule dissipates energy at the rate of $10^{-20} - 10^{-19}$ J/s, competing over thermal fluctuations that are in the order of $\sim 10^{-20}$ J/s, to maintain equilibrium. Herein fluctuational dynamics of an interrogating microcantilever of the same order is exploited to deconvolute this dissipative component at the tip-surface junction.

TM-AFM's operation typically relies on 1 pN-100 nN forces that manifest at a tip-surface junction in the limit where constitutive continuum laws break-down and nanoscale effects takeover. Complex multiscale energy interplay takes predominance linking molecular (or atomic scale) forces at the tip to macroscale cantilever dynamics. The dynamics capture surface deformation modalities as topography, amplitude, and phase-contrast images through raster scans that forms the backbone of any TM-AFM study. At each oscillation cycle the tip experiences a gradient of forces with loss of energy. The oscillation amplitude decreases linearly starting with negligible interaction (mostly fluid media loss) when the tip is furthest from the surface→long-range attractive force (non-contact regime)→repulsive forces (contact regime) (FIG. 1). The reverse happens in the retraction cycle. The energy losses in the repulsive and attractive regimes have been explained to appear as a phase-change (A) in the cantilever dynamics with respect to the external drive. $\Delta \phi$ essentially displays compositional contrast of the heterogeneous boundaries. By convention, the repulsive and attractive regimes are characterized by positive $(+\Delta \phi)$ and negative $(-\Delta \phi)$ phase shifts respectively arising from the energy dissipated, $E_{dis}$, during tip-surface interactions as $$E_{dis} = \frac{\pi k A_0 A}{Q} \left[ \sin(\Delta \phi) - \frac{A}{A_0} \right]. \qquad (1)$$

$E_{dis}$ presents an accurate approximation of the net dissipated energy when the free amplitude quality factor $$Q = \frac{\omega_0}{2\Gamma}$$

is relatively high $\sim 100-1000$ (oscillation decay rate $\Gamma$ widely separated from resonance frequency of the AFM cantilever $\omega_0$), and the damped tapping amplitude $A = A_0 ' A_{sp}$ is sufficiently large $>15$ nm ensuring that the tip-motion accesses the contact regime every cycle (FIG. 1). Here k is the spring constant with $A_0$ the free amplitude set by tuning and $A_{sp}$ the operational amplitude setpoint in nanometers, both calibrated from volt units (V) from the AFM's optical deflection measurements. True atomic and bond-level resolutions have been demonstrated exploiting large-amplitude techniques relying on dynamic tip-surface interactions. However, the steady state dissipation approximation of equation (1) necessarily rests on the assumption of a constant Q even on intermittent contact at large A. In addition, for large A, the effective tip-surface interaction time is a fraction of the cantilever oscillation time-period (FIG. 1). Thus, in principle, a soft-surface gets enough time to relax to its equilibrium free energy state before the tip interacts again in the next cycle. This essentially result in homogeneous Boltzmann-like distributions in phase-change, $\Delta\phi$, reflecting equilibrium tip-surface interactions (black curve in phase histogram plot of FIG. 1). The captured surface modalities also end up being analyzed from conservative interactions perspective. E.g., relatively hard materials with inter-atomic spacing ~2-3 Å are typically modeled as simple-solid exhibiting pure elasticity (Young's-moduli in the order of 10 GPa), with no dissipation. The assumption is that deformations at the molecular length scales (~Å) relax so quickly (picoseconds) in comparison to the cantilever's timescale (micro-milli seconds) that the microscopic components of the material behave as if they are locally at equilibrium. This is intuitively valid for atoms in crystal lattices (~Å) and small molecules like $H_2O$ (mean diam$\cong$2.7 Å) that invariably adsorb at nanometric imperfections of bio-interfaces. However, in bio-materials with larger constituent components (typically $\geq$10 Å) microscopic relaxation rates become comparable to macroscopic nanometer order strain rates. The assumption of local equilibrium on deformation no longer holds in such a case and is bound to have metastable states. A more intricate experimental description thus becomes necessary to correctly account for the metastable relaxation phenomenon from the resulting phase-contrast.

Herein this is demonstrated and the emergence of a complex double-stage phase-contrast is shown ($A_0$<10 nm curve in phase histogram plot in FIG. 1) as evidence of this metastable relaxation in a soft-material from the herein described ultra-light tapping experimental method with tapping amplitudes A<3 nm. As described herein, a heterogeneous loss component is decoupled from the appearing $\Delta\phi$ distributions. Previously ultra-low amplitude tapping has been implemented at sub-harmonics, successfully decoupling hysteretic interactions in metal lattices. This previous ultra-low amplitude tapping method is a non-resonant mode technique that utilizes noise level amplitudes on the order of Angstroms at sub-harmonic frequencies that are typically excited by a White noise input to drive the oscillations of the cantilever. Energy hysteresis and losses are in different regime at such operations and are suitable to image hard metal surfaces in its elastic regime only. No viscous effects can be recorded by said previous method. The small amplitude resonant tapping mode method described herein may be applicable for a broad class of soft-biomatter such as soft tissues, cells, DNA, proteins, and drug molecule clusters with intercalated $H_2O$, that exhibit means to simultaneously store (solid-like) and dissipate (liquid-like) energy from the tip-surface interactions.

Interpretation of Phase-Contrast

Dissipative features in TM-AFM phase images have so far been qualitatively explained in terms of an apparent light contrast in the non-contact regime ($-\Delta\phi$ phase shift) and a dark contrast in the contact regime ($+\Delta\phi$ phase shift). Such interpretations directly follow from the sudden changes in phase observed in large amplitude tapping experiments agreeing to equation (1), phase image being a composite of both contact and non-contact solutions of equation (1). Yet, the origin of phase shift remains ambiguous for apparent erroneous invoking of elastic and/or inelastic interactions. Inherent tip-surface hysteretic interactions from either capillary effects, chemical affinity, solid-mechanics assumptions of tip-surface indentation models, artifacts from control system feedback, presence of intrinsic stochasticity at the nanoscale, the combination of many several possible mechanisms like the hydrodynamic effects and the controversial nature of friction at the nanoscale, all of these could contribute simultaneously to the ambiguities.

It is noted that previous efforts in generating decent phase contrast images have necessarily adopted surface indentation methodology with high amplitude oscillations ~A>15 nm but without the means to decouple the hysteretic effects. This is to specifically conform to steady-state loss descriptions that satisfy equation (1) despite compromising on the tip-surface interaction time. In principle, to accurately quantify viscous relaxations, the tip-surface interaction time per period of oscillation should sufficiently be close to the viscous relaxation timescale. Previously, contact time has been argued to be independent of topographic features, while others contradicted with models decomposing phase-contrast into moments of topography. Both, however, agreed on the criticality of tip-surface equilibrium separation $z_c$, typically >20 nm, to correctly reflect on the qualitative interpretation of soft and hard features from the generated phase-change $\Delta\phi$. Nevertheless, viscoelasticity has an inherent time dependence and phase data from high-amplitude tapping experiments make such interpretations erroneous and inconclusive for insufficient tip-surface interaction time. The cantilever dynamics basically fails to follow the surface relaxation dynamics that is crucial for decoupling the viscous loss pathways originating from strain rate or strain history of the interface deformations.

As described here, matching tip-surface interaction time to the oscillation timescale presents possibility of reconstructing phase-contrast in new light where the microcantilever tip has access to the surface relaxations during its entire tapping cycle, without necessarily indenting the surface. The experimental outcome described herein revealed an intricate phase distribution response (FIG. 1) where the single Boltzmann peak ($A_0$>15 nm curve) bifurcates to two peaks ($A_0$<10 nm curve) at the same amplitude setpoint ratio. This was explained from fluctuational excursions of microcantilever dynamics in the limit of $\Delta\phi\rightarrow0$ (FIG. 1).

It is noted that A appearing from dynamic losses of an oscillating microcantilever is expected to be maximized at the condition of resonance, since loss pathways maximize variationally at resonance. Resonance provides access to two timescales: the oscillator timescale (faster—resonance frequency) referred to herein as $\tau_{osc}$ and a dissipation timescale (slower—the resonance width), that reflect the cumulative result of phase-trajectory excursions in the underlying dynamics.

Herein, these two timescales were exploited with controlled tip-surface interactions and demonstrated the emergence of an intricate distribution of phase-change $\Delta\phi$ ($A_0$<10 nm curve in phase histogram plot in FIG. 1) that surprisingly deviates from a standard Boltzmann distribution (black curve). This was analyzed to reflect on the dissipative pathways at the tip-surface junction. Herein it is described that the key to obtaining such a distribution lies in the close matching of the tip-surface interaction timescale $\tau$ to the cantilever resonance timescale, whereby, the multi-timescale relaxation processes are encoded in the resonance width as an integral of dissipation functions; the secondary peak signifying a unique dissipation timescale corresponding to metastable relaxations of the soft surface.

Herein described are the origins of $\Delta\phi$ from the aspect of energy exchange through time dependent adiabatic and anti-adiabatic routes and connect them to fluctuational dynamics of the AFM microcantilever tip in response to heterogeneous interactions at the nanoscale. Earlier implemented non-resonant frequency scanning based AFM techniques do not provide the means to access the dissipation/non-conservative timescale since they judiciously follow steady state deformation dynamics. Such steady state deformations are expected to be predominantly elastic since the probe cantilever behaves as an elastic element at the dynamic frequencies employed in such a study.

Ultra-Light Tapping AFM Mode Operation

In any one or more embodiments of the present disclosure, the herein described ultra-light tapping AFM mode within the fluctuational regime (see Example 1A-B) is implemented via at least the following steps.

Initialization

Figure 18:
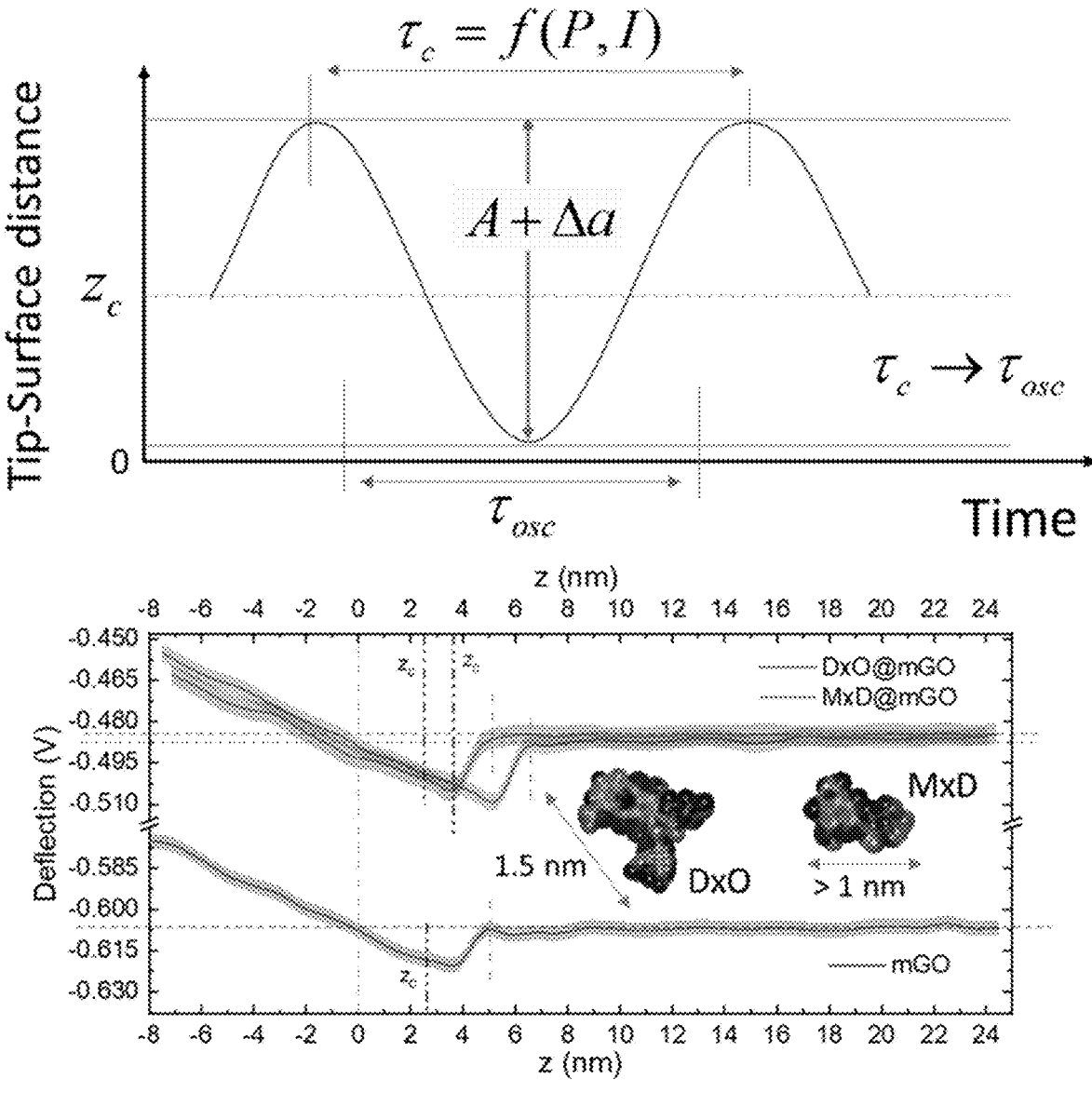
FIG. 18 depicts interaction time in ultra-light tapping mode and determination of non-conservative interaction potential region to which the tapping amplitude is restricted.

Step 1—Deflection/force vs displacement curves (e.g., see FIG. 18) was first obtained from pre-existing force-curve determination tools in an AFM software. From the obtained curve as shown in FIG. 18, $z_c$ (tip/surface equilibrium separation) and the maximum allowable free resonance amplitude $A_0$ were determined. Determination of this $A_0$ was necessary for the next stage of tapping mode amplitude tuning and engage setpoint initialization.

Step 2—Cantilever auto-tuning was performed at the next step involving driving a piezo-actuator that excited the AFM cantilever at a strength optimized so that free resonance amplitude $A_0$ was less than or equal to that determined in Step 1. Standard operating procedure involved selecting the operational tapping frequency which gives 5-10% lower amplitude than the free resonance amplitude $A_0$ of the AFM cantilever obtained from auto-tuning.

Step 3—Next, the set point ratio (SPR) was initialized, selectable as a parameter in existing AFM interface, that set the setpoint amplitude as $A_{sp}$=SPR×$A_0$. In one or more embodiments, setting the initial SPR=0.5 may be used as an initial engage set point amplitude for $A_{sp}$. This sets the actual or the operational tapping amplitude $A=A_0-A_{sp}$ for the selected operational value of SPR, where setting SPR=0.5 makes $A=A_0/2$.

Step 4—At the engage setpoint of $A_{sp}$, the AFM system was asked to engage, and the scanner slowly approached the surface until cantilever vibration amplitude reaches the set operational tapping amplitude A. A feedback loop constantly monitored the actual amplitude as the cantilever was brought close to the surface and accordingly adjusted the height so as to get to an optimized amplitude A as set in Step 3. In one or more embodiments, the surface approach rate is made smaller than that in previous systems for more accuracy and prevention of tip damage. Once the desired amplitude A is reached close to the surface (usually at 5-15 nm separations at small amplitudes), the system was engaged and ready to scan. The determined $z_c$ may be set as an additional tip-surface separation parameter in the process of engage—a feature that has not been implemented in previous AFM modes. Implementing $z_c$ as an additional parameter can improve engage accuracy for performing ultra-light tapping scans. In one or more examples, $z_c$ can improve engage accuracy by controlling the surface approach rate; then using the average deflection signal at every height and matching it to the deflection signal as obtained in Step 1 while generating the deflection vs distance curve; such that the mean or average deflection (that is a static bend of the tip and not the amplitude of oscillations) matches at $z_c$ that was determined in the Step 1. Once engaged, scanning was started by selecting a scan rate and a desired resolution (scan pts per line). This was an operator input that determined the rate of the scan. In one or more embodiments, operational procedure for implementing ultra-light tapping involved selecting a lower scan rate, as decided by depending on the operational tapping frequency and the scan lengths. Another set of parameter initialization was also necessary: proportional gain P=x and Integral gain I=y, which are standard parameters of a PI controller that controls the cantilever tapping dynamics to attain the desired A as set by the amplitude setpoint. x/y ratio sets the cantilever steady state control time scale.

Stochastic Resonance Optimization

Step 5—Data from the complete scans, in one or more embodiments, is to be analyzed internally by a software to determine the amplitude histogram say for 5-10 lines of trace and retrace scans. The number of lines determine the accuracy, simultaneously considering the surface variability. In one or more embodiments, this step may be a user input or machine adaptive selection if the histogram is too skewed from a standard Lorentzian distribution. A direct output parameter from the amplitude histogram was the full-width at half maximum (FWHM) that determined the average deformation $\Delta a$ over the scan lines employed. In an embodiment, the average deformation $\Delta a$ may be outputted as mean deformation signal per scan line for further material analysis.

Step 6—In one or more embodiments, an adaptive decision-making algorithm may be used to implement Step 6, and may involve initializing P=x and I=y values and optimizing them in loop so long as $A\pm\Delta a\approx A_0-A_{sp}$ and $\Delta a\neq 0$, ensuring a dynamic stochastic resonance condition in sync with the soft surface deformation. In one or more embodiments, the condition that was checked was $\Delta a \ll 1$ picometer. This is generally considered a typical working resolution of optical beam deflection measurement in AFM hardware. In one or more embodiments, the optimization routine may work by increasing I=y by 1% and reducing P=x by 1% adaptively so as to reach the desired tapping amplitude A with the condition $\Delta a\neq 0$. In one or more embodiments, a more sophisticated algorithm may be used to determine the Fourier transform of the measured A in time and determine the FWHM of the amplitude spectrum in frequency domain. The FWHM denotes the cantilever steady-state time scale, which was matched closely by changing the values of P=x and I=y and a desired stochastic resonance was achieved at the ultra-light tapping operation. In one or more embodiments, the adaptive decision-making algorithm mentioned above may be a user determined optimization routine too, while the algorithm to be used to determine the Fourier transform will be machine adaptive.

Step 7—Once the set-conditions were valid and the controller timescale x/y—denoted in Example 1 as the correlation timescale $\tau_c$—matched closely to the cantilever resonance timescale $\tau_{osc}$ with the condition: $T\tau_c > \tau_{osc}$ in the limit $\tau_c \rightarrow \tau_{osc}$, and when the damped amplitude A was within the fluctuational regime (a determined in Step 1) scans were run and imaging parameters—Deflection, Amplitude, Phase and Frequency—were saved. The parameters to be collected may be set by a user (available with all AFMs). In one or more embodiments, an operator may decide where the trace and retrace overlap must be taken into consideration before saving the obtained imaging parameters as obtained. Such a decision would depend on the type of softness of the surface being imaged. In an embodiment, this may be made machine adaptive. The magnitude of $\Delta a$ as determined in Step 5, when greater than 20% of A, can be considered a very soft surface—and the overlap of trace and retrace may not be a necessary and sufficient condition to accept the scanned images. In one or more embodiments, acceptable conditions of outputting ultra-light tapping images may be when $\Delta a$ is within 1-10% of A with additional conditions of optimized Step 7.

Figure 19:
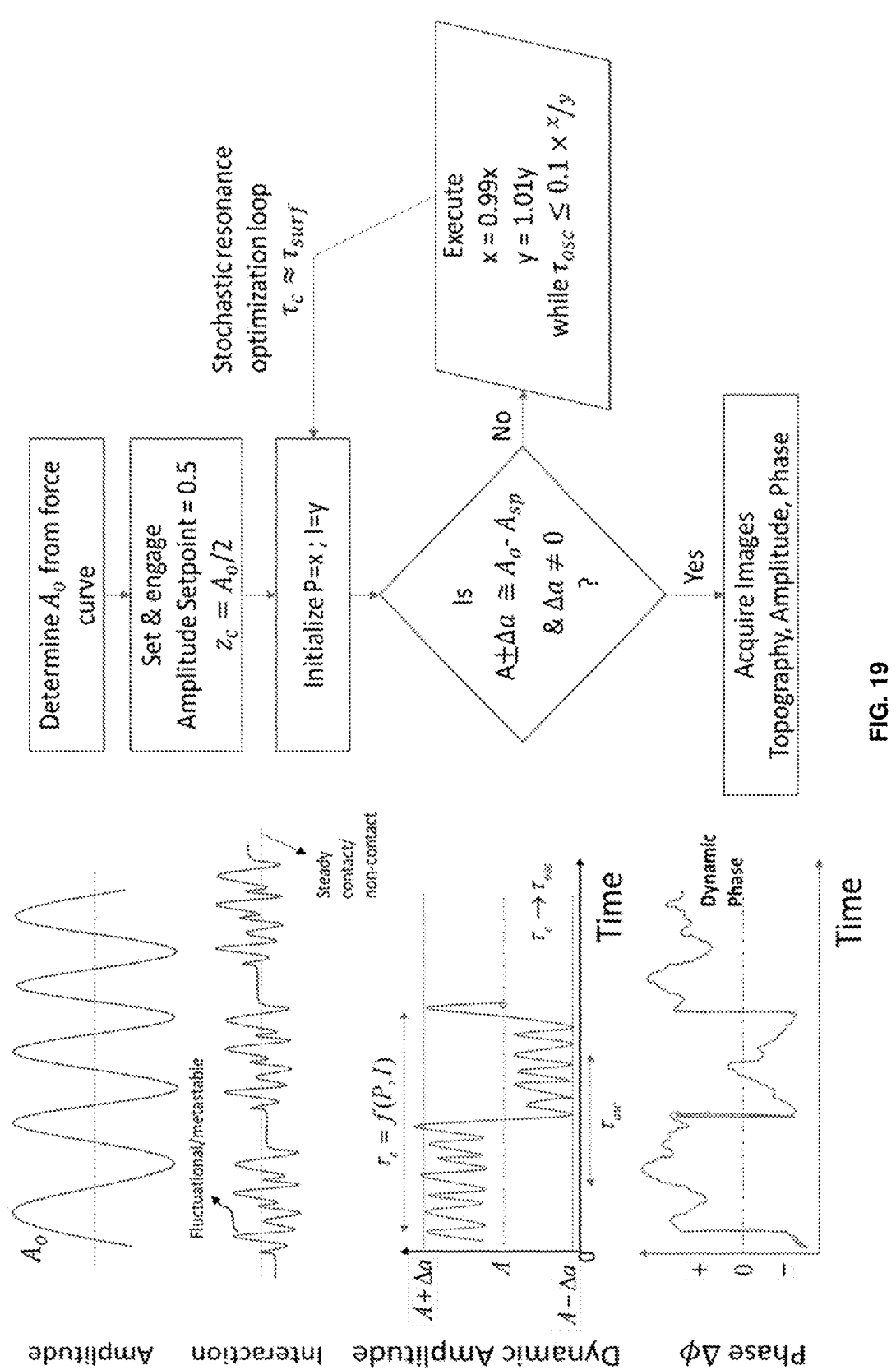
FIG. 19 depicts an operational diagram of stochastic resonance optimization.

Summary—The entire operational routine is summarized in the operational diagram in FIG. 19. At low amplitude operation, the cantilever damping is very low. Low damping at the operational small A gives control over the dynamics using the P=x and I=y parameters and interactions to navigate the transitional excursions about the steady state as highlighted in the operational diagram. At high amplitude tapping, the losses are high and difficult to control dynamically; for example, see the Working Examples 1-2. In one or more embodiments, setpoint amplitude can be optimized from low-to-high to obtain clean scans verifiable by overlap of trace and retrace scans. A series of images can be captured by the software with alternate low and high amplitude setpoint $A_{sp}$ following bisection rule to negate the charge saturation effects at near-contact closest separations of tip and sample. All the set of images carry information as whole from which the elastic and viscous parameters may be determined; for example, see the Working Examples 1-2. In one or more embodiments, another automized step may be multi-point scan optimization at selected XY points distributed over the scan area at each setpoint ensuring minimization of drift and artifacts, though at the cost of low throughput. The selection of the XY scan be user input or can be automatically set as equally spaced points by an algorithm. For more homogeneous surfaces the automatic routine will work. For more surface variability, user input may be desired.

In the preceding description, for purposes of explanation, numerous details are set forth in order to provide a thorough understanding of the embodiments. For example, specific details are not provided as to whether the embodiments described herein are implemented as a software routine, hardware circuit, firmware, or a combination thereof. Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Embodiments of the present disclosure may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the present disclosure may be implemented as a combination of both software (e.g., a computer program product) and hardware. Still other embodiments of the present disclosure may be implemented as entirely hardware, or entirely software (e.g., a computer program product).

The above-described embodiments are intended to be examples only. Alterations, modifications and variations can be effected to the particular embodiments by those of skill in the art without departing from the scope, which is defined solely by the claims appended hereto.

To gain a better understanding of the invention described herein, the following examples are set forth. It should be understood that these examples are for illustrative purposes only. Therefore, they should not limit the scope of this invention in anyway.

EXAMPLES

Example 1A—Phase-Contrast in Tapping Mode AFM: Exploiting Fluctuational Dynamics to Deconvolute Dissipative Pathways with Application in Contact Resonance Enhanced AFM-IR Experimental technique and outcomes: At the nanoscale, viscosity manifests from diffusion of atom centers when perturbed. Heterogeneities accentuate such manifestations. The perturbation rate is important since it continuously works against the material's stress relaxation or dissipation mechanisms. On tapping, a phase-change, $\Delta\phi$, thus appears from the mismatch of the applied and induced surface strain rates owing to the soft-material dynamics. Considering resonance, $\Delta\phi$ signify a delay-bandwidth product $\Delta\phi=\delta\omega\cdot\tau$ vide $A=A_0 e^{-i(\delta\omega\cdot\tau)}$, where $\delta\omega=\omega-\omega_0$ is the shift in fundamental resonance frequency $\omega_0$ on tip approach. The steady state damped amplitude A evolves as a function of the delay bandwidth product with $-i\Delta\phi$ necessarily capturing the time dependence. Therefore, in principle, $\Delta\phi$ have both a steady state solution (contact and non-contact regime) and a transitional component that depends on how $\Delta\phi$ gets influenced as a function of tip-surface interactions.

Herein, the transitions in the limit $\Delta\phi\rightarrow0$ with small tapping amplitudes were focused on. Specifically, the effect of small fluctuations were considered on an otherwise deterministic dynamical system that have been described by phenomenological laws of equilibrium energetics. It was determined that the dynamic crossover $\Delta z\cong4$-7 nm from snap-in lengths having equilibrium tip-surface separation $z_c\approx2.5$-3.5 nm for different samples under study as shown in FIG. 1. The dynamics were carefully restricted in this near-contact crossover regime ensuring that the damped amplitude A stayed within the fluctuational $\Delta z$ as shown in FIG. 1.

This was enforced with ultra-light tapping with a gradual controlled tip-surface approach as a function of $A_{sp}$ and an integral time optimization. On optimization, constant amplitude TM images were captured as a function of varying $A_{sp}$. The phase at free amplitude $A_0$ is zeroed at each run corresponding to a particular $A_{sp}$ allowing the precise monitoring of the phase changes $\Delta\phi$ at the ultra-light tapping condition. Fluctuations would be dominant in this operational regime with $z_c$ as the boundary of crossover in this consideration. In the short run, large deviations cannot be expected from a deterministic equilibrium behavior. Yet, if enough equilibrium time is allowed per scanning point (pixel) for the system to settle down, the cumulative effect of the fluctuations may become pronounced, albeit the rare events become more probable on account of synchronization of tip oscillation with the surface relaxations. This was ensured by an optimized scan rate and controller integral time that caters to the necessary timescale conditions.

Figure 2:
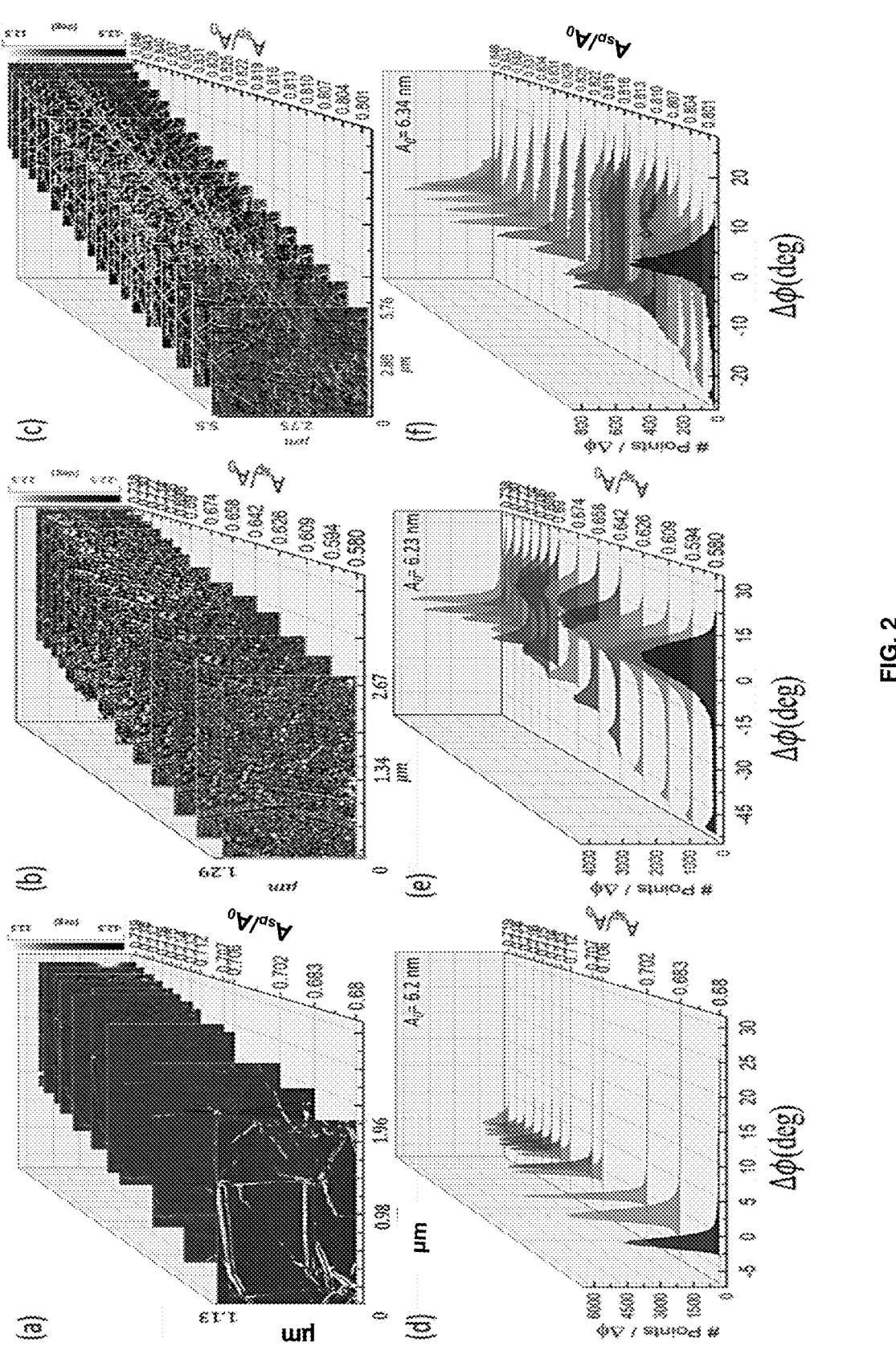
FIG. 2 depicts 3D Stacked phase images and their corresponding histogram distributions obtained for varying $A_{sp}$. mGO: (a) and (d); DxO@mGO: (b) and (e); MxD@mGO: (c) and (f) respectively. Experimental $A_0$ for mGO is 6.2 nm while that for DxO@mGO is 6.32 nm and 6.34 nm in case of MxD@mGO. Soft DxO@mGO and MxD@mGO surfaces showed multi-peak distribution in comparison to simpler single peak distribution in mGO. Appearance of the secondary peak is direct evidence of the interplay of the metastable relaxation timescale of a soft-surface as interrogated by ultra-light tapping conditions enforced here. The relative position and amplitude of the distribution peaks change as a function of setpoint amplitude $A_{sp}$. At higher $A_{sp}$ i.e., lower tapping A at tip-surface approach, the fluctuational probability transition from surface heterogeneity is expected to be high since damping is low at small A. This is evident in a relative increase in $\Delta\phi_-$ peak with respect to $\Delta\phi_+$ at higher $A_{sp}$ in both DxO@mGO and MxD@mGO samples. For (a), (b), (c), the axis units are (μm, μm, $A_{sp}/A_0$); and for (d), (e), (f), the axis units are (#points/$\Delta\phi$, $\Delta\phi$(deg), $A_{sp}/A_0$).

In view of the fluctuational phenomenon in context, the recorded amplitude, phase, and topography data channels at each $A_{sp}$ have important statistical significance in the appearance of a surprising two-stage phase contrast (FIG. 1 and FIG. 2). Doxorubicin (DxO) and Minoxidil (MxD) drug clusters on multilayered Graphene Oxide (mGO) were selected as the model soft-matter systems (DxO@mGO and MxD@mGO, respectively). The samples were expected to have intercalated $H_2O$ at the nanometric imperfections. DxO (~15 Å) and MxD (~10 Å) molecules (FIG. 1) were expected to exhibit finite relaxation rates, making them a more ideal soft-matter candidate to investigate. Such drug@mGO systems have been gaining interests in patch-material type drug delivery systems that are similar to applying band-aids on an effected wound. The correct interpretation of the loading condition in terms of the surface energy is crucial for drug delivery efficiency and their therapeutic success, that are usually triggered by the pH level of the affected wounds. Accurate estimations of surface energy play a vital role in controlling the drug release. From the distribution results of DxO@mGO and MxD@mGO samples, the surface energy was quantified in terms of the elastic and viscous components and were compared to bare mGO samples, where the appearance of a secondary peak was not prominent. On the fundamental side, exploiting the fluctuational regime served two purposes: (a) determining the basis of the intermediate energetics in the origin of $\Delta\phi$ and (b) linking them to the dissipative pathways.

Timescales and significance of fluctuations: Soft surfaces typically relax over multiple timescales with the system hopping between metastable and equilibrium states attesting to their unique NE loss mechanisms. The energy loss corresponding to the metastable hops typically signify a heterogenous loss path that rides over the equilibrium homogenous loss path, and may appear as small fluctuations of the steady state energy landscape. Necessarily, the timescale separation of the states needs to be small for both the loss pathways to reflect simultaneously in the dynamics. In its limiting case, when the states are widely separated in timescales, the excursions amongst the states become statistically independent. In that case, the energy loss follows a typical homogenous Gaussian distribution with vanishingly small relative fluctuations $$\frac{\sigma_{dis}}{\langle E_{dis}\rangle}\sim0.1, \langle E_{dis}\rangle \text{ and } \sigma^2_{E_{dis}}$$

being the mean and variance of the dissipated energy as described by equation (1).

Figure 3:
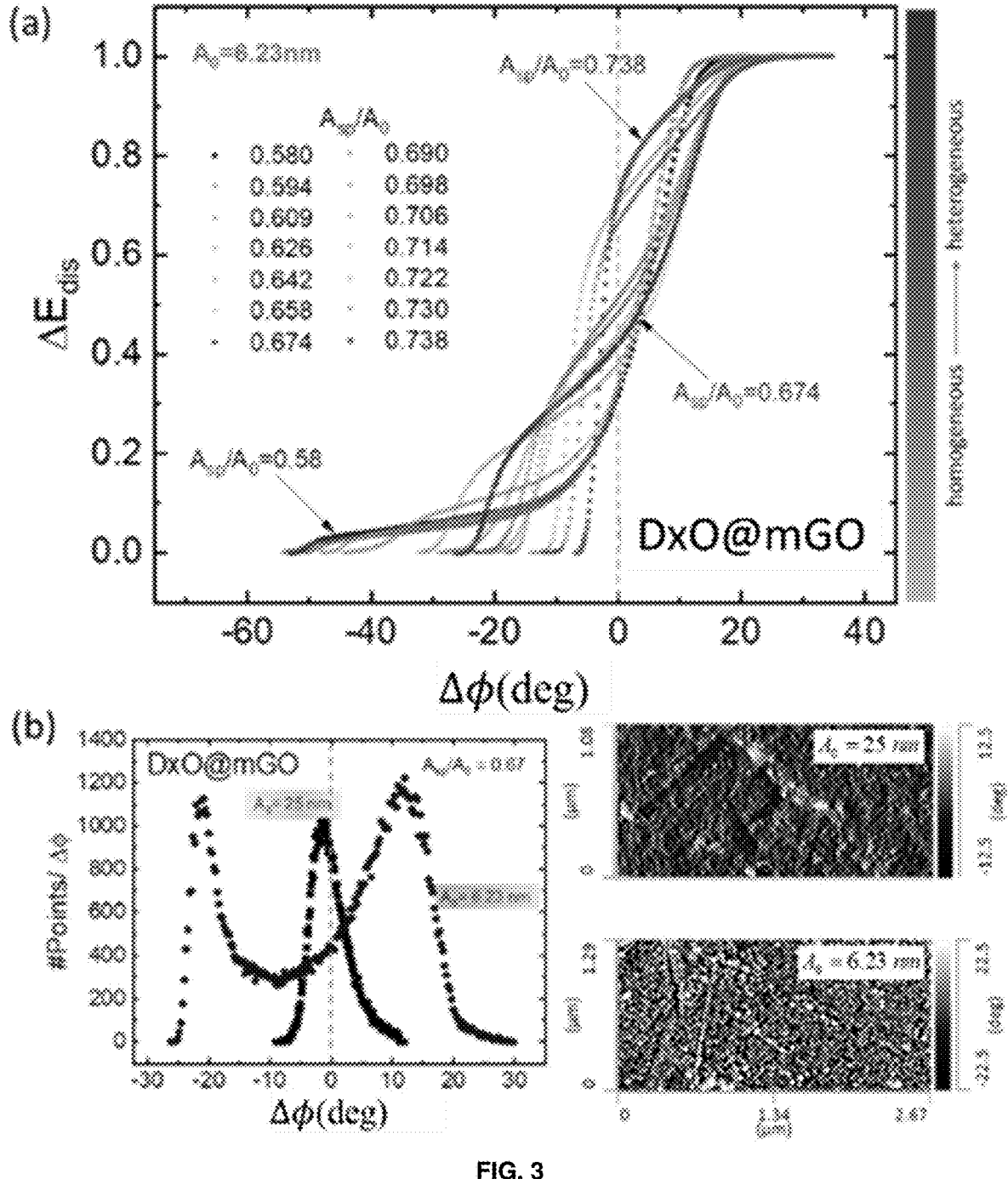
FIG. 3 depicts normalized cumulative density graphs of phase histograms obtained for (a) DxO@mGO and (c) MxD@mGO at low $A_0$ highlighting the net dissipated energy from the fluctuational probability transitions at light tapping in the limit $\Delta\phi \rightarrow 0$. The two-level transition originated from both heterogeneous and homogeneous energy losses. Phase images of (b) DxO@mGO and (d) MxD@mGO at low and high amplitudes and comparable $A_{sp}/A_0$ ratios. Axis units of phase images are (μm, μm, deg). Absence of the secondary heterogeneous transition at higher $A_0=25$ nm (b) and 15.54 nm (d) (traditional hard tapping, for example hard tapping via non-contact tapping mode or intermittent tapping mode) is apparent. The histogram peaks in (b) and (d) highlights the separation of the timescales in the underlying dynamics accentuated by the fluctuations. The transitions at $A_0=25$ nm and 15.54 nm are centered at 0 with a positive $\Delta\phi$ skew signifying an apparent contact regime interaction for a soft sample ((b) $A_0=6.23$ nm; $A_{sp}/A_0=0.67$; and (d) 6.34 nm; $A_{sp}/A_0=0.81$).
Figure 3:
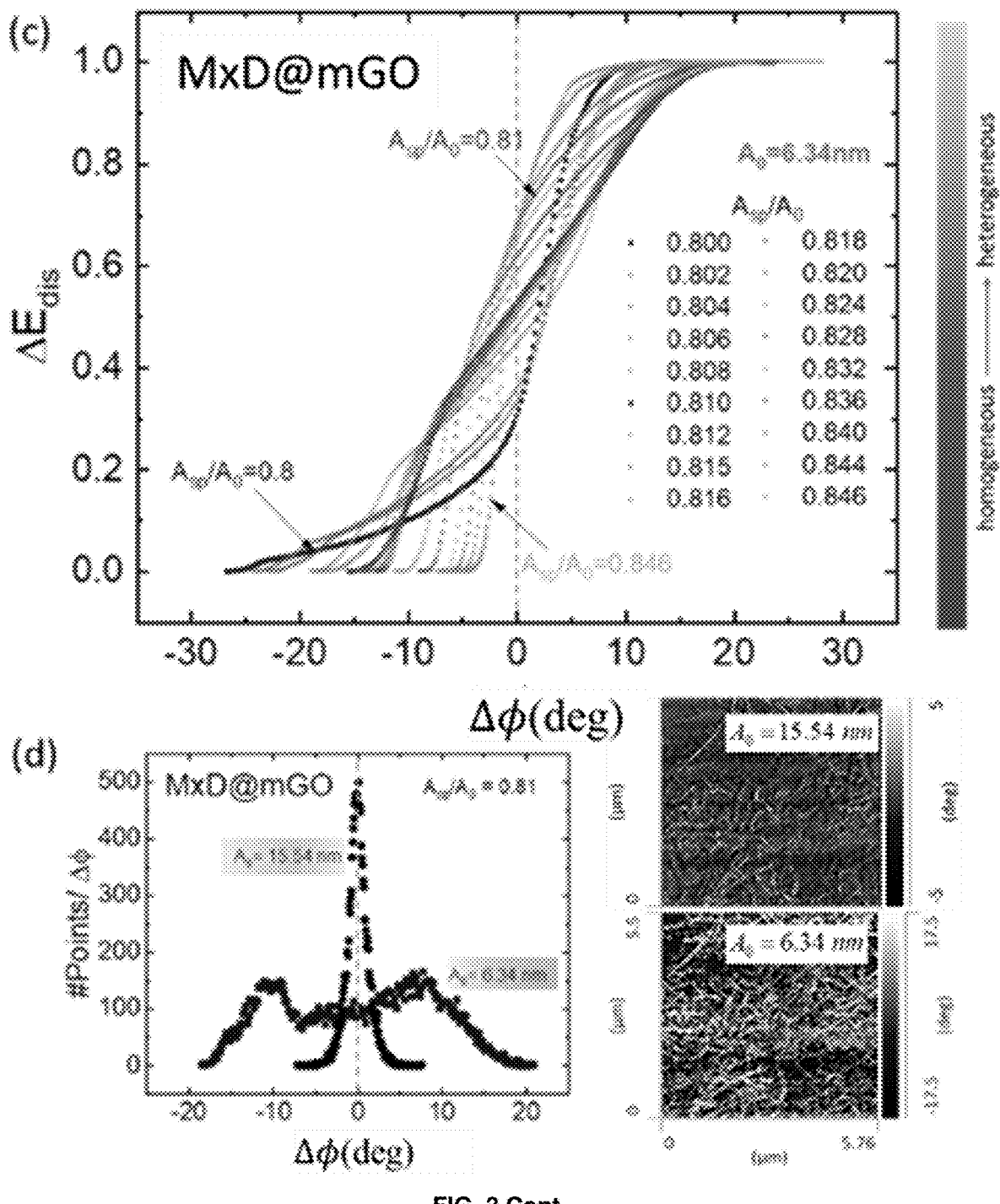

This was apparently evident in the generated A distributions in the present experimental outcomes at high amplitude (FIGS. 3(*b*) and 3(*d*)), similar to previous experiments with surface indentation where the interaction time $\tau$ is negligible compared to the perturbation timescale). However, subject to the condition that the timescale separation is short, the energy landscape of a soft-material deviate from a single stage Boltzmann potential. A kinetic variant becomes essential to account and explain a succession of NE states. This was postulated in Onsager's principle of least dissipation of energy. This manifests at near contact conditions where the tip interaction time $\tau$ (FIG. 1) renders fluctuations relevant to the underlying dynamics making the states and their probability of excursions in between the states statistically correlated. Onsager attributed this statistical significance to the time integral of dissipation functions. Variationally this has the means to be effectively encoded in resonance width broadening timescale. This is because, when enough interaction time is allowed, the microcantilever dynamics essentially start to follow the multi-timescale dynamical relaxations of the soft viscous material typically adopting two or more timescales.

In principle, the shortest timescale (resonance timescale) relates to dynamical trapping of oscillator around one of the equilibrium states (contact/non-contact in the present case) while the longest (resonance broadening timescale) signifies relaxation time towards an (unique) dynamic steady state. For soft-material this typically signifies a structurally disordered metastable state. Phenomenologically, the energy states of a soft material can be modeled to be confined in a double-well free energy landscape (see later FIG. 6 in theoretical analysis) with the system spontaneously hopping between the potential wells when externally perturbed i.e., by the periodic tapping mechanism in the present case. Specific to a material, the double-well free-energy landscape will exhibit a characteristic relaxation time that is inversely proportional to Kramer's rate of hop in between the wells. When the interaction time T relevant to the perturbations, closely match this inherent rate of hop, a state of dynamic stochastic resonance emerges; the excursion between the minima states starts to synchronize with the external perturbation dynamics. I.e., the microcantilever dynamics sync to a fluctuational dynamics about $\phi=0$ (in the near-contact regime) deviating from equilibrium (FIG. 1). Physically, the microcantilever follows the surface's excursions to the metastable state in time. These transitional excursions amongst the fluctuational and the steady states thus become relevant to the dynamics, reflecting phase distributions that deviate from standard Gaussian as two stage distribution in $\Delta\phi$ ($A_0$<10 nm curve in histogram plot of FIG. 1 and FIG. 3).

Basically, two markedly distinct regimes of energy interactions are possible i) the anti-adiabatic case: when the cantilever dynamics does a fast transition between equilibrium states remaining oblivious to the intermediate metastable state and ii) the opposite adiabatic case: where the oscillator dynamics is very slow compared to the faster relaxation processes at the interface, thus susceptible to non-linear damping effects. A third crossover regime at a comparable timescale $\tau_{osc}\cong\tau_{sur}$ has the fluctuational relevance as described above. I.e., when the enforced dynamics is slow enough to reversibly follow the transitional excursions at small-separation deformations where $\tau_{sur}$ is the inherent metastable relaxation timescale of the surface in question. The present experimental description instituted this premise to follow the transitional adiabatic $\rightleftharpoons$ anti-adiabatic crossovers in between the equilibrium and metastable states (FIG. 1). In effect, enforcing oscillations within the crossover regime renders the tip-surface interaction correlation time $\tau_c$ finite, allowing the interrogation of a heterogeneous interaction scale at the tip-surface junction (see Methods) in addition to inherent homogeneous loss timescale from the cantilever's oscillatory dynamics.

Appearance of two-stage phase contrast: The enforcement of a finite correlation time $\tau_c\rightarrow\tau_{osc}\cong\tau_{sur}$ was optimized in the present experiments in terms of $A_{sp}$ and the integration time of the PI controller. The choice of P and I gains was critical at the present operational low scanning rates ~0.05 Hz, giving the tip enough time to equilibrate at every pixel of the image (pixel data is sampled over an average of 40,000 cycles). The P and I gain were set such that the integral timescale is of the order $\tau_c$=6.430 ms, sufficiently close to $$\tau_{osc} = \frac{2\sqrt{3}\,Q}{\omega_0} \simeq 0.55 - 0.64 \text{ ms},$$

within 1 order of magnitude, corresponding to the fundamental resonance frequencies ~302 kHz and 309 kHz and Q~355 and 254 of the tapping mode cantilevers employed in cases of DxO@mGO and MxD@mGO, respectively. Such sampling satisfies the condition of ergodicity making the collected data every channel and their probability distributions statistically relevant to the fluctuational transitions about $\phi$=0. Additionally, when $\tau_{osc}\approx\tau_{sur}$ within same order of magnitude, the underlying dynamics start following the viscous relaxation scale of the soft-surface. Thus, for $\tau_c$>$\tau_{osc}$ in the limit $\tau_c\rightarrow\tau_{osc}$ at the present ultra-light tapping implementation, the mean surface deformation and the fluctuations about the mean also become a function of the cantilevers mean amplitude evolution at every pixel. The frequency fluctuations and the time delay associated with such evolution thus should reflect a unique distribution relevant to the enforced conditions. Contrarily, large amplitude oscillations approximate steady state dynamics when $\tau_c\rightarrow\tau_{osc}$. The phase crossover between the equilibrium states is sudden, necessarily satisfying the Gaussian distribution approximation of the central limit theorem in the limit that the fluctuations become statistically insignificant and dynamically irrelevant.

Under the present enforced fluctuational conditions ($\tau_c$>$\tau_{osc}$), however, it may be inferred that the dynamic amplitude measured at each pixel will be proportional to a phase lag $\Delta\phi=\tau_c\cdot(\omega-\Delta_\omega)$ (see Methods) as $$A+\Delta a=X(\omega)A_0e^{-\Delta\phi}, \tag{2}$$

Figure 10:
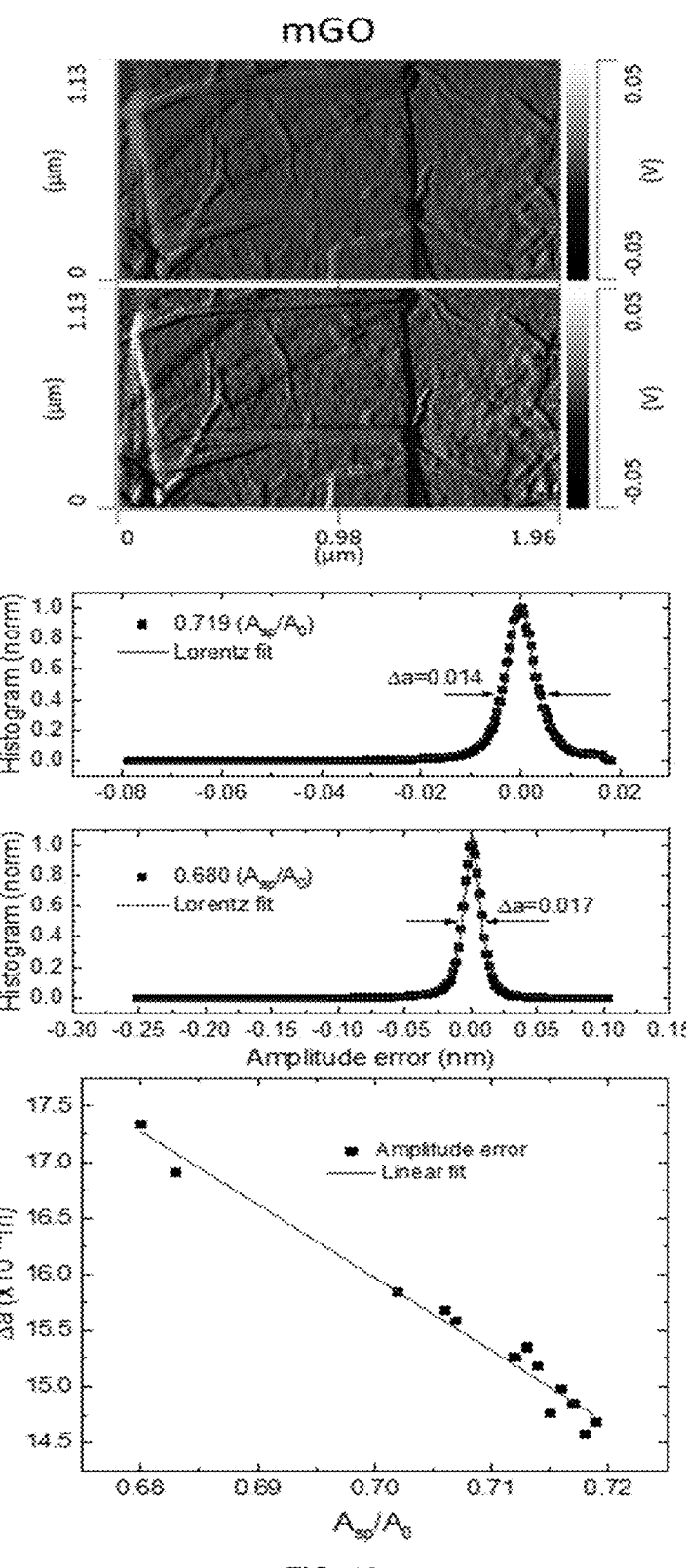
FIG. 10 depicts surface deformations as a function of $A_{sp}$ for mGO, DxO@mGO and MxD@mGO samples.
Figure 10:
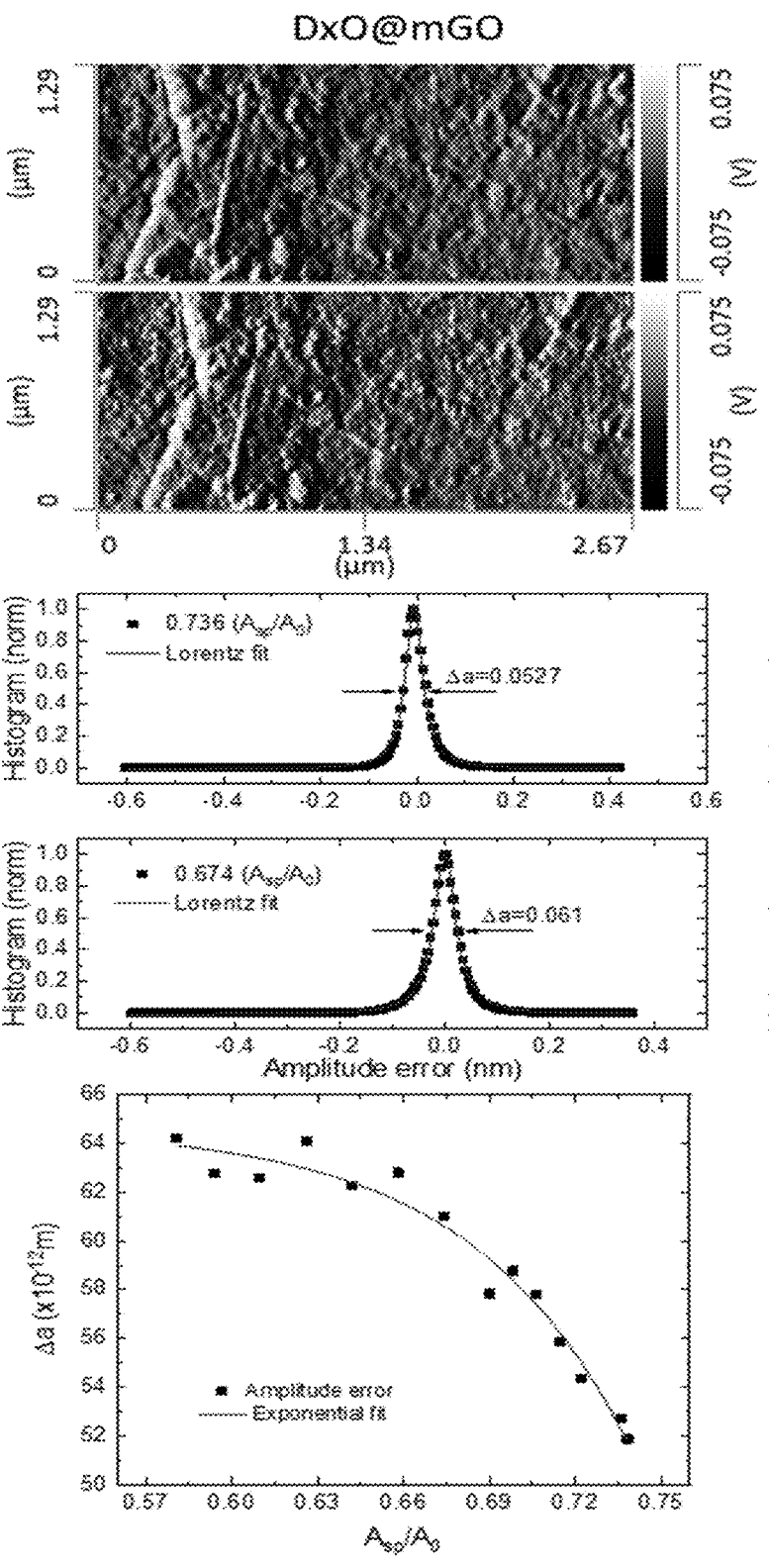
Figure 10:
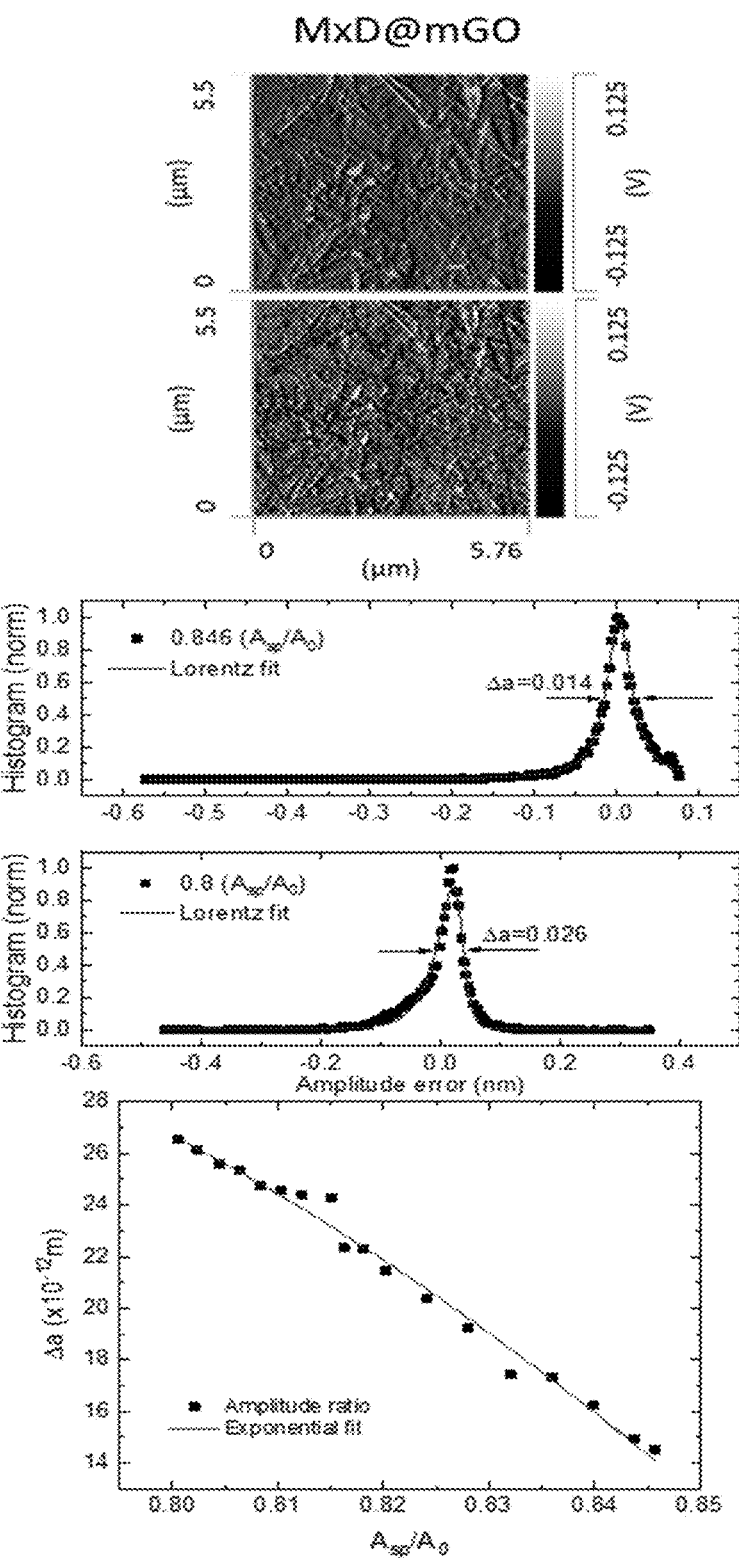
Figure 11:
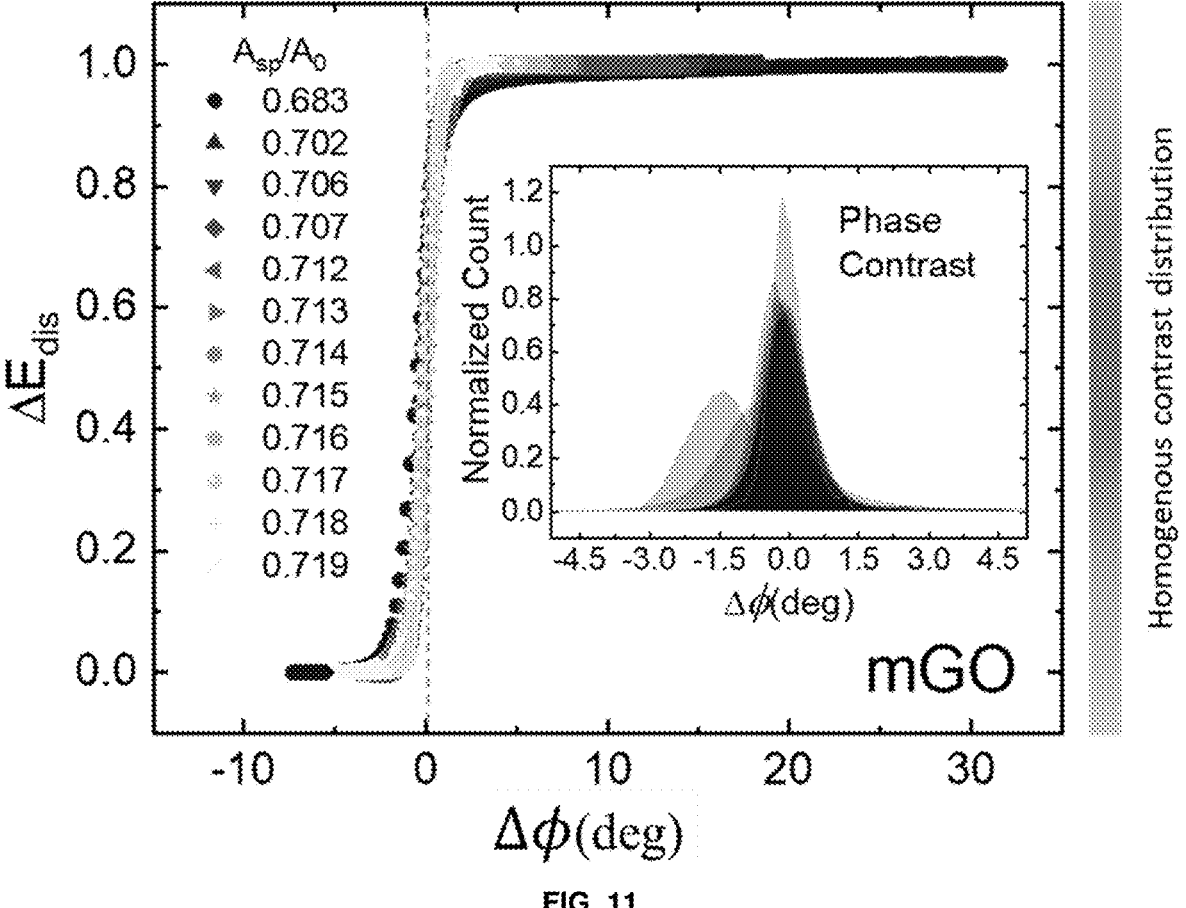
FIG. 11 depicts phase histogram and the cumulative density graphs as a function of $A_{sp}$ in experiments.

$\Delta a$ being the mean deformation at each amplitude setpoint. Herein lies the significance of fluctuations or the adiabatic $\rightleftharpoons$ anti-adiabatic crossover as the fundamental basis of origin of $\Delta\phi$ in the present experimental description. The mean deformation $\Delta a$ for each operational $A_{sp}$ were determined from the Lorentzian width (heterogeneous broadening) of the normalized amplitude histograms as shown in FIG. 10. Following the premise of equation (2), phase lag $\Delta\phi$ is expected to follow a complex probability distribution in the zeroth order of $\tau_c\Delta_\omega$, signifying energy losses via both homogeneous (inherent steady state losses) and heterogeneous (dynamic interaction losses) mechanisms. Indeed, complex distributions in $\Delta\phi$ appear in the form of convoluted peaks centered at $\Delta\phi_+$ and $\Delta\phi_-$ changing in form as a function of $A_{sp}$ for DxO@mGO and MxD@mGO samples as evident from the phase histograms (FIGS. 2e and 2f) of the phase images (FIGS. 2b and 2c). For the control sample mGO, the phase responses resemble homogeneous distributions (FIG. 2d and FIG. 11), since deformations are expected to be predominantly elastic at this perturbation frequency. The two-stage distribution for the drug@mGO samples is significant from the fact, that it appears from dynamic tip interactions at the nanoscale and not from typical resonance bi-stability on account of amplitude nonlinearity. The span of the two fluctuational peaks $\phi^*=\Delta\phi_+-\Delta\phi_-$ becomes a measure of the apparent phase-contrast that highlights distinctive phase features obtained in the present experiments (FIGS. 2b and 2c). The individual peaks encode the dynamic loss mechanisms which essentially materialize from two disparate timescale events relative to the operational correlation timescale $\tau_c$. It must be noted here that $\tau_c$ is not strictly independent of $A_{sp}$ at constant P and I, since cantilever steady-state time has a strong frequency and Qdependence when dissipation dominates and deviates from linearity. Operationally in the present experiments P and I were optimized to an order of few % at each $A_{sp}$ to ensure conformed trace-retrace scans. The separation of the obtained two-stage phase peaks $\phi^*$ signified the separation of interaction timescales as captured by the underlying dynamics via fluctuational crossovers as explained in detail in "Timescales and significance of fluctuations" section before. A longer timescale ensues from slower surface relaxations events. The tip follows the strain history via interactions that are finite time correlated every successive oscillation cycle at a pixel. These reflect as a phase-lag $\Delta\phi_-$ probability transition. The very nature of time-correlated interactions is suggestive of a heterogeneous (Cauchy) distribution. A second inherently faster oscillatory timescale results from surface interactions that are uncorrelated (spatial & temporal) down to nearest neighbor pixels. A phase-lead $\Delta\phi_+$ probability transition results with an apparent homogeneous (Gaussian) distribution. This heterogeneous phase-lag transition peak centered at $\Delta\phi_+$ appeared in case of viscoelastic DxO@mGO and MxD@mGO but was absent in mGO (FIG. 2d and FIG. 11).

The loss mechanisms at either peak demands elaboration. A minimal scalar model was considered with least number of parameters to explain the transitions phenomenologically. A more detailed exact solution model can be formulated in the likes of Sollich's exposition incorporating multiscale dynamics, essentially giving the same conclusions. Normalized cumulative density graphs (CDG) (FIGS. 3a and 3c) for each $A_{sp}$ as a function of $\Delta\phi$ highlight a clear two-stage transition in dissipated energy $\Delta E_{dis}$. In comparison, the same for mGO depicts a more homogeneous Boltzmann-like transition as discussed in FIG. 11. For the present case where the distributions deviate from a single homogeneous distribution, it was important to consider how a change in parameter, $A\rightarrow A+\Delta a$, would affect a change in the average value of its dependent variable $\langle \Delta\phi \rangle$. Under a generalized assumption of coupled homogeneous and heterogeneous loss mechanisms from disparate interaction timescales as elucidated before, a measure of the net energy dissipation as a function of appearing $\Delta\phi$ can be formulated as $$\Delta E_{dis} \equiv \langle \Delta\phi \rangle_{A+\Delta a} - \langle \Delta\phi \rangle_A \propto \exp\left(-\frac{\sigma_{AG}^2}{\sigma_{AL}^2}\right) \qquad (3)$$

where $\sigma_{AG}$ and $\sigma_{AL}$ are the respective homogeneous and heterogeneous standard deviations of $\Delta\phi_+$&$\Delta\phi_-$ for a surface deformation $\Delta a$ at the oscillation amplitude of A. In principle, $\langle \Delta\phi \rangle_x$ is the ensemble average that is proportional to its variance at the parameter value x; x taking the values A and A+A$\alpha$. For example, $\langle \Delta\phi \rangle_A$ explicitly represents a probability density $\langle \Delta\phi \rangle_A = \int_\Omega (\Delta\phi) P(A, (\Delta\phi)) \, d(\Delta\phi)^{57}$ with P(A, (Δφ)) the normalized distribution function. The integral range $\Omega$ denotes the $\Delta\phi$ span obtained in an experiment for a particular $A_{sp}$, thus accounting for an estimate of the net dissipated energy $\Delta E_{dis}$ as in Equation (3). Equation (3) was further recast to a fitting function of coupled cumulative energy densities (see Suppl. Sec C) from which the respective homogeneous and heterogeneous probability densities centered at $\Delta\phi_+$ and $\Delta\phi_-$ are determined. P($\Delta\phi_+$) and P($\Delta\phi_-$) essentially represent the relative energy losses via homogeneous and heterogeneous routes, respectively.

The phase image and histograms for DxO@mGO and MxD@mGO obtained at high amplitude oscillations are also shown in comparison (FIGS. 3b and 3d). The absence of any secondary transition at $\Delta\phi_-$ is apparent. Imaging at lower amplitude A increases the probability of tracking the $\Delta\phi_-$ transitions at the heterogeneities since the correlation time $\tau_c$ theoretically tends to $\infty$ when $\Delta\phi = 0$. This promotes a relative skew in the $\Delta\phi_-$ transition density at very high $A_{sp}$'s (FIGS. 2e and 2f). In principle, the secondary $\Delta\phi_-$ transition suggests a negative shift in the eigen frequency with acute losses. This is rather very interesting from the aspect of fluctuational trajectories and Lyapunov exponents in phase space. This secondary transition was clearly absent in mGO, which was expected to exhibit predominant equilibrium behavior at the present perturbation rates $\sim 10^2 \text{ sec}^{-1}$. Interestingly, the probability distribution in $\Delta\phi$ that appeared for bare mGO was centered around $\Delta\phi = 0°$ with a longer positive tail (FIG. 11). The phase-contrast and peak height decreased at lower A, signifying lower energy losses as expected for materials with dominant elasticity. The positive skew in $\Delta\phi$ is suggestive of a positive shift in eigen frequency. For pure elastic deformations this is reminiscent of an effective increase in surface stiffness as has been considered earlier at high amplitude tapping.

Figure 4:
FIG. 4 depicts correlation length analysis highlighting the resolvability of heterogeneous features at ultra-light tapping for (a) DxO@mGO and (b) MxD@mGO. The relevance of a metastable relaxation scale argument is apparent in the sigmoidal behavior of phase correlation lengths.
Figure 4:
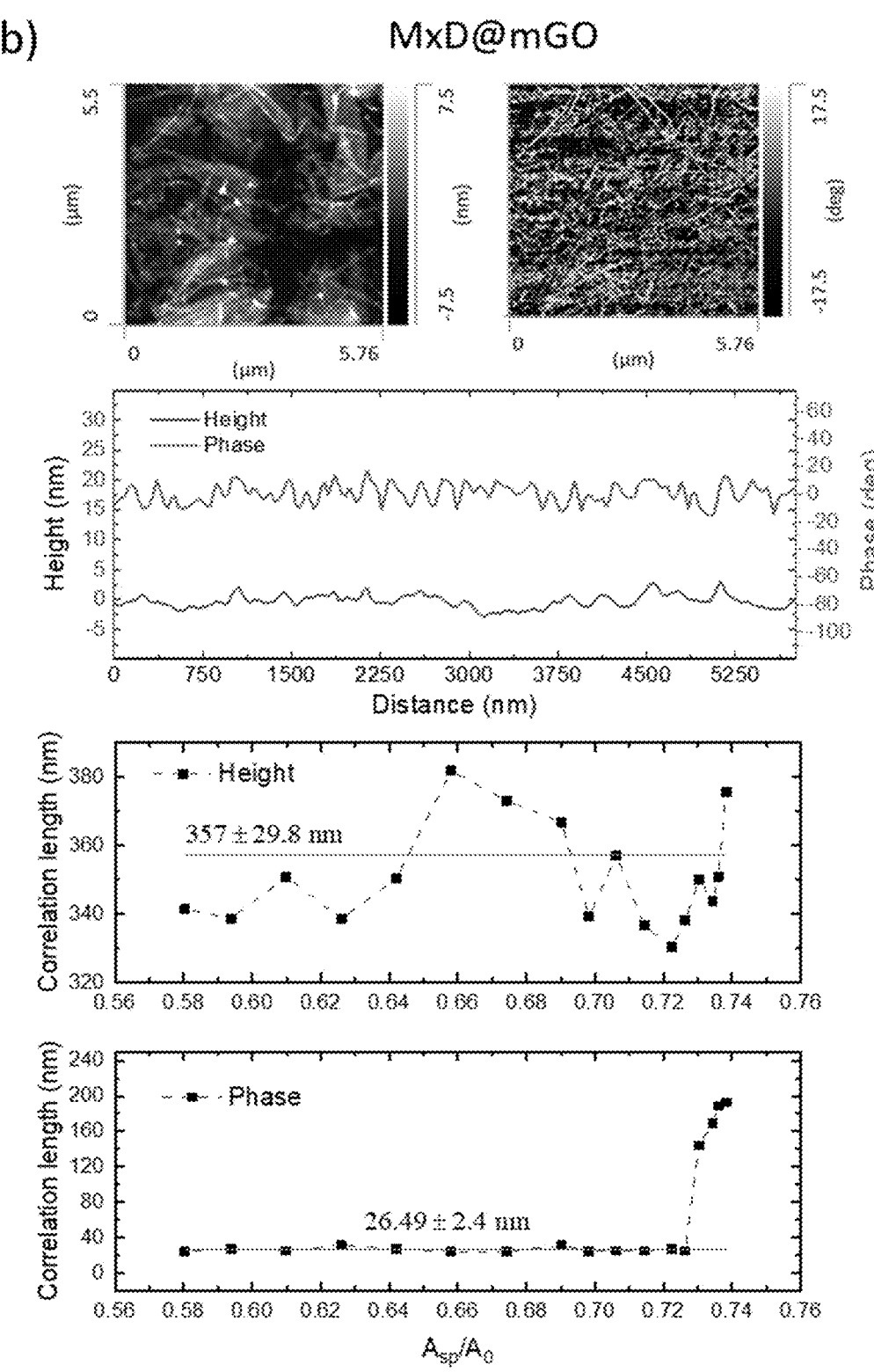

Further, to decouple noise correlation effects, the correlation length results of the height and phase images must be taken into consideration (FIGS. 4a and 4b). The height and phase features were uncorrelated validating the argument herein of capturing a heterogeneous loss mechanism centered at $\Delta\phi_-$. The respective phase correlation length scales also showed a unique multi-scale evolution behavior as a function of $A_{sp}$. Unlike previous results that showed independence of phase correlation lengths vs $A_{sp}$, the sigmoidal nature highlights the importance of strain history on the measured elastic and viscous coefficients at small amplitudes. The statistical average approach of the present treatment allows for decoupling the strain rate dependence from fluctuational effects as a function of the operational $A_{sp}$ and thus in turn as a function of the tapping amplitude A. An apparent increase in phase correlation length at smaller A is suggestive of an improved resolvability of heterogeneous features, further augmenting the importance of captured additional $\Delta\phi_-$ transition revealing richer phase-contrast. However, the same in case of topography, image remains constant within 0.1 order of standard deviation, suggesting no apparent change in height resolvability.

Importance of captured strain rate: The energy losses as captured in FIGS. 3a and 3c provides access to both the elastic and time dependent viscous interactions as a function of $\Delta\phi$ distributions since the cumulative energy losses as depicted in FIGS. 3(a) and 3(c) have non-constant zero-crossovers. Specifically, $\Delta E_{dis}$ at $\Delta\phi = 0°$ provides a measure of conserved energy in the underlying dynamics. As used herein, notation for the conserved energy is same as energy stored $\Delta E_{stored}$. Elastic deformation caters to this conserved energy scale, providing a means to determine variations in elastic surface energy $\gamma_{el}$ on tip interactions. The viscoelastic deformation on the other hand is inelastic, and cause variations in surface stress as a function of the strain rate. This can be estimated from the net steady state $\Delta E_{dis}$ as a function of apparent phase-contrast $\phi^*$ obtained in experiments using equation (1). The effective surface deformation in each case changes with the effective interaction area over which tip-surface energetics take root. The deformation dependent changes in interaction area were approximated as $A_{interac} = 2\pi R \cdot \Delta a$ with $R \cong 12$ nm (FIG. 13) alongside the deformation rates $\Delta \dot{a} \cong \omega \cdot \Delta a$ in units of $\text{m} \cdot \text{sec}^{-1}$. The deformation rate represents a measure of the strain rate scale in the underlying dynamics as highlighted in FIG. 5 color bars. $\Delta E_{stored}$ and $\Delta E_{dis}$ are plotted against the estimated deformation dependencies, to determine the elastic $\gamma_{el}$ and viscosity coefficient $\eta$ as $\Delta E_{stored} = -\gamma_{el} \Delta A_{interac}$ and $\Delta E_{dis} = \exp(-\eta A_{interac} \Delta \dot{a})$ vide as shown in FIG. 5.

Figure 5:
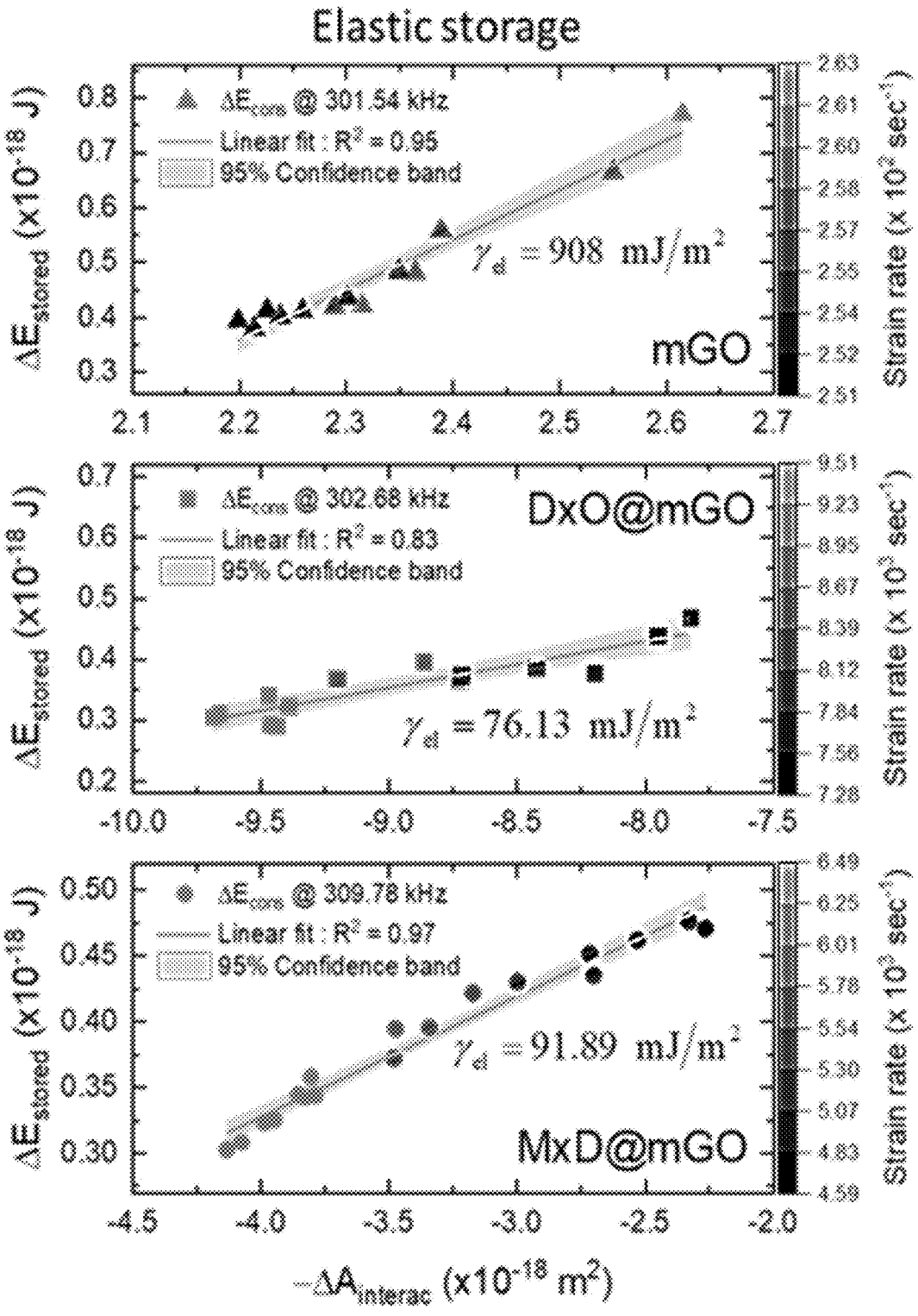
FIG. 5 depicts estimations of surface energy and viscosity coefficients from dynamic responses. The exponential trend of dissipated energy depicts a changing viscoelastic behavior as a function of strain rate. Error bars of the energy estimations from the experimental data are in the order of 1%. The estimated $\gamma_{el}$ and $\eta$ indicate an intrinsic strength in the order of kPa for DxO and MxD on mGO systems at the operational fixed perturbation rates ~302 kHz and 309 kHz, respectively. This is a relevant scale for biomolecules and tissues. MxD being a smaller molecule was expected to reflect a higher intrinsic strength at a comparable perturbation rate. Comparatively, mGO results indicated an intrinsic strength in the order of MPa that matches well to previous literature. Note: for mGO, elastic deformation acts against the change in surface energy and thus the x-axis scale needs to be reversed in sign to correctly estimate as the positive slope of the fitting line as shown in top left pane.
Figure 5:
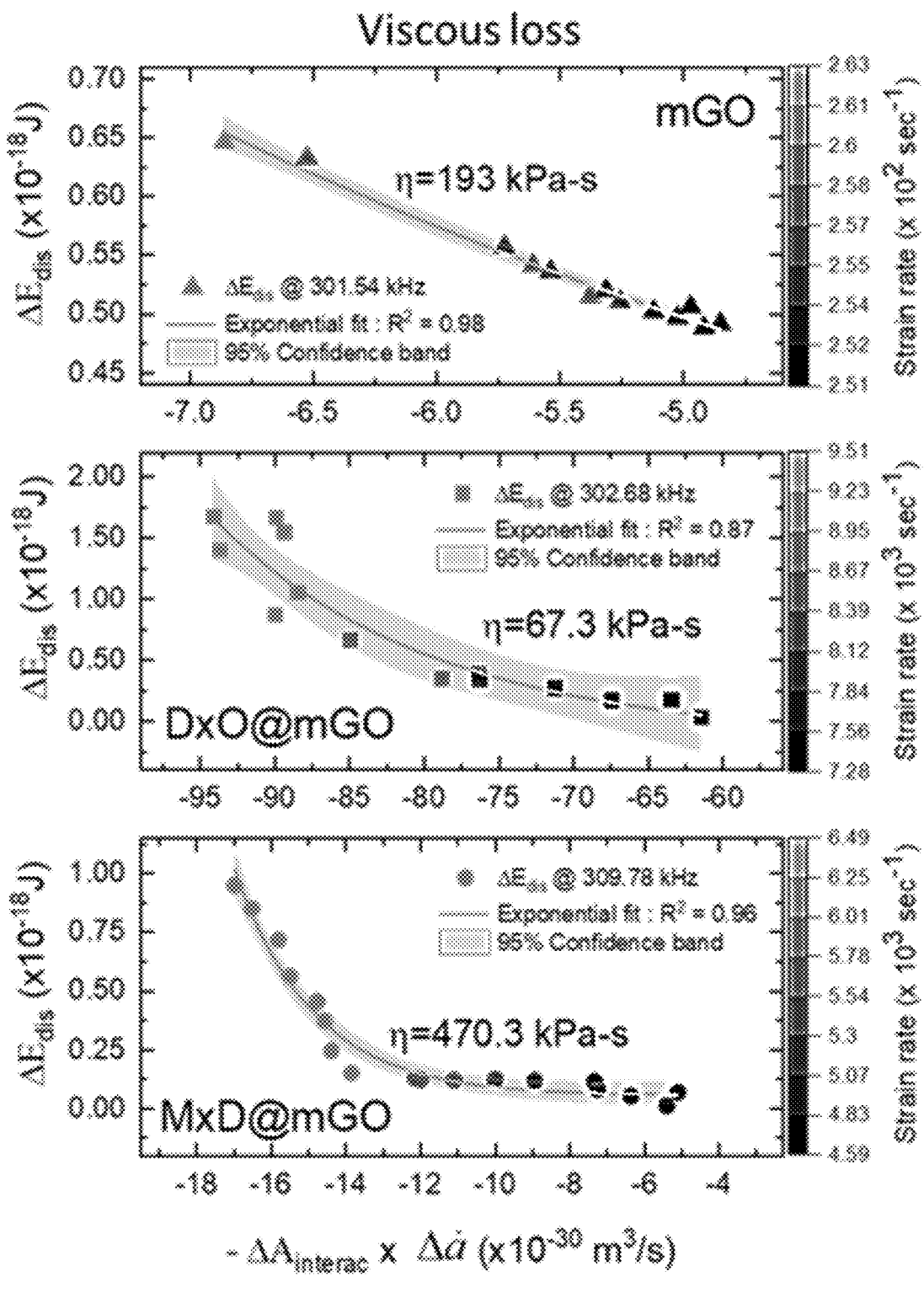

The relative variations in energy stored and dissipated vs the strain rate amplitude ($\text{sec}^{-1}$) is also suggested from the color bars in FIG. 5. For an elastic material, higher strain rate amplitude leads to more energy storage and loss, while in case of a viscoelastic material the energy storage reverses at higher strain rate amplitudes with the dissipated energy remaining higher for higher strain rate amplitudes as expected. It must be noted here that since TM-AFM is a fixed frequency method, the variation in strain rate in the present experiments was obtained via a statistically relevant deformation scale $\Delta a$ that correspond to a fixed oscillating amplitude A as set by the amplitude setpoint $A_{sp}$. In essence, $\Delta a$ is the mean deformation the surface encounters at a fixed tapping amplitude and frequency, depicting the viscoelastic dependencies in the present experiments. The variations in $\Delta a$ are thus indeed a function of different strain amplitude at a fixed frequency. It must be added here that the energy losses or the equivalent viscoelastic behavior show an exponential dependence as a function of the strain rate scale $\Delta \dot{a}$ in units of $\text{m} \cdot \text{sec}^{-1}$ for a fixed perturbation frequency. The present state-of-the-art microcantilever probes limits frequency tunability capabilities to demonstrate such an operational variation of fixed strain rate $\Delta \dot{a}$ with controlled $\Delta a$ at resonance.

Theoretical consideration: For a detailed theoretical understanding of the probability of transitions or hopping between the states $\Delta\phi_+$ and $\Delta\phi_-$, one would generally proceed with a stochastic dynamics model of motion that will necessarily include the dynamical assumptions of the states U($\Delta\phi_+$) and U($\Delta\phi_-$) as a function of $\tau_c$. Such a theory will be crucial for identifying the stochastic parameters underlying the fluctuation dynamics in the limit $\Delta\phi \to 0$.

Herein, however, a more general approach was taken by outlining the results that may be common for such models and are of relevance to the present experimental realization.

Figure 6:
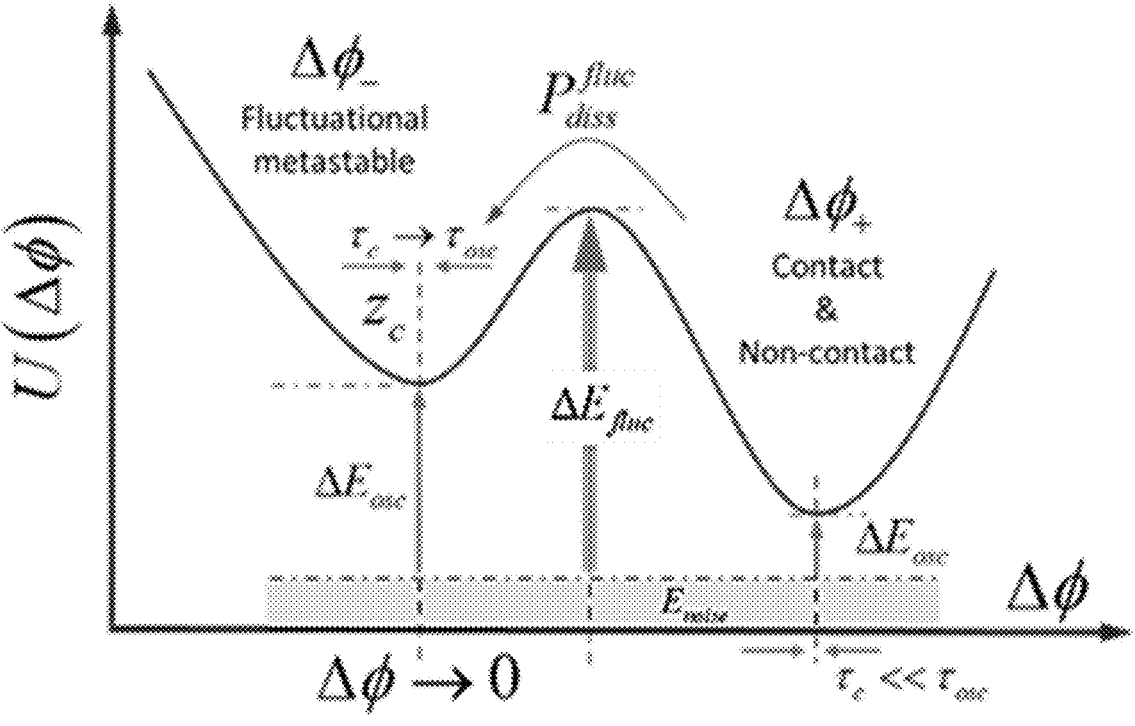
FIG. 6 depicts potential function for the generalized theoretical considerations, depicting cantilever dynamics that shuffle between steady and meta-stable states providing information on a heterogeneous loss mechanism at a tip-surface junction.
Figure 14:
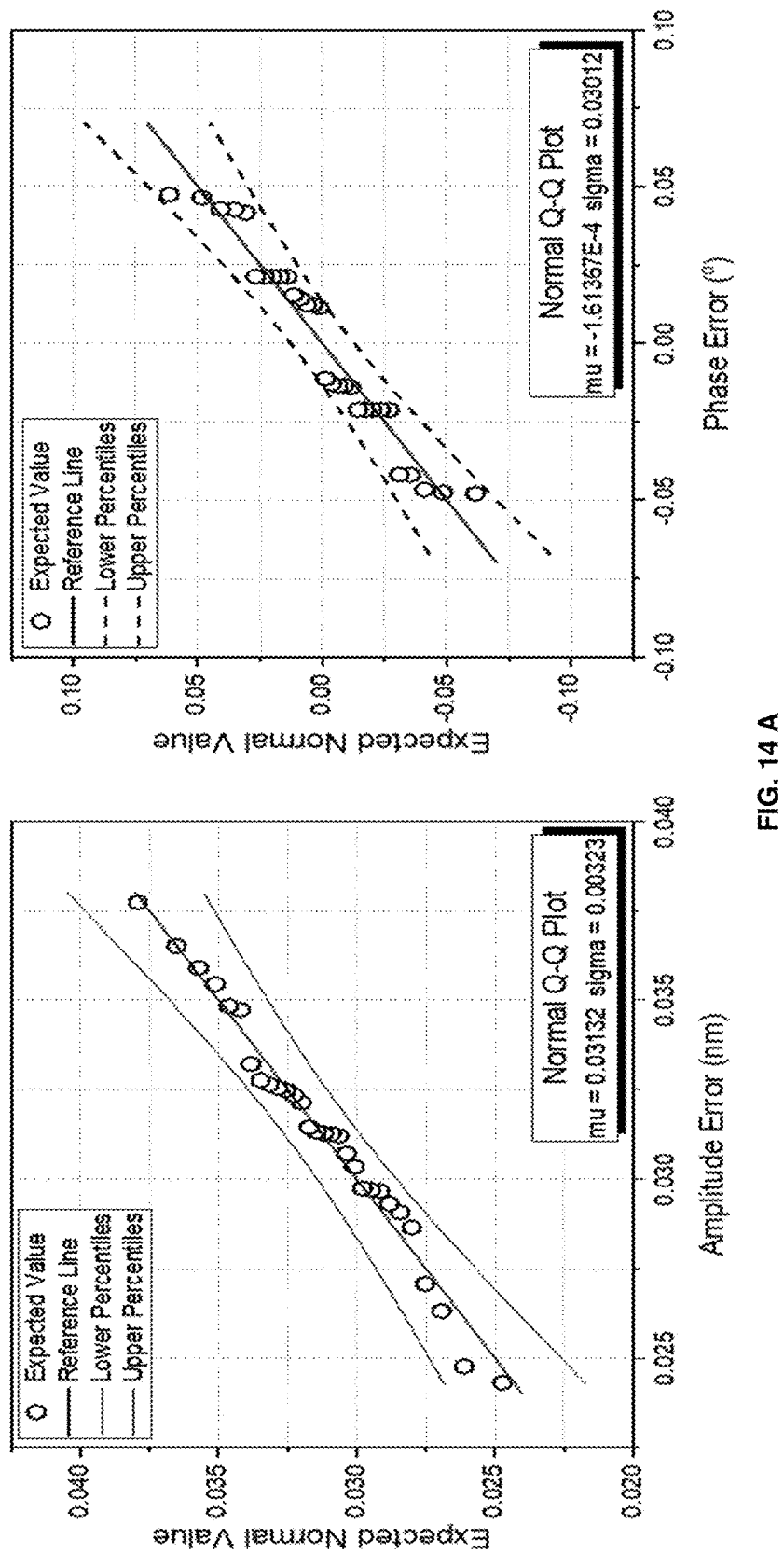
FIG. 14 (A) phase and amplitude error calibration Q-Q plots showing the mean and the respective standard deviations ((A), left and right pane). Relative error values are at least one order of magnitude smaller than the measured Phase-contrast $\Delta\phi$ and oscillation amplitudes A. (B): Shows the random nature of appearance of amplitude and phase errors, hence noise decorrelated (left pane); and Voltage calibration vs cantilever deflection used in amplitude and deformation estimations (right pane).
Figure 14:
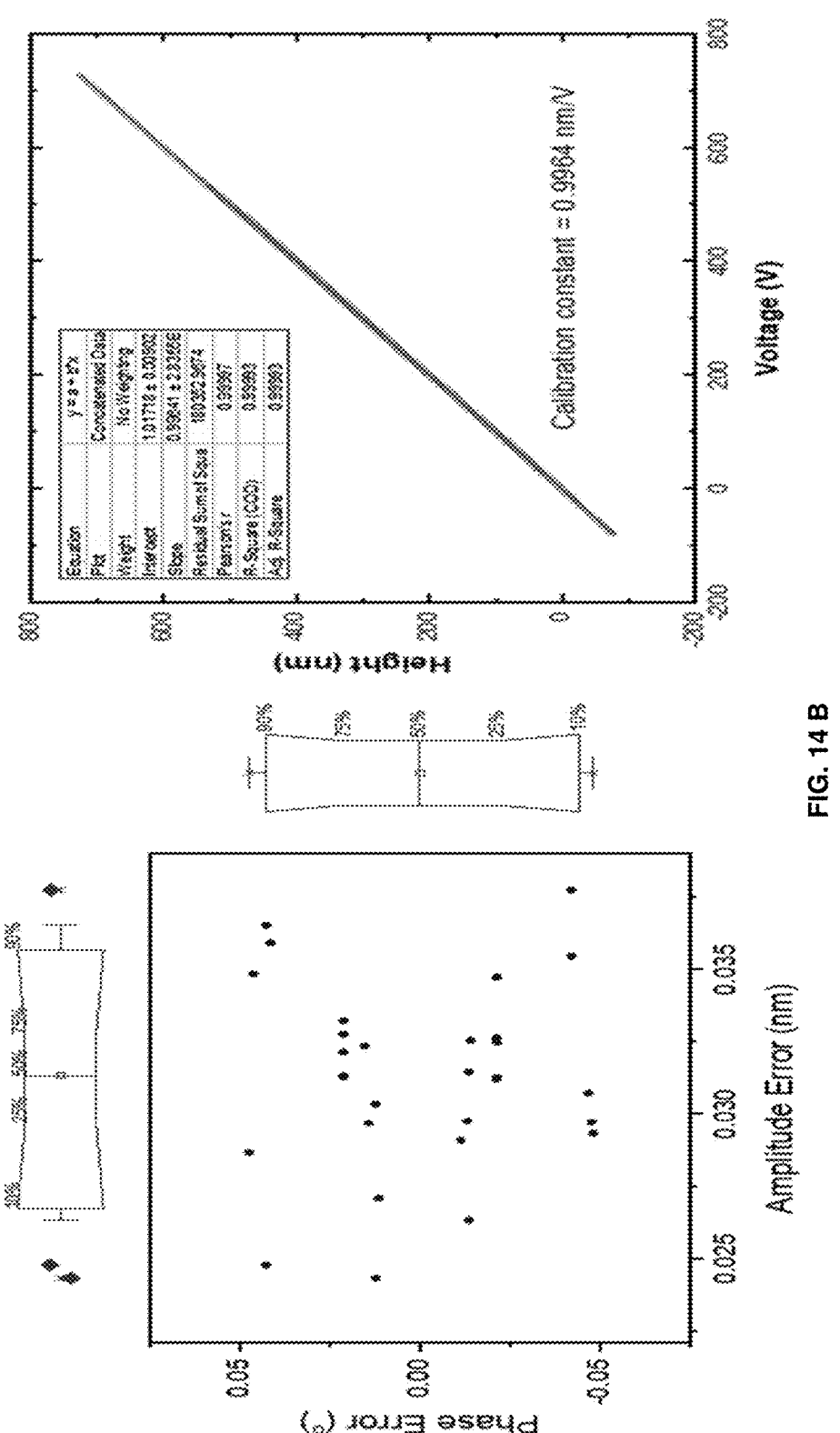

The primary ingredient of the theoretical consideration is the potential $U(\Delta\phi)$ defining the energy of the states, having minima at $\Delta\phi_+$ and $\Delta\phi_-$ with a potential barrier $\Delta E_{fluc}$ separating the two states as illustrated in FIG. 6. It must be noted here, the potential barrier can consist of multiple transitional levels each having its own characteristics relaxation timescale that would account for a phase delay $\Delta\phi$ proportional to the bandwidth product $\Delta_\omega \cdot \tau_c$. The energy $\Delta E_{osc}$ required to attain the minima at $\Delta\phi_+$ and $\Delta\phi_-$ appear from the losses in the driven oscillatory dynamics that are above the thermal noise potential $E_{noise}$. The operational parameters in the experiments were set to ensure that the deformations $\Delta a$ that result in the $\Delta\phi$ distributions in the first place, were greater than the noise equivalent amplitude $$A_{noise} = \sqrt{\frac{k_B T}{k}} \approx 1.2 \ pm$$

which correspond to $E_{noise} \sim 10^{-23}$ J. Error calibration analysis relevant to the present experiments are provided in FIG. 14 of Example 2, section E. Independent of the exact functional form of the chosen $U(\Delta\phi)$, equation (3) describes the fluctuation-induced hopping probability among the metastable and equilibrium states centered at $\Delta\phi_+$ and $\Delta\phi_-$. Under very general assumptions equation (3) may be re-casted in the Gibbs measure form as $$\Delta E(\phi^*) = \frac{E_{\phi^*}}{E_0} = \exp\left(-\frac{\Delta E_{fluc}}{\Delta E_{osc}} \cdot \phi^*\right) \tag{4}$$

where $\Delta E_{fluc}$ represents the energy losses from the transitional probabilities corresponding to $P(\Delta\phi_-)$ appearing from interactions at the interface heterogeneities. This probability density $P(\Delta\phi_-)$ signifies the relative strength of transitional loss pathways. $\Delta E_{osc}$ on the other hand, corresponds to energy losses from the oscillatory dynamics with $P(\Delta\phi_+)$ signifying the probability density of achieving the equilibrium states while $E_0$ accounts for the average energy conserved.

Figure 7:
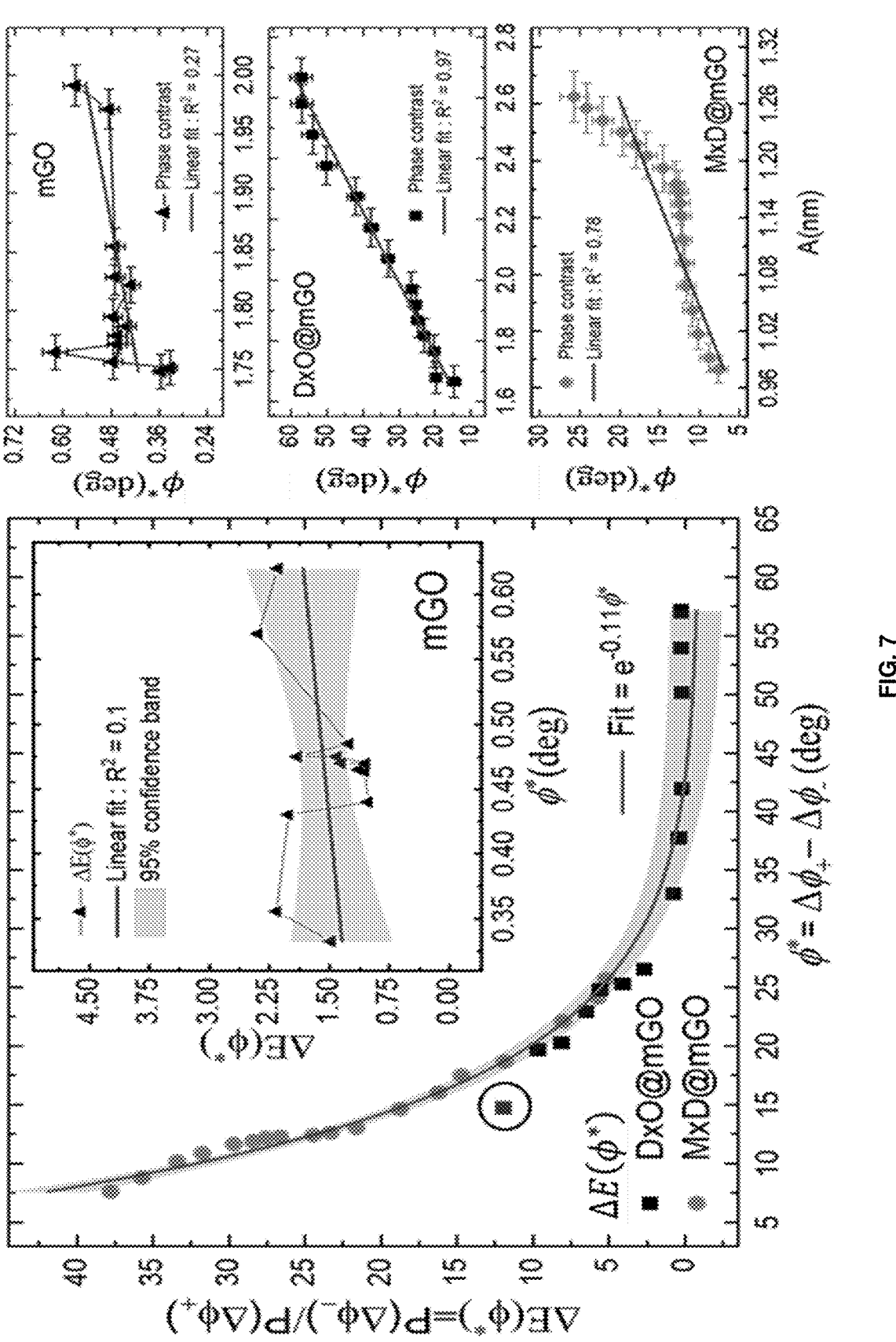
FIG. 7 depicts the ratio of fluctuational probability density as a function of phase contrast $\phi^*$. The shaded area represents 95% confidence bands of the fits. The error bars in the probability estimates are in the order of less than 1%. The encircled square denotes a sole outlier of the experimental fit. Right pane highlights the evolution of apparent phase-contrast as a function of the tapping amplitudes. The non-linear behavior observed for DxO and MxD are indicative of inelastic deviations yielding to viscous relaxations at the heterogeneities.

The rationale behind recasting equation (3) in the generalized Gibbs measure form (Sec F) is the assumption that fluctuations from interactions at the interface heterogeneities become more probable in the limit $\Delta\phi \rightarrow 0$ at small amplitudes A and smaller equilibrium separations $z_c$. The fluctuational transitions augment the homogeneous energy losses centered at $\Delta\phi_+$ with an additional phase lag probability centered at $\Delta\phi_-$ reflecting the overall phase contrast $\phi^* = \Delta\phi_- - \Delta\phi_-$ in the present phase images (FIG. 2). The appearing $\Delta\phi_-$ and $\Delta\phi_-$ distribution peaks respectively correspond to the faster resonance and the slower resonance broadening timescale affected by the tip-surface interactions. Equation (4) agrees with the present experimental results for DxO@mGO and MxD@mGO normalized on the same scale, showing that the ratio of the fluctuational probability transitions to the equilibrium losses $$\frac{P(\Delta\phi_-)}{P(\Delta\phi_+)}$$

in the limit $\Delta\phi \rightarrow 0$ is exponentially related to the apparent phase-contrast (Vas shown in FIG. 7. As evident from this result, the cantilever tip is more susceptible to experience fluctuational losses at low A near-contact imaging, though yielding a smaller net phase contrast $\phi^*$. The molecular clusters of DxO and MxD on mGO indeed were expected to exhibit surface heterogeneities, as the results indicated, owing to its viscoelastic properties which pronounce transitional losses from viscous tip-surface interactions. The probability transition ratio $$\frac{P(\Delta\phi_-)}{P(\Delta\phi_+)}$$

(FIG. 7 left pane) provides the Gibbs measure partitioning of heterogeneous losses over homogeneous losses. mGO on the other hand undergo predominant elastic deformation and thus the heterogeneous effects are non-significant at the probing frequency. The transition ratio curve thus flattens out to an extent of small oscillations around a linear dependence in $\phi^*$ (FIG. 7 left pane inset).

Conclusions on ultra-light tapping mode AFM: Exploiting the fluctuational regime in TM-AFM with ultra-light tapping facilitates the following:

(i) Phase imaging with ultra-light tapping (A<3 nm) can discern both heterogeneous and homogeneous loss mechanisms as unique probability distributions centered at $\Delta\phi_-$ and $\Delta\phi_+$, but at the cost of low apparent phase-contrast $\phi^* = \Delta\phi_- - \Delta\phi_-\phi^*$ marks out the separation of the characteristic relaxation timescales that describe the underlying transitional dynamics.

(ii) Homogeneous losses stem from hopping between equilibrium states while heterogeneous losses originate from fluctuational transitions to metastable states off equilibrium. The latter dominate at small A but are averaged out in high amplitude hard tapping. Fast transition between equilibrium states at high A approximates monostable dynamics.

(iii) Despite fluctuations at small A, a unique steady state irrespective of its evolving tip-surface potential $U(\Delta\phi)$ in $\Delta\phi$ is exhibited, and is approached throughout the transitional dynamics following Gibbs measure of energy partitioning. The unique steady state denotes the metastable relaxation state in case of soft-matter.

(iv) The exponential fitting coefficient signifies a dimensionless damping parameter characterizing the underlying fluctuational dynamics off equilibrium. The present obtained experimental fit value=0.11 on imaging DxO@mGO and MxD@mGO (FIG. 7) matches well to a generalized theoretical estimate of damping coefficient of order $10^{-1}$ that considers similar stochastic dynamics of oscillating systems.

Example 1B—Application: Transitional
Phase-Contrast at Contact Resonance Enhanced
AFM-IR can Decouple Thermal Loss Pathways in
AFM-IR The relevance of the crossover regime and the underlying transitional dynamics as argued above is important in studying and understanding thermal dissipative pathways in contact resonance enhanced AFM-IR. Resonance enhanced AFM-IR is emerging as a tool in characterizing compositional heterogeneities in addition to mechanical heterogeneities in bio-interfaces. This has been attempted with extracellular vesicles to aid with early diagnosis of diseases, miscibility of pharmaceutical blends for therapeutic drug delivery applications and with the composition of extra-cellular-matrix at the nanoscale boundaries of cells to study cell kinetics and cell signaling. Correct interpretation of the heterogeneities is important, and this is where the present fluctuational understanding as argued above may be applied.

Pseudo ultra-light AFM-IR tapping mode: In contact resonance enhanced AFM-IR, while a tip is scanned in the contact mode, a focused IR beam is simultaneously pulsed at the tip-surface junction. The IR-induced contact resonance enhancement introduces a pseudo ultra-light tapping mode.

Operationally, the contact resonance amplitude is being changed by varying the contact setpoint, so that the dynamics of the cantilever emulates ultra-light tapping, with contact resonance amplitudes in the order 1 Å to 1 nm. In the presence of the pulsed IR beam, the cantilever tuning operation is completed, and the tuned frequency is set as the operational contact resonance frequency and the pulsing frequency of the IR beam. The system collects data at this fixed frequency, employing lock-in amplifier hardware. AFM-IR operation is contact mode in principle. When the IR beam is pulsed at the tip-surface junction, contact resonance is excited, with amplitudes that fall within the ultra-light tapping regime, and is thus referred to herein as a pseudo-ultra-light tapping mode. The pseudo ultra-light tapping mode regime of operation utilizes the following steps:

Step 1—Regular contact mode scanning was completed, and a location of interest was selected (having a feature whose IR absorption characteristics is desired to be known). The tip is moved to that location (XY) on the scanned image, while the tip is still in engage conditions.

Step 2—At the contact mode engage conditions, system auto tuning was performed to determine the contact resonance frequency in presence of IR (infrared) beam focused at the tip-surface junction. This is a standard feature available in existing AFM-IR systems. The IR pulsing rate was tuned to the contact resonance harmonic mode of the tip. The tip was oscillated at the contact resonating frequency with amplitudes in the order of 1 Å to 1 nm emulating a pseudo ultra-light tapping mode.

Step 3—The contact resonance amplitude was optimized as a function of the contact set-point that ensured that the contact resonance amplitude was within a fluctuational ultra-light tapping regime.

In an embodiment, the obtained IR contrast images from the scans in the form of IR Amplitude contrast and IR-Phase contrast was obtained as a function of multiple contact set-points that interpreted the thermal energy loss mechanism at the tip-surface junctions.

Physically, at the right IR wavelength, absorption of IR energy resonantly excites vibrational states of molecules on the surface at the tip-surface junction. Non-radiative decay of these excited states causes thermal changes at the tip junction through multi-phonon relaxation processes. The locally generated heat needs to dissipate at the nanoscale junction and there arises two possible routes: (i) a long-timescale conduction pathway and (ii) a faster dynamic dissipation route via radiative coupling.

Typically, in response to the long-timescale conduction pathway, the cantilever bends on heating generating a steady-state deflection giving IR-contrast as contact resonance (CR) amplitude (CR-Amplitude in FIGS. 8a and 8b). The dynamic dissipation route (fast timescale) on the other hand, manifest in the underlying CR dynamics. Details on optimization steps for the AFM-IR experiments is provided in the methods section. Essentially, thermal fluctuations at the tip-surface junction from IR absorption instigated the probe cantilever to oscillate in a pseudo tapping mode with the active drive being at the tip of the cantilever. This established a pseudo ultra-light AFM-IR tapping mode, providing the AFM-IR images.

Radiative phonons instigated from the thermal fluctuations at the tip-junction have a finite probability to couple to acoustic phonon states of the probe tip (FIG. 9a), the tip-surface being a very low thermal mass junction. Such phonon couplings may promote transitional fluctuations in the underlying CR dynamics (FIG. 9b). The mechanism surrounding the energy dissipation probability from fluctuational transitions is illustrated in FIG. 9. Typically, radiative phonons relax over timescales that are in the order of ns, much faster compared to the contact resonance timescale in the order of few pis. Thus, vide discussions of interaction timescales before, phonon coupling would result in an inherent fast interaction timescale in the underlying dynamics with respect to IR drive frequency. An apparent $+\Delta\phi$ phase shift would result, giving a phase-contrast image (CR-Phase in FIGS. 8a and 8b). The fluctuational phase characteristics as a function of contact resonance amplitude are shown in FIGS. 9d and 9e.

Surface phonon excitations by IR and their subsequent coupling to acoustic phonon states of the cantilever perturb the contact potential gradient. This enhances the probability transition into the transitional states from minute changes in heat. The modification of tip-surface potential function as shown in FIG. 9b in principle leads to multiple relaxation timescales. This are reflected as an apparent broadening of the fluctuational regime (FIG. 9b). The interplay of these multiple timescales is reflected in the apparent skewness of the phase lag distributions (FIGS. 9d and 9e). In principle, following equation (3), the net dissipated energy is proportional to the standard deviation of the phase lag fluctuations. The slowest timescale being the rate determining step of the underlying fluctuational dynamics, the effective phase contrast $\phi^*$ becomes the harmonic mean of the asymmetric Gaussian distribution fits (FIGS. 9d and 9e) and are plotted in FIG. 9c inset. An apparent skewness towards $+\Delta\phi$ was evident in both DxO and MxD molecules due to inherent viscous and compositional heterogeneities. Such a behavior was absent in case of bare mGO as detailed in FIG. 15 along with IR contact resonance enhanced dynamics.

In one or more embodiments of the herein described ultra-light tapping method, exploitation of the fluctuational transitions may thus be important in determining surface mechanical and chemical heterogeneities of pharmaceutical blends with relevance to drug delivery and therapeutic applications.

For example, and with reference to FIG. 20 to FIG. 24, the decoupling of the heterogeneous loss mechanism from the homogenous losses at the nanoscale heterogeneities generated two different phase-contrast images. In one or more embodiments, this may be implemented as a mathematical computational step employing the theoretical frame-work developed and described herein to decouple the heterogeneous (Lorentzian fit) and the homogeneous (Gaussian fit) phase components (shown in FIG. 20 to FIG. 24). This enabled generation of composite dissipation images considering both the heterogenous and homogenous phase-contrast images as independent entities, and using a mathematic routine that correctly interpreted net energy dissipated as a function of appearing phase-contrasts. The intricate energy loss contour patterns (color scale in units of energy $10^{-18}$ J) generated by decoupling the loss components allowed for the highlighting of contours of higher energy losses (viscous losses) over locations where energy losses were negligible (more elastic storage). The dissipation derivative image accentuated the local heterogeneities. In one or more embodiments, this may be implemented in software to generate the composite images providing an additional tool to researchers working with biological and soft-matter.

A higher resolvability of the noise and contact resonance amplitudes and exploitation of higher contact harmonic modes may prove beneficial in nanoscale imaging of phonon density of states from surface heterogeneities. High resolution A distributions at heterogeneous bio-interfaces of DNA, proteins, cells and tissues augmented via CR enhanced AFM-IR contrast signatures, may provide insights on mechanical cues that bio-systems adopt to bring about irreversible evolutionary changes.

Example 1B—Methods (a) Materials—Doxorubicin (DxO) and Minoxidil (MxD) drug clusters on multilayered Graphene Oxide (mGO) (DxO@mGO and MxD@mGO, respectively) were prepared by known methods. Before each run samples were dried, and AFM was conducted in continuous dry nitrogen environment. A comparative result of DxO@Si is provided in Example 2, section H—small and high amplitude tapping highlighting the multi-stage phase distribution response. In the present experiments, the tip-radius of the AFM probes were in the order of ~12 nm. This limited imaging DxO and MxD clusters of roughly 8-15 molecules with intercalated water in the present case.

(b) Equipment—Bruker's ANASYS Nano IR2 system was used to run experiments, though other AFM systems would have been suitable. The tapping mode AFM images were obtained with soft tapping mode-PR-EX-TnIR-A probe cantilevers supplied by Bruker. Low amplitude runs within the fluctuational regime were optimized in steps starting with high amplitude tapping $A_0$ in the order of 10-12 nm till cantilever dynamics stabilize to give decent overlap of trace and retrace plots every scan. Subsequently, $A_0$ was brought down to the operational free amplitudes as annotated in FIG. 2 to achieve desired ultra-light tapping at amplitudes A in the order of 1-2 nm. Low damping at the operational small A gave control over the dynamics to navigate the transitional excursions about the steady state as highlighted in FIG. 1. Setpoint amplitude was similarly optimized from low-high to obtain clean scans via overlap of trace and retrace scans. Images were captured with alternate low and high amplitude setpoint $A_{sp}$ following bisection rule to negate the charge saturation effects at near-contact closest separations of tip and sample. The representative frequency response characteristics of the tapping mode cantilevers used in the present analysis of mGO, DxO@mGO and MxD@mGO data are shown in Example 2, section I. Multiple scans were conducted at each optimized setpoint to ensure minimization of drift and artifacts, though at the cost of low throughput.

Figure 8:
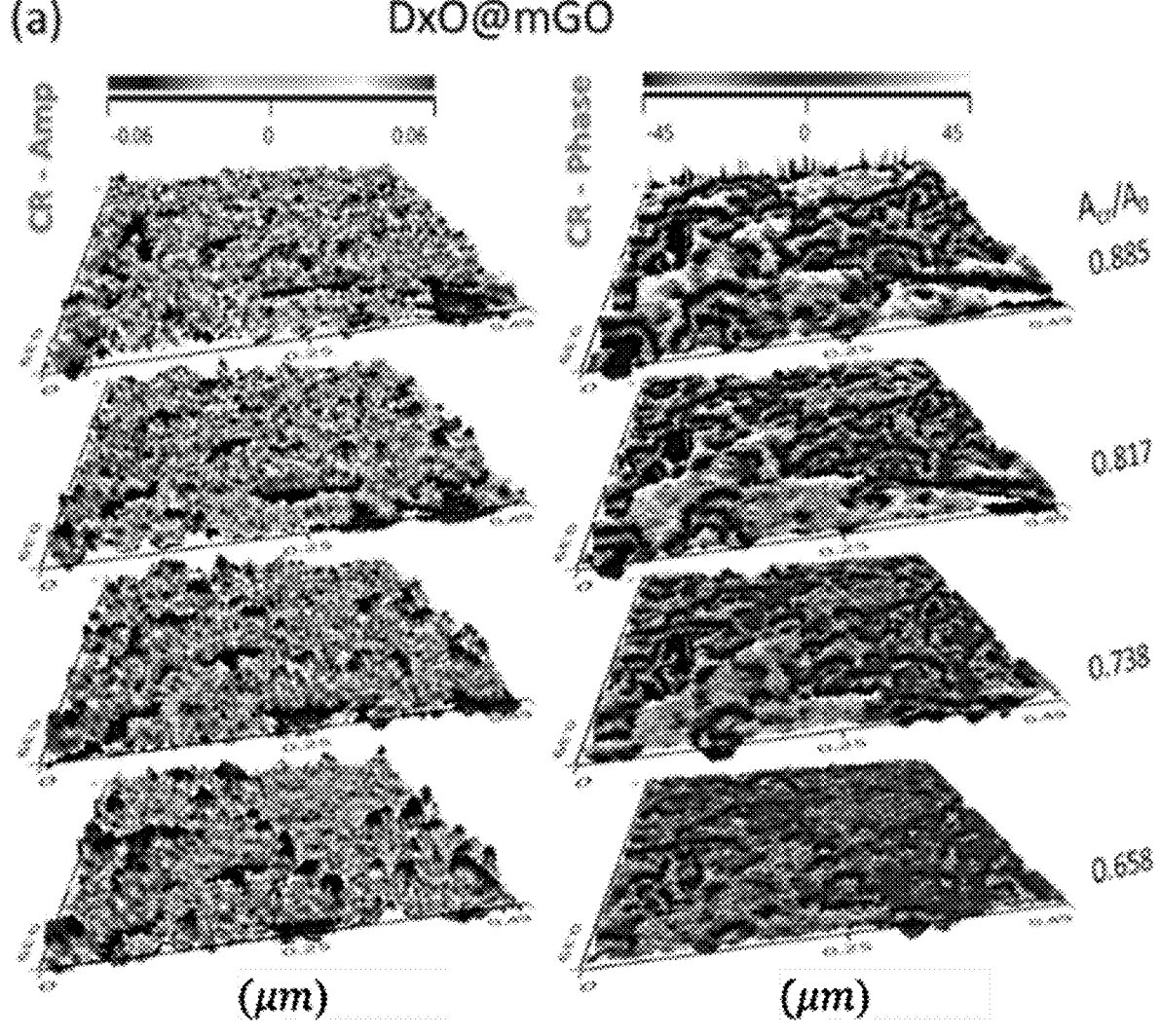
FIG. 8 depicts contact resonance IR amplitude contrast (left) and phase contrast (right) variations with setpoint @1416 cm$^{-1}$ on (a) DxO@mGO and (b) @1455 cm$^{-1}$ on MxD@mGO. The long-timescale conduction dissipation path was measured from the cantilever deflection as IR amplitude contrast (FIGS. 8a and 8b left pane; CR-Amp) while the transitional dissipation path was measured from resonance fluctuations from the phase signal locked in at the contact resonance IR pulsing frequency (FIGS. 8a and 8b right pane; CR-Phase). DxO had an IR absorbance peak at 1416 cm$^{-1}$ while MxD had an absorption peak at 1455 cm$^{-1}$. The IR peak observed at 1416 cm$^{-1}$ for DxO@mGO was a representative signature of the vibration modes of skeletal rings of a DxO molecule (4 rings per molecule). The 1455 cm$^{-1}$ peak of for MxD@mGO was attributed to the vibration mode corresponding to aromatic C=C stretch (3 bonds per molecule). In contrast the generated IR-contrast and phase lag contrast in case of mGO showed no variations (FIG. 15) as a function of contact setpoint or its equivalent $A_{cr}/A_0$, where $A_0$ in this case was the contact mode mean deflection and $A_{cr}$ was the contact resonance amplitude at 100% IR power. Contact resonance characteristics relevant to the experiments were shown in FIG. 15 (bottom right panel). DxO and MxD clusters on the other hand had appreciable IR absorbance and were reflected in the IR and phase contrast images. Essentially IR-contrast (CR-Amplitude) and phase-contrast (CR-Phase) were complementary—locations having higher long-timescale dissipation reflect lesser dissipation by transitional path and vice-versa. These were more evident in the phase contrast probability distributions (FIGS. 9d and 9e) showing an increase in phase contrast as a function of the contact mode setpoint in case of DxO@mGO and MxD@mGO, respectively. mGO on the other hand did not show any variation since the contact resonance was not initiated.
Figure 8:
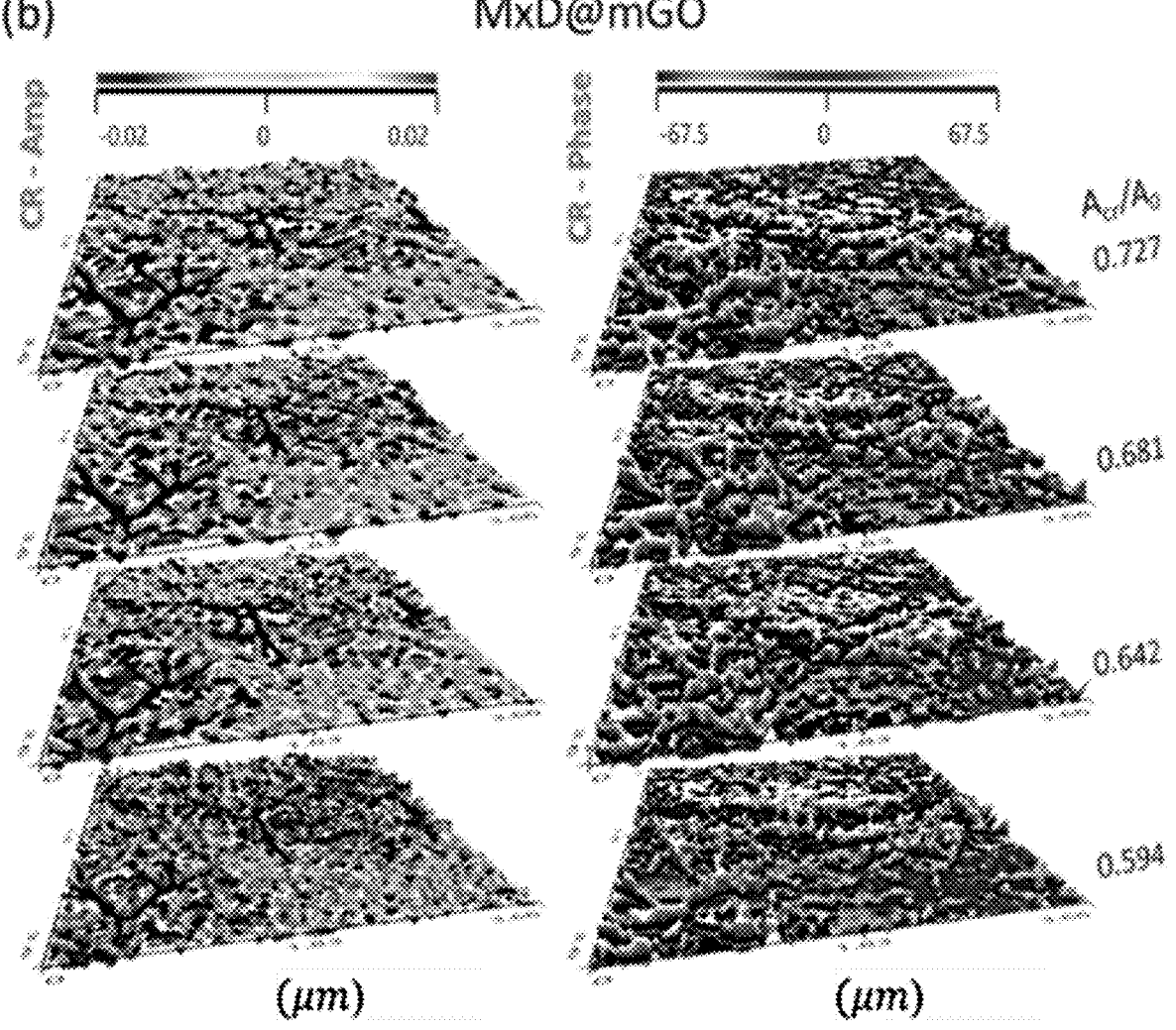
Figure 9:
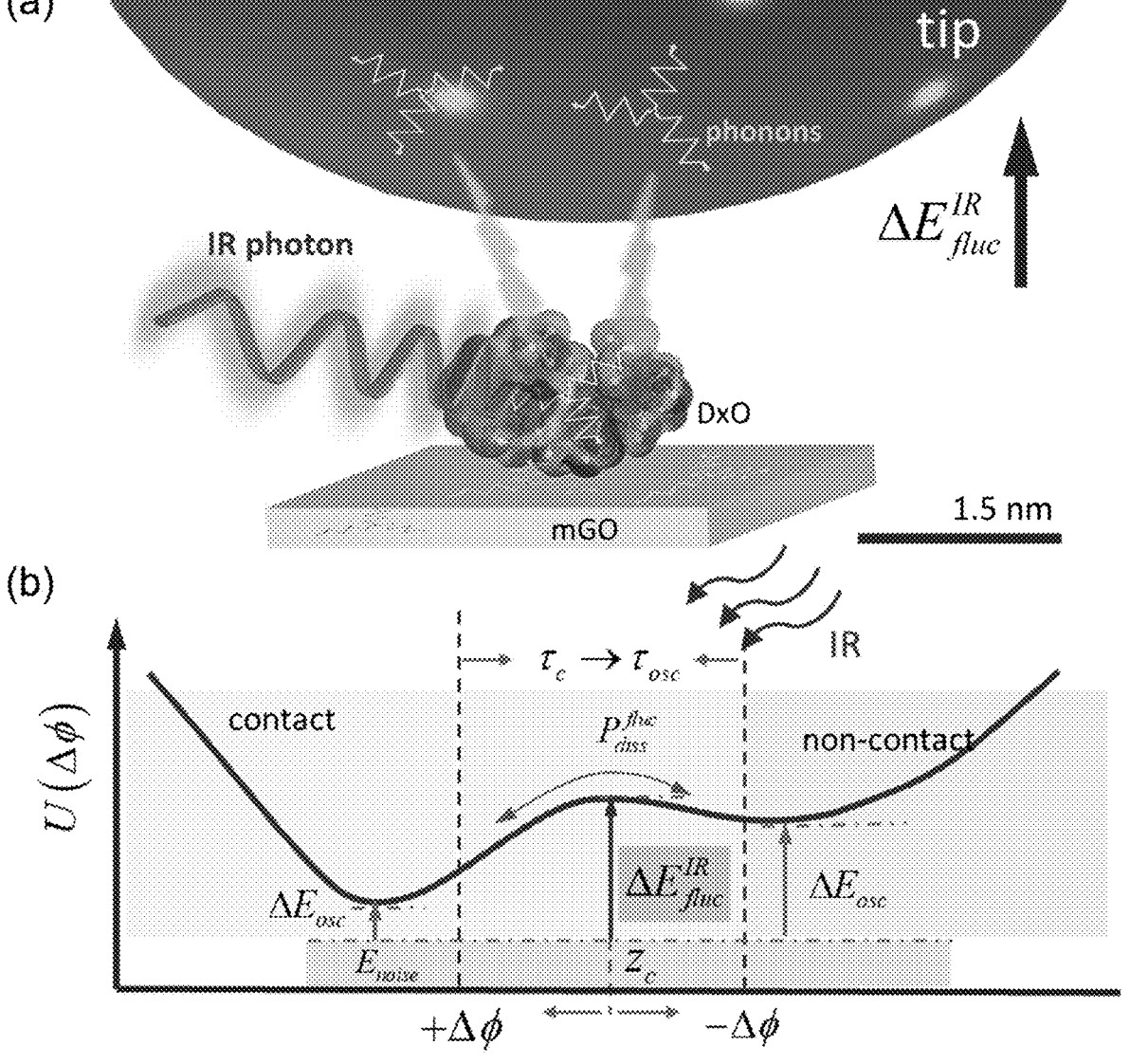
FIG. 9 depicts (a) Illustration of IR induced fluctuational enhancement. (b) describes the change in interaction potential function as a function of external IR excitation that brings about higher fluctuational probability transitions (c) Energy dissipation probability as a function of phase contrast, the gray areas representing 98% confidence bands; Insets depict apparent phase-contrast as function of the CR-Amplitude ratios. (d) and (e) show IR phase-contrast characteristics in DxO@mGO and MxD@mGO, respectively.
Figure 9:
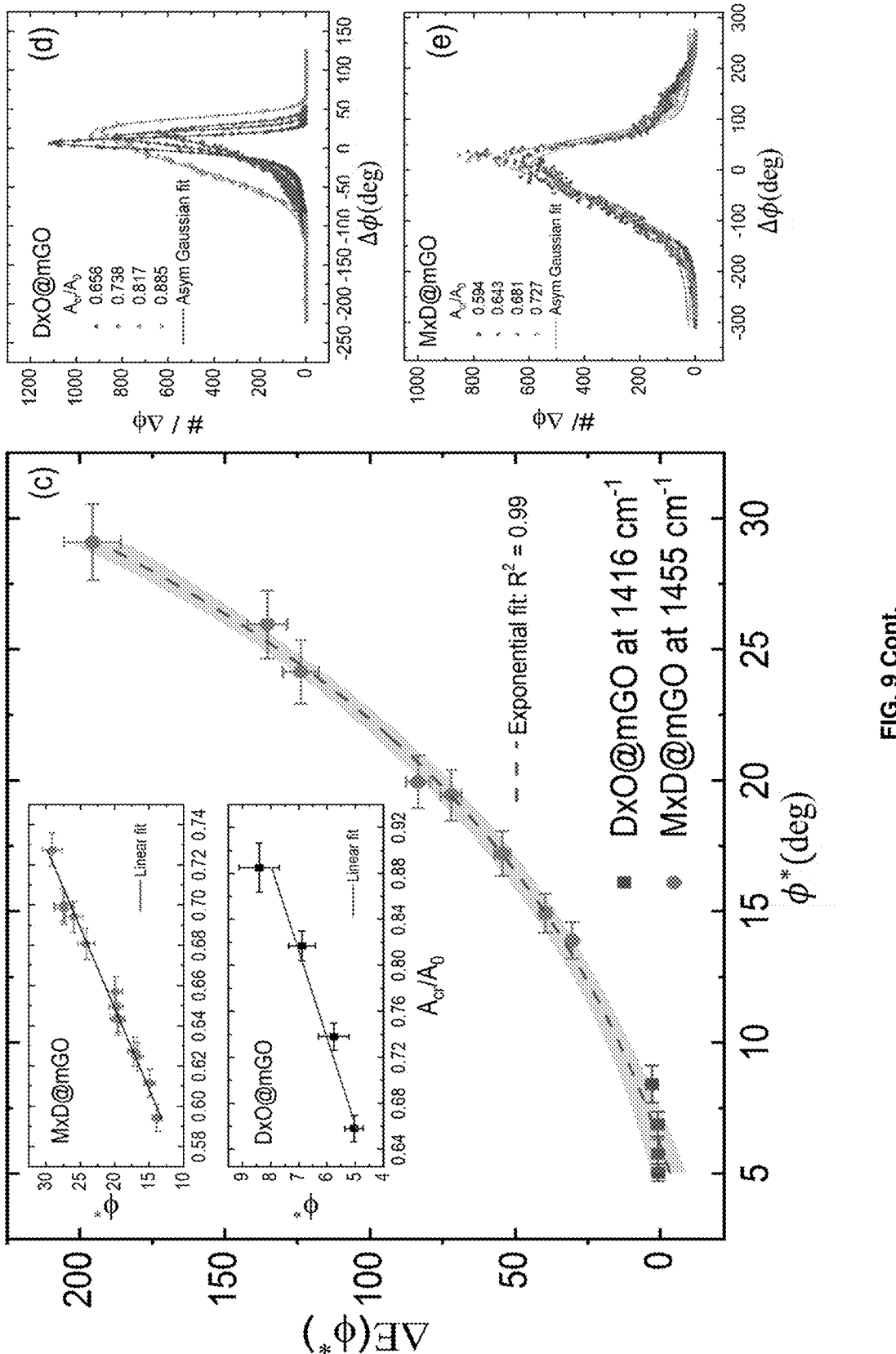
Figure 15:
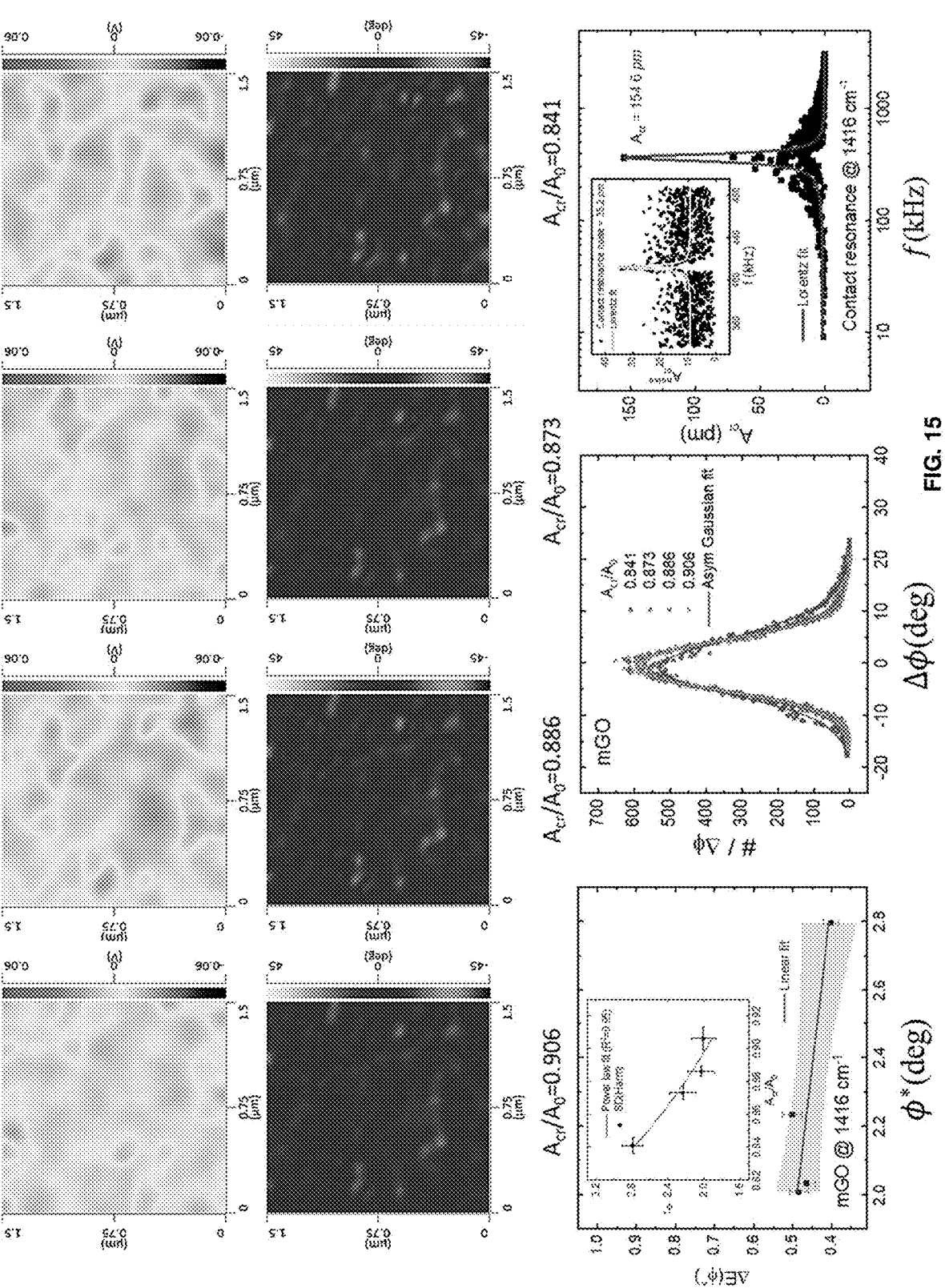
FIG. 15 depicts observed IR-contrast and phase-contrast as a function of contact resonance amplitudes $A_{cr}$ that is in the order of 35.2 μm. Axis units of left-hand contrast images are (μm, μm, V), and axis units of right-hand contrast images are (μm, μm, deg). Bottom left pane: Explains the ratio of the heterogenous to homogenous energy losses vs the apparent phase contrast as derived from the phase histograms (Bottom middle pane) using the theoretical considerations described herein. Phase-contrast essentially originates from the contact resonance noise as shown in bottom right pane inset. On the contrary phase-contrast as observed in the case of DxO and MxD at 1416 cm$^{-1}$ and 1455 cm$^{-1}$, respectively, originate from contact enhanced resonance amplitude that is the order of 154.6 μm ensuring oscillations in the crossover regime as described herein. Fluctuational transitions dominate in this pseudo tapping mode operational regime which has been discussed herein.

For the contact resonance enhanced AFM-IR experiments, the same Nano IR2 system was used in conjunction with a tunable quantum cascade IR laser from Pranalytica as the high-power IR source. Bruker's PR-EX-TnIR contact mode probes were used for getting the AFM-IR images. IR laser focus at the tip-surface junction was optimized with tip-engage to ascertain maximum contact resonance amplitude and establish the contact resonance enhanced operation for AFM-IR runs (FIG. 15 bottom right pane). The contact force was varied as a function of the contact mode setpoints at each run and the corresponding contact resonance enhanced amplitudes $A_{cr}$ were determined from the amplitude spectra collected as an independent data channel. The contact resonance amplitude $A_{cr}$ varied as a function of the contact mode setpoint set in an experiment, and a representative response spectrum ($1^{st}$ contact resonance enhanced mode) is shown in FIG. 15 bottom right pane. The mean contact mode deflection for a given amplitude setpoint was obtained as a function of the spring constant of the probe cantilever. This along with the contact resonance noise spectra (FIG. 15 bottom right pane inset) was used to determine the pseudo ultra-light tapping AFM-IR free amplitudes $A_0$. This corresponding AFM-IR response characteristics as a function of $$\frac{A_{cr}}{A_0}$$

were plotted as represented in the FIGS. 8, 9, and 15.

(c) Exploiting fluctuations by the correlation timescale $\tau_c$: To explain how fluctuations affect dynamics, it is convenient to start with the oscillator's susceptibility $X(\omega)$, which relate the average value of damped amplitude A as $\langle A \rangle = X(\omega) A_0 e^{-\omega\tau}$; with $\langle A \rangle = 0$ in the absence of external drive and $\omega$ the frequency on tip-surface approach from amplitude damping. To capture the transients, correct ensemble averaging over the timescale $\tau$ is important such that the correlation timescale $\tau_c$ of two successive data cycles at every pixel is finite. A linear amplitude damping on tip approach is a direct outcome of the oscillator's frequency dispersion $$\Delta_\omega = \langle [\Delta(\omega) - \langle \Delta(\omega) \rangle]^2 \rangle^{\frac{1}{2}}$$

accentuated by frequency fluctuations $\Delta(\omega)$ near resonance. The regime of interest is the condition where the reciprocal of correlation timescalet $\tau_c^{-1}$ becomes comparable to the standard deviation of the fluctuations $\Delta_\omega$. With the free amplitude frequency $\omega_0$, the largest frequency in the system, the rest of frequency scales $\Gamma$, $\Delta_\omega \cong \tau_c^{-1}$ and $|\delta\omega|$ satisfy the condition to be $\ll\omega$ near resonance. In effect, the frequency fluctuations $\Delta(\omega)$ becomes the parameter of significance dictating the linewidth of $X(\omega)$ near resonance $|\omega-\omega_0|\ll\omega$ when simultaneously $\Gamma$, $\tau_c^{-1}\cong\Delta_\omega$ is satisfied. In the limit when $\tau_c^{-1}$ is finite and non-zero, and $\tau_c\to\tau_{osc}(\tau_c>\tau_{osc}$ as in the present case), the energy interactions at the tip-surface junction becomes heterogeneous; leading to a Lorentzian linewidth spread in ImX ($\omega$) centered at $\omega-\Delta_\omega$ with no averaging of the eigenfrequency [Landau, L. D. & Lifshitz, E. M. *Statistical Physics. Statistical Physics* (Butterworth-Heinemann, 1980). doi:10.1142/3526]. Corresponding variations in amplitude of oscillation would then resolve as A+$\Delta$a with $\Delta$a being the standard deviation (Lorentzian width) of the normalized amplitude histogram obtained in an experiment for a particular $A_{sp}$. $\Delta$a essentially becomes the surface deformation at the interaction timescale of $\tau_c\to\tau_{osc}$ ($\tau_c>\tau_{osc}$) that is in the same order as $\tau_{surf}\cong10^2$-$10^4$ ns [Ollila, O. H. S., Heikkinen, H. A. & Iwaï, H. Rotational Dynamics of Proteins from Spin Relaxation Times and Molecular Dynamics Simulations. *J. Phys. Chem. B* 122, 6559-6569 (2018)]. In the opposite limit $\tau_c \rightarrow \tau_{osc}$ however, the oscillator cannot resolve the frequency variations and are thus averaged out giving $\langle \Delta_\omega \rangle \cong 0$. The linewidth shape of ImX ($\omega$) remains a Lorentzian $\Gamma$ centered at $\omega - \langle \Delta_\omega \rangle$ with $\langle \Delta_\omega \rangle \cong 0$. The limit $\tau_c \rightarrow \tau_{osc}$ [Santos, S., Gadelrab, K. R., Souier, T., Stefancich, M. & Chiesa, M. Quantifying dissipative contributions in nanoscale interactions. *Nanoscale* 4, 792-800 (2012); Garcia, R. et al. Identification of nanoscale dissipation processes by dynamic atomic force microscopy. *Phys. Rev. Lett.* 97, 016103 (2006); Magonov, S. N., Elings, V. & Whangbo, M. H. Phase imaging and stiffness in tapping-mode atomic force microscopy. *Surf. Sci.* 375, (1997); Gadelrab, K. R., Santos, S. & Chiesa, M. Heterogeneous dissipation and size dependencies of dissipative processes in nanoscale interactions. *Langmuir* 29, 2200-2206 (2013)] has been the premise of hard tapping operation that satisfies equation (1) for both hard elastic and soft viscoelastic surfaces at higher tapping amplitudes. However, the data captured under such conditions, convey energetics that asymptotically tend to the steady state dynamics overlooking the fluctuations. The fluctuations near equilibrium are thus averaged out as explained, missing out the critical NE energetics of tip-surface interactions.

Example 2—Phase Contrast in Tapping Mode AFM: Exploiting Transient Dynamics to Deconvolute Dissipative Pathways with Application in Contact Resonance Enhanced AFM-IR Section A—Surface Deformations $\Delta a$ from the Amplitude Histogram Distributions See FIG. 10.

Section B—Phase-Contrast and Energy Dissipation Results of mGO Sample

With reference to FIG. 11, the phase distribution shows a predominant homogenous interaction behaviour similar to responses obtained for Dx0@mGO and MxD@mGO samples at high amplitude oscillations. Without wishing to be bound by theory, this may be from the fact that mGO is expected to exhibit predominantly elastic properties at the perturbation rate of ~300 kHz lattice spacings being in the order of few Å only. Thus even at low amplitude oscillations in the order of 1-2 nm that could be achieved in the present experimental realization, the microscopic relaxation scale remained oblivious to the underlying dynamics. The effective interaction time $\tau_c$, though was able to follow the oscillation timescale $\tau_{osc}$, it was still orders of magnitude slower compared to the inherent relaxation rate $\tau_{sur}$. Thus the microscopic relaxation processes approximately appear to be in equilibrium to the tip-interface interaction energetics leading to the single stage Boltzmann-like distributions.

Section C—Cumulative Density Fit Equation: To Decouple the Homogeneous and Heterogeneous Probability Densities Normalized cumulative density function (CDF) of the phase probability histograms of experimental results can be analysed using $$\Delta E_{dis}(\Delta \phi) = E_0 + \frac{normcdf(x_0, w_0, b_0)}{b_1 \left( \frac{1}{\pi} \tan^{-1} \left( \frac{x - x_1}{w_1} \right) + \frac{1}{2} \right)} \quad (1)$$

considering coupled homogenous and heterogenous loss mechanisms at an interface. Here, $$normcdf(x_0, w_0, b_0) = b_0 \int_{\phi_{min}}^{\phi_{max}} \frac{1}{\sqrt{2\pi} w_0} e^{-\frac{(x - x_0)^2}{2w_0^2}} dx$$

is the Gaussian cumulative density with center at $x_0$ and homogenous linewidth of $w_0$ and amplitude $b_0$. The parameter $b_0$ of the fitting function is the normalized energy span of homogenous transition. The denominator $$b_1 \left( \frac{1}{\pi} \tan^{-1} \left( \frac{x - x_1}{w_1} \right) + \frac{1}{2} \right)$$

in the fitting equation (1) represents the heterogeneous or Cauchy density function with center at $x_1$, heterogeneous linewidth of $w_1$ and the normalized energy span of heterogeneous transition from viscous interactions. The x-axis intercepts of the curves at $\Delta \phi = 0$ provides a proportional measure of the energy conserved $E_0$ in the dynamics. Representative theoretical fits at different setpoint amplitudes as a function of $A_{sp}/A_0$ using eq (1) for both mGO and mGO+DxO are shown below. All the fits have $R^2 > 099$.

Figure 12:
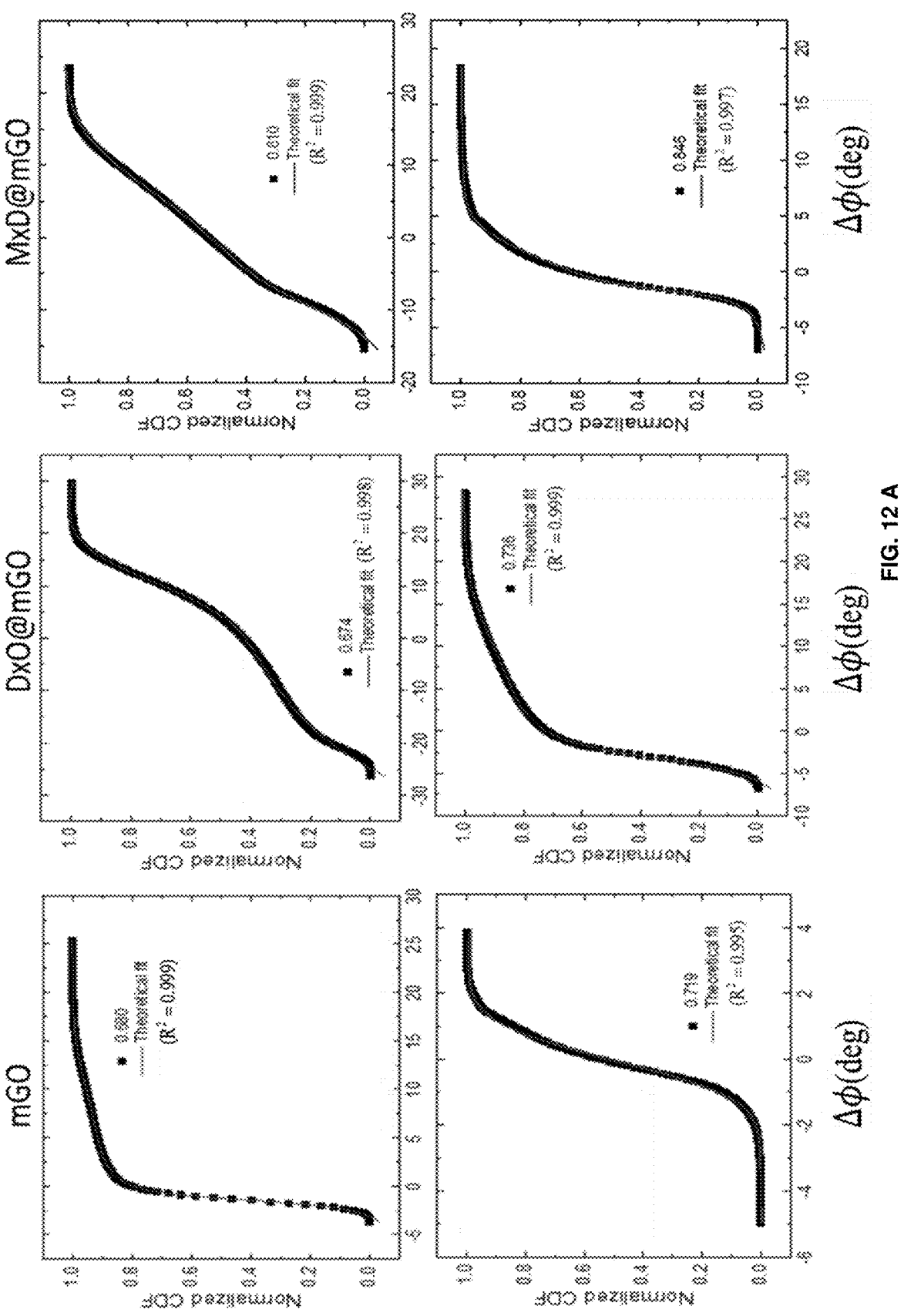
FIGS. 12A & B depict presentation of Cumulative Density Graph and theoretical fits of at respective $A_{sp}/A_0$ ratios.
Figure 12:
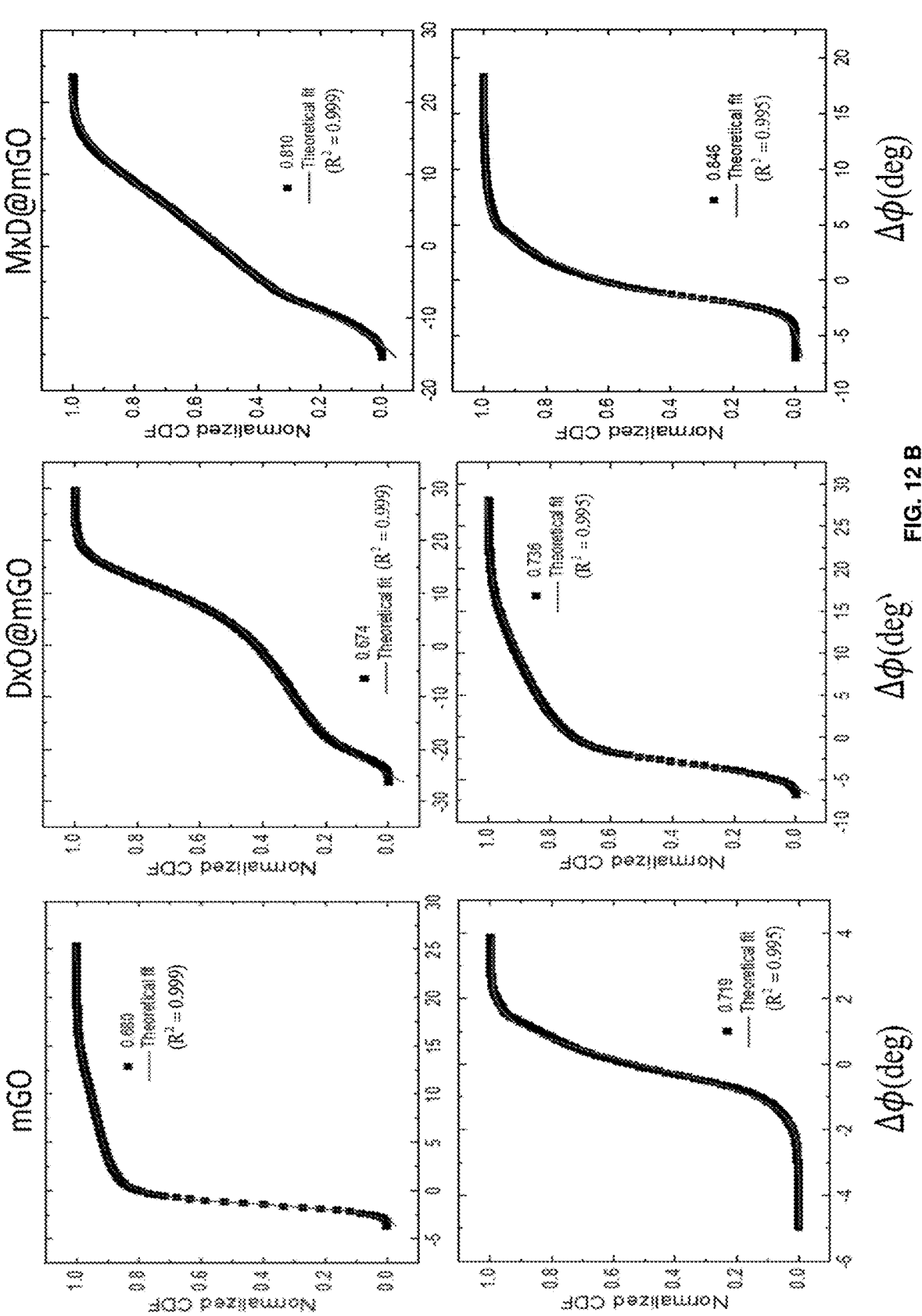

A sharp contrast stemming from the relative magnitudes of homogenous and heterogeneous losses is apparent in the distributions. The physical significance of the relative scales is explained above. See FIGS. 12A &B.

Figure 13:
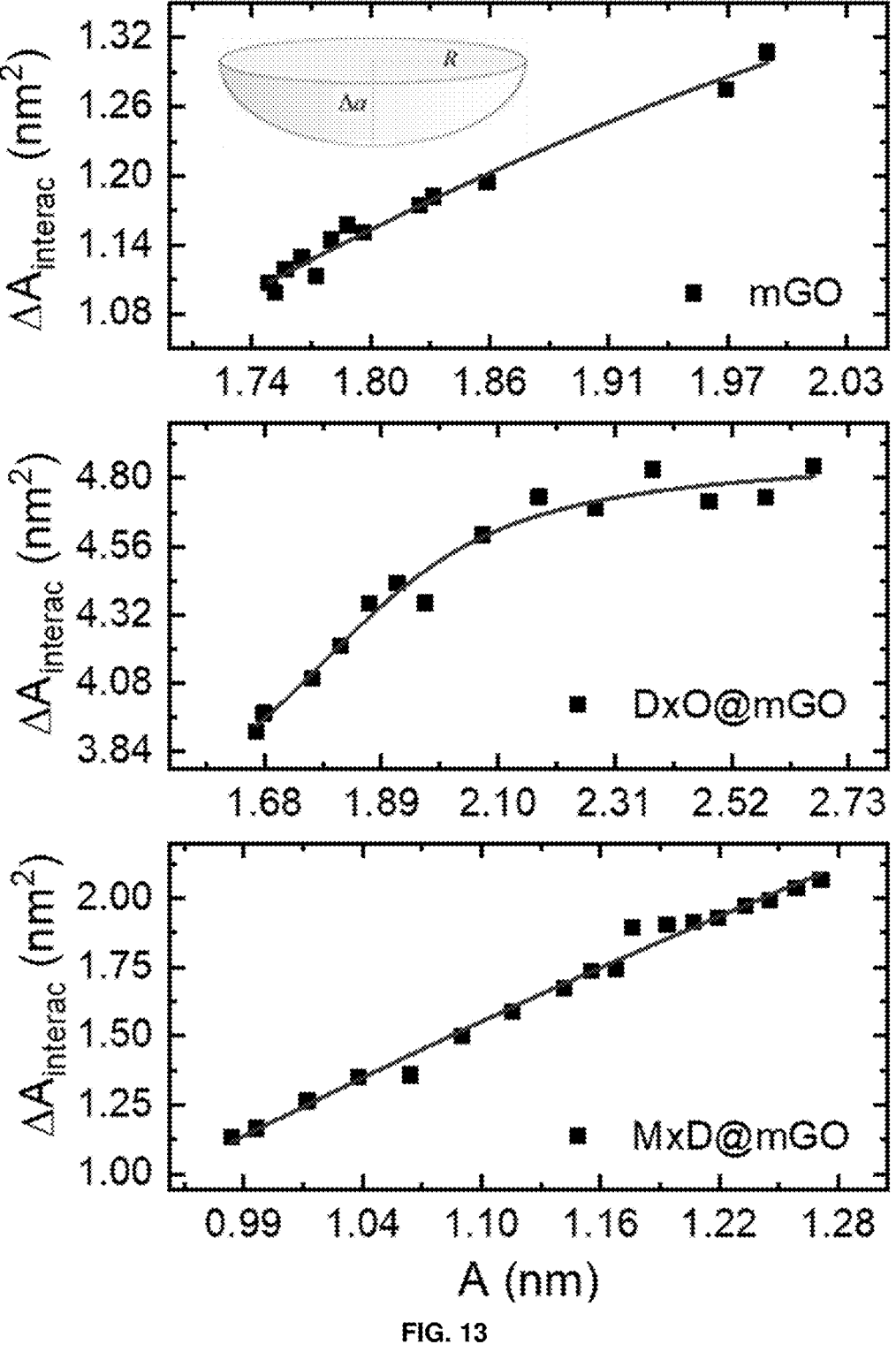
FIG. 13 effective tip-surface interaction area for mGO, DxO@mGO and MxD@mGO.

Section D—Tip-Surface Area of Interaction:

With reference to FIG. 13, the interaction area shows a non-linear or more specifically $2^{nd}$ order polynomial dependence on the damped amplitude A. The relative interaction area was expected to be higher for the soft-organic molecules on account of viscous deformation as was clear from the results of DxO@mGO and MxD@mGO. The interaction area for mGO was lowest in mGO since a higher elastic property prevented deformation at the small amplitude tip forces. The trend also suggested that the interaction area for MxD would be higher compared to DxO at the same relative probing amplitude. The corresponding viscous coefficient for MxD should be higher, which corroborated to the estimations as shown in FIG. 5. The relative scales of the interactions area vs the probing oscillation amplitude has deeper implications on the effective strain rate amplitudes necessary to correctly decode the elastic and viscous coefficients.

Section E—Voltage and Error Calibration:

See FIGS. 14A and B.

Section F—On the Consideration of Gibbs Measure and Its Implication in Resonance Dynamics:

It is posited herein that the probability p=P($\Delta \phi_-$)/P($\Delta \phi_+$) of the random hop to transient states is expected to be described by Gibbs measure, proportional to p=1/Z($/\beta$)·exp ($\Delta \Delta E_{fluc}$), where $\beta$ is a parameter having dimension of Energy$^{-1}$ and Z($\beta$) is a normalizing constant (partition function). Z($\beta$) is taken to be a slower varying function of $\beta$ compared to the exponent. The choice of Gibbs measure is appropriate here, as it is known to apply to a statistical ensemble of weak interactions near equilibrium as in our case of adiabatic crossover. Moreover, the applicability of Gibbs measure has been proven to systems under very general assumptions. It is thus appropriate to choose 1/$\beta$, having the dimension of energy, to be 1/$\beta$=b$\Delta E_{osc}$, with b a constant. In the present case, b is fitting exponential coefficient in the order of 10 [Landau, L. D. & Lifshitz, E. M. *Statistical Physics. Statistical Physics* (Butterworth-Heinemann, 1980). doi:10.1142/3526].

Section G—AFM-IR Results of mGO

See FIG. 15.

Figure 16:
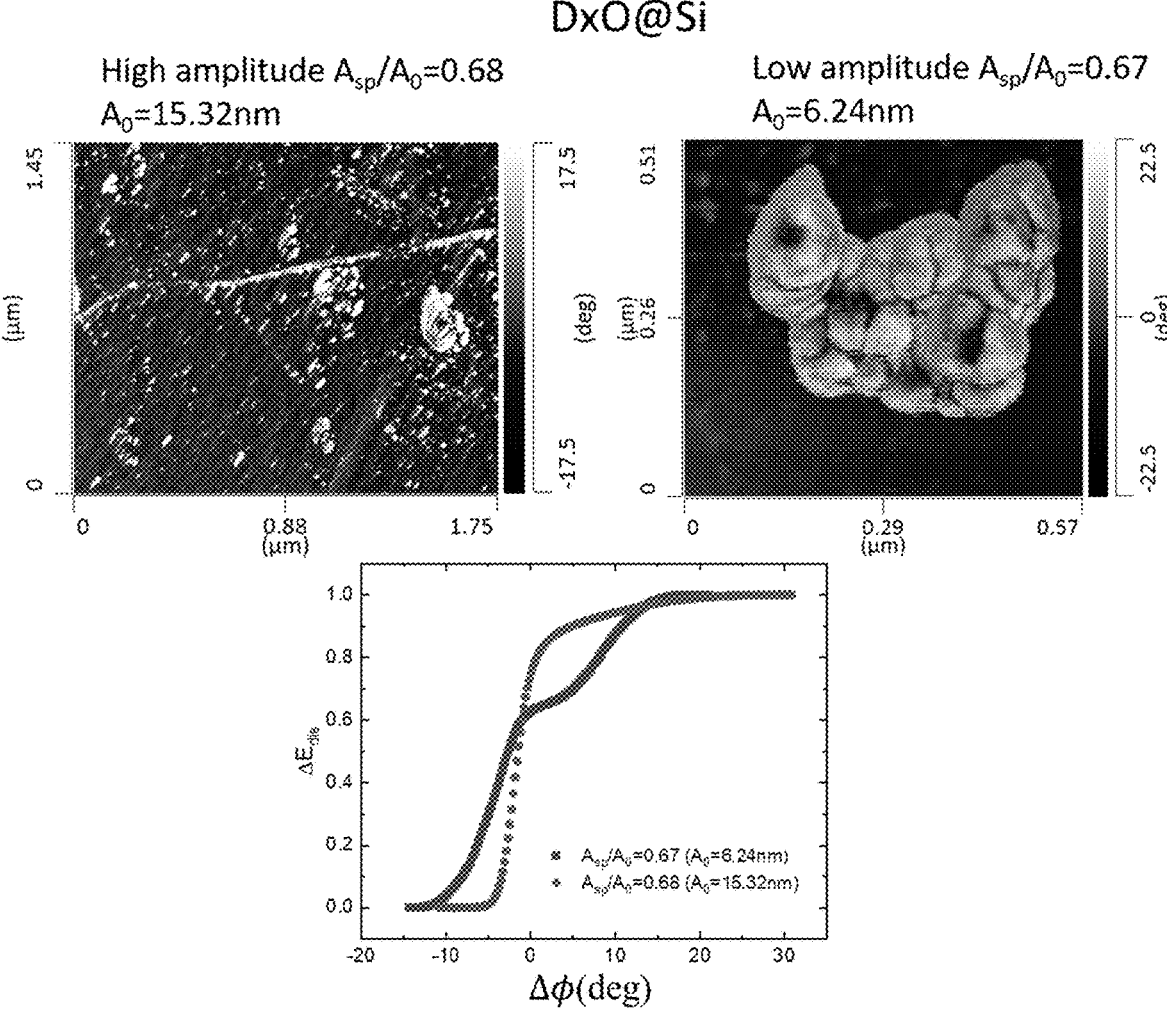
FIG. 16 depicts phase images and their cumulative density graphs at high and low amplitude tapping obtained in the case of DxO crystallized on a bare Si surface.

Section H—Comparison of Results Obtained in the Case of DxO@Si:

See FIG. 16. Appearance of the heterogeneous loss stage was evident in the case of low amplitude tapping in the form of a two-stage phase distribution (black squares). The phase distribution obtained for high amplitude tapping follows a single stage homogenous Boltzmann-like distribution signifying homogenous loss process only. This comparative representative data for DxO on Si asserts the remarks made above.

Section I—Frequency Responses and Determined Spring Constants Using Sader Model

Figure 17:
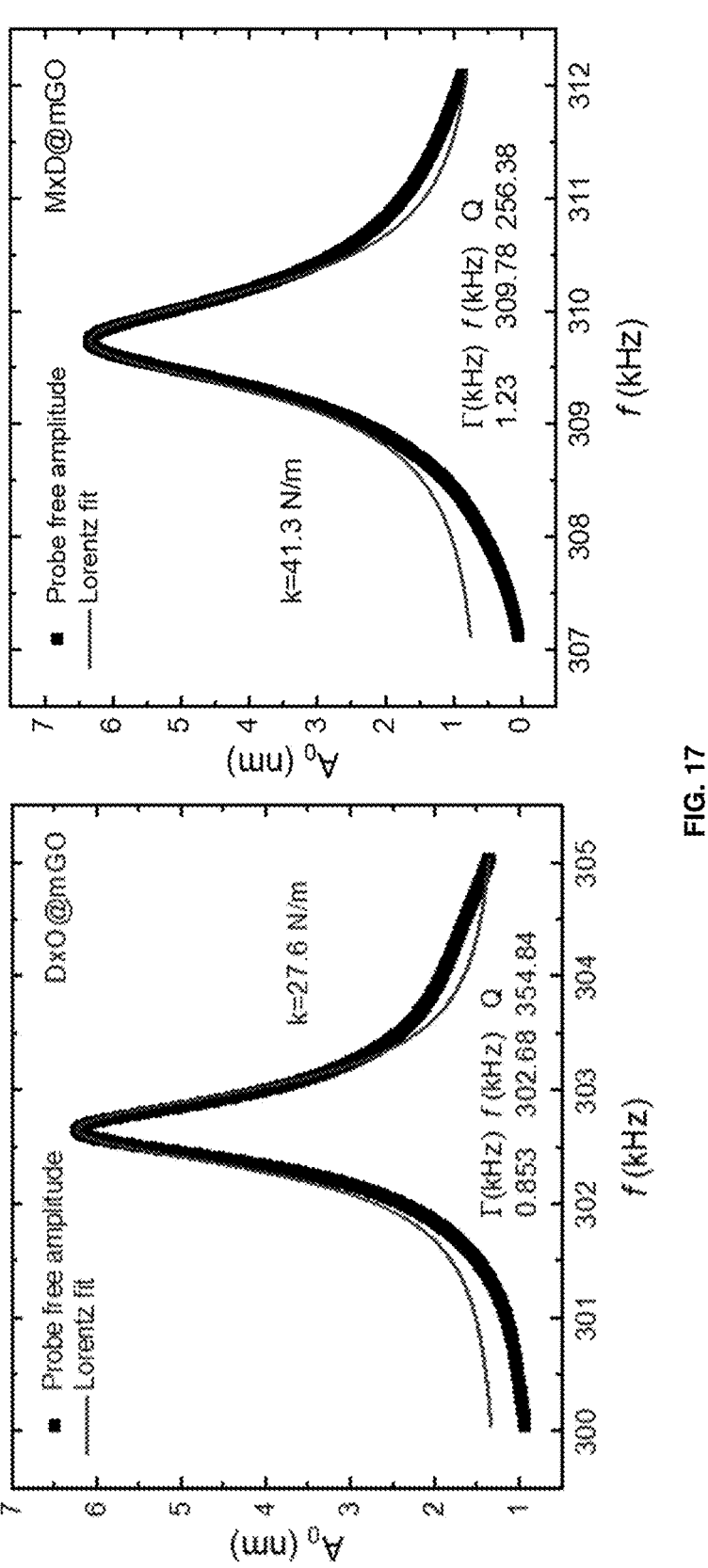
FIG. 17 depicts frequency response characteristics of tapping mode AFM cantilevers used in imaging mGO and DxO@mGO is shown in the left pane. The same for imaging MxD@mGO is shown on the right pane. The spring constants determined using Sader's model give values of k=27.6 N/m and 41.3 N/m, respectively, as shown. These values are employed in determining the surface energy and viscous coefficient calculations in FIG. 5.

See FIG. 17

Figure 20:
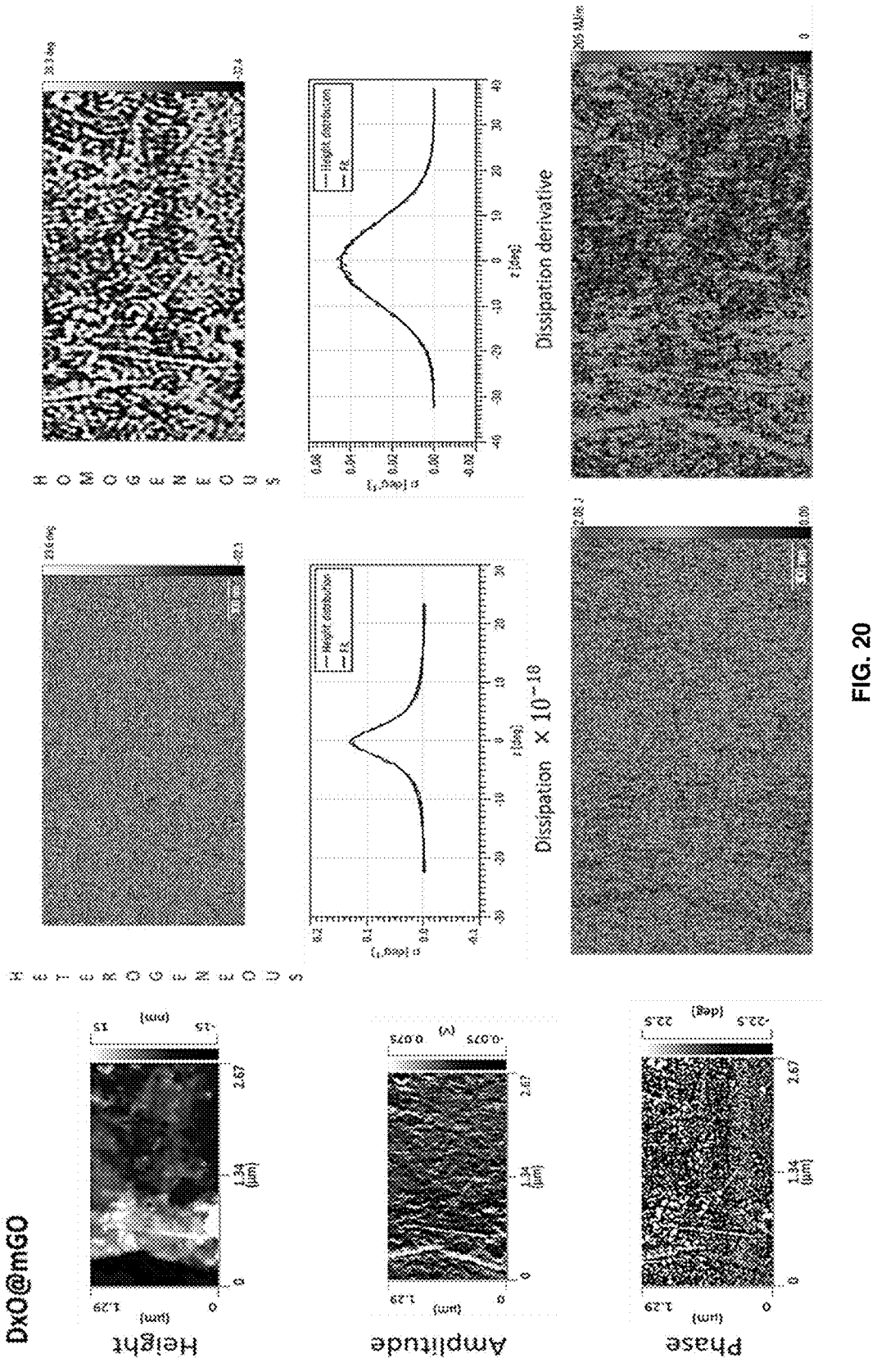
FIG. 20 depicts dissipation images of DxO@mGO drug clusters decoupled from the phase and amplitude images using ultra-light tapping AFM method. Axis units of height image is (μm, μm, nm), axis units of amplitude image is (μm, μm, V), axis units of phase image is (μm, μm, deg); and axis units of height distribution/fit graphs are p[deg$^{-1}$] vs z[deg].
Figure 21:
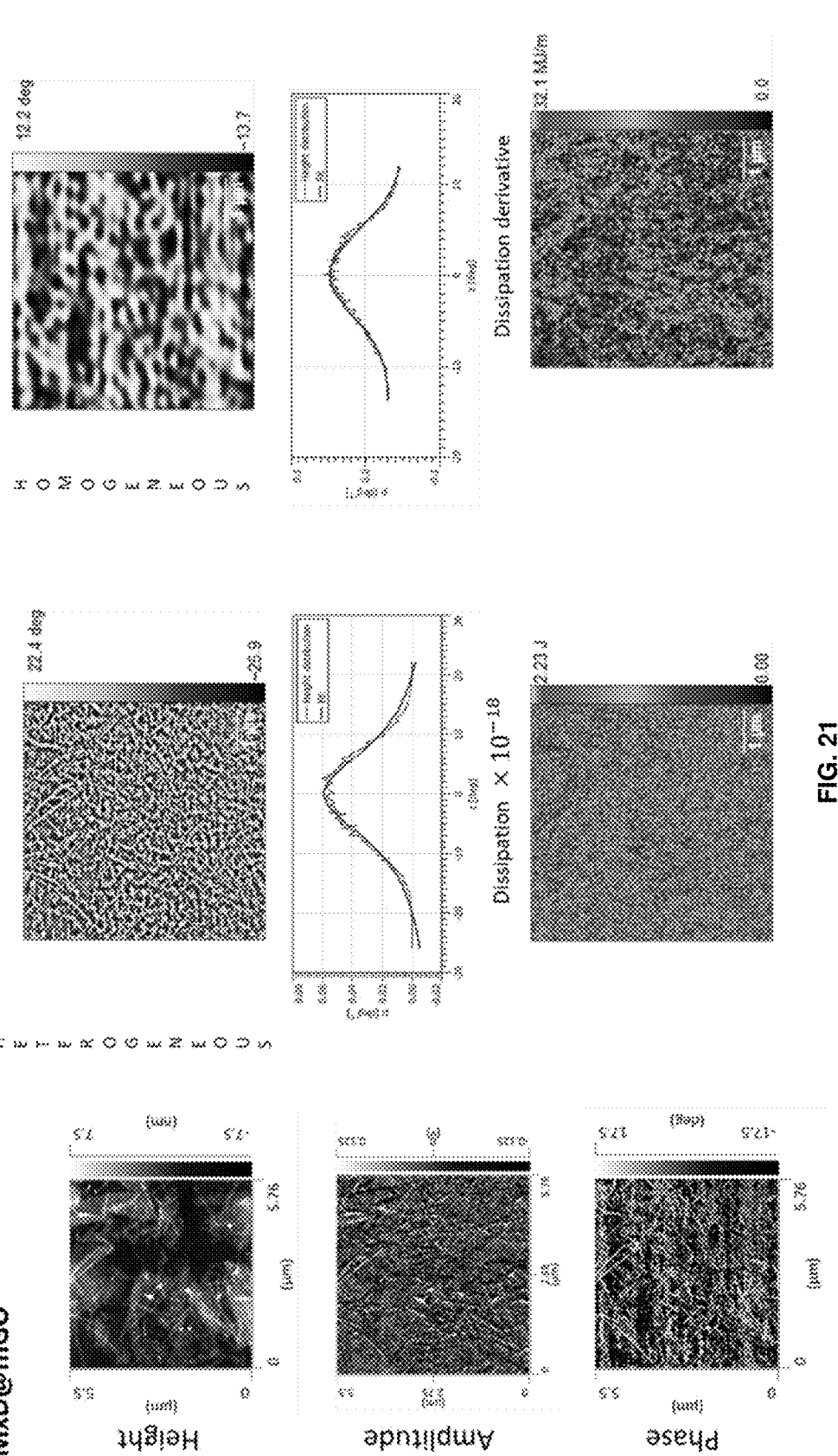
FIG. 21 depicts dissipation images of MxD@mGO drug clusters decoupled from the phase and amplitude images using ultra-light tapping AFM method. Axis units of height image is (μm, μm, nm), axis units of amplitude image is (μm, μm, V), axis units of phase image is (μm, μm, deg); and axis units of height distribution/fit graphs are p[deg$^{-1}$] vs z[deg].

Example 3A—Generation of Dissipation Images as an Output of the Ultra-Light Tapping Mode Fluctuational operation gives a two-stage energy distribution from the obtained phase-contrast. From the two-stage energy distributions, an algorithm can be implemented to decouple the heterogeneous (Lorentzian fit) and the homogeneous (Gaussian fit) phase components from the recorded phase-contrast images in the optimized ultra-light tapping regime (FIG. 20 to FIG. 24). These further enabled the generation of composite dissipation images as shown in FIG. 20 and FIG. 21. The intricate energy loss contour patterns (colour scale in units of energy $10^{-18}$ J) generated by decoupling the loss components allowed for the highlighting of contours of higher energy loss (viscous losses) over locations where energy loss was negligible (more elastic storage). The dissipation derivative image accentuated local heterogeneities (FIGS. 20 and 21). This addendum to the elastic and viscosity determination section is discussed in detail in the Working Examples 1-2.

Example 3B—Additional Data Obtained with Cancer Cells

Figure 22:
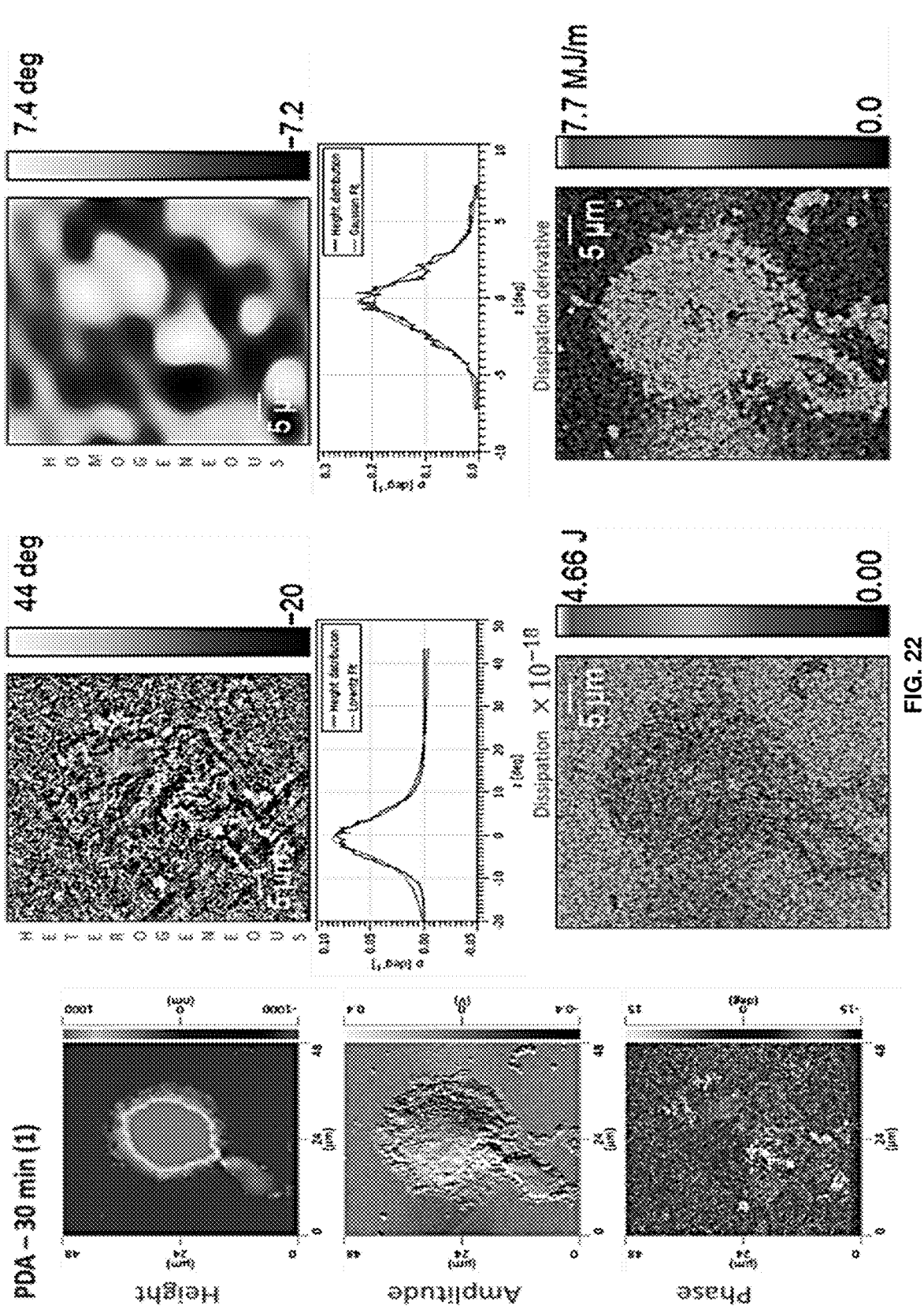
FIG. 22 depicts dissipation images of Cat-A cells at time 30 min decoupled from the phase and amplitude images using ultra-light tapping AFM method. Axis units of height image is (μm, μm, nm), axis units of amplitude image is (μm, μm, V), axis units of phase image is (μm, μm, deg); axis units of height distribution/Lorentz fit graph is p[deg$^{-1}$] vs z[deg], and axis units of height distribution/Gaussian fit graph is p[deg$^{-1}$] vs z[deg].
Figure 23:
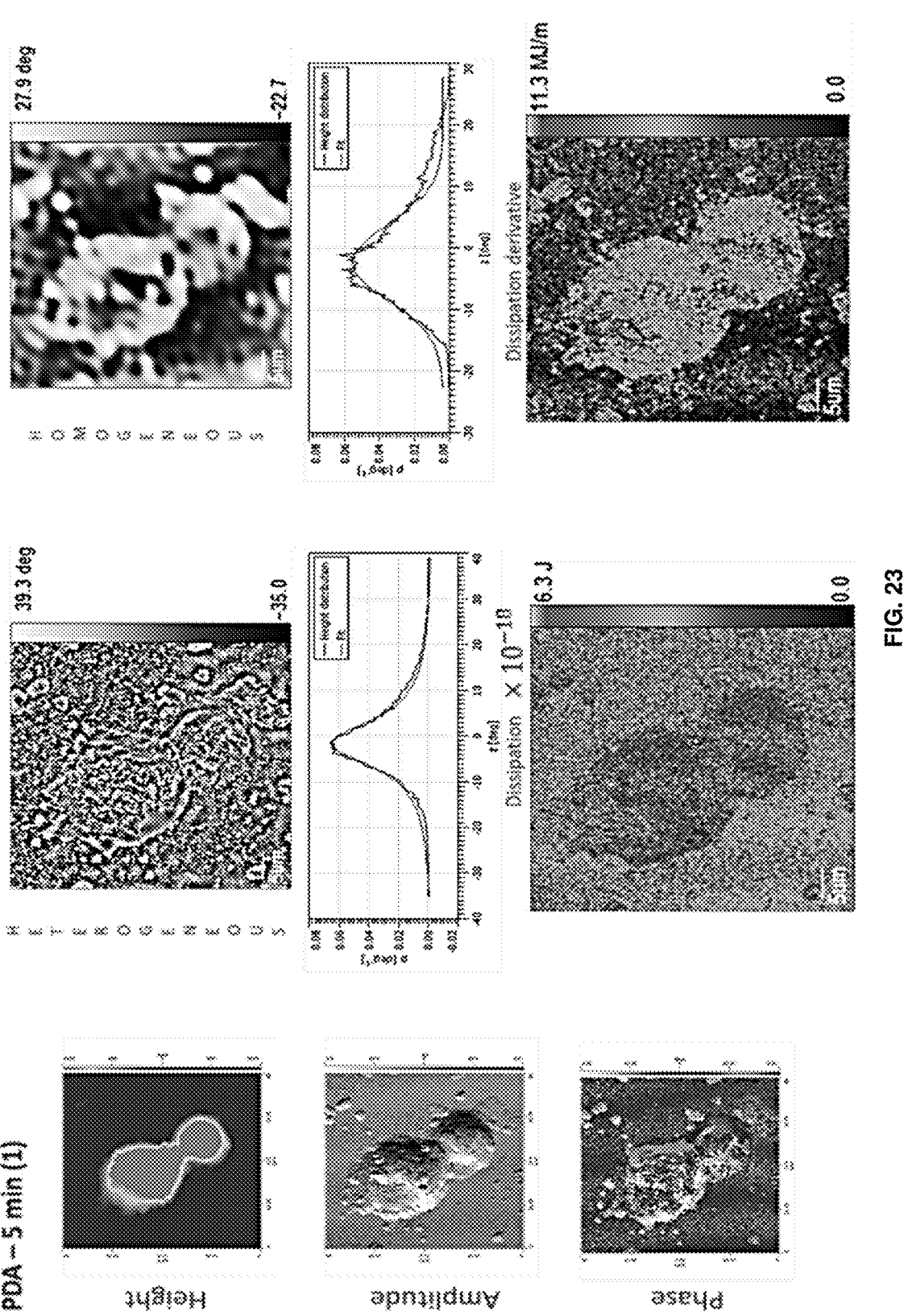
FIG. 23 depicts dissipation images of Cat-A cells at time 5 min decoupled from the phase and amplitude images using ultra-light tapping AFM method. Axis units of height image is (μm, μm, nm), axis units of amplitude image is (μm, μm, V), axis units of phase image is (μm, μm, deg); and axis units of height distribution/fit graphs are p[deg$^{-1}$] vs z[deg].
Figure 24:
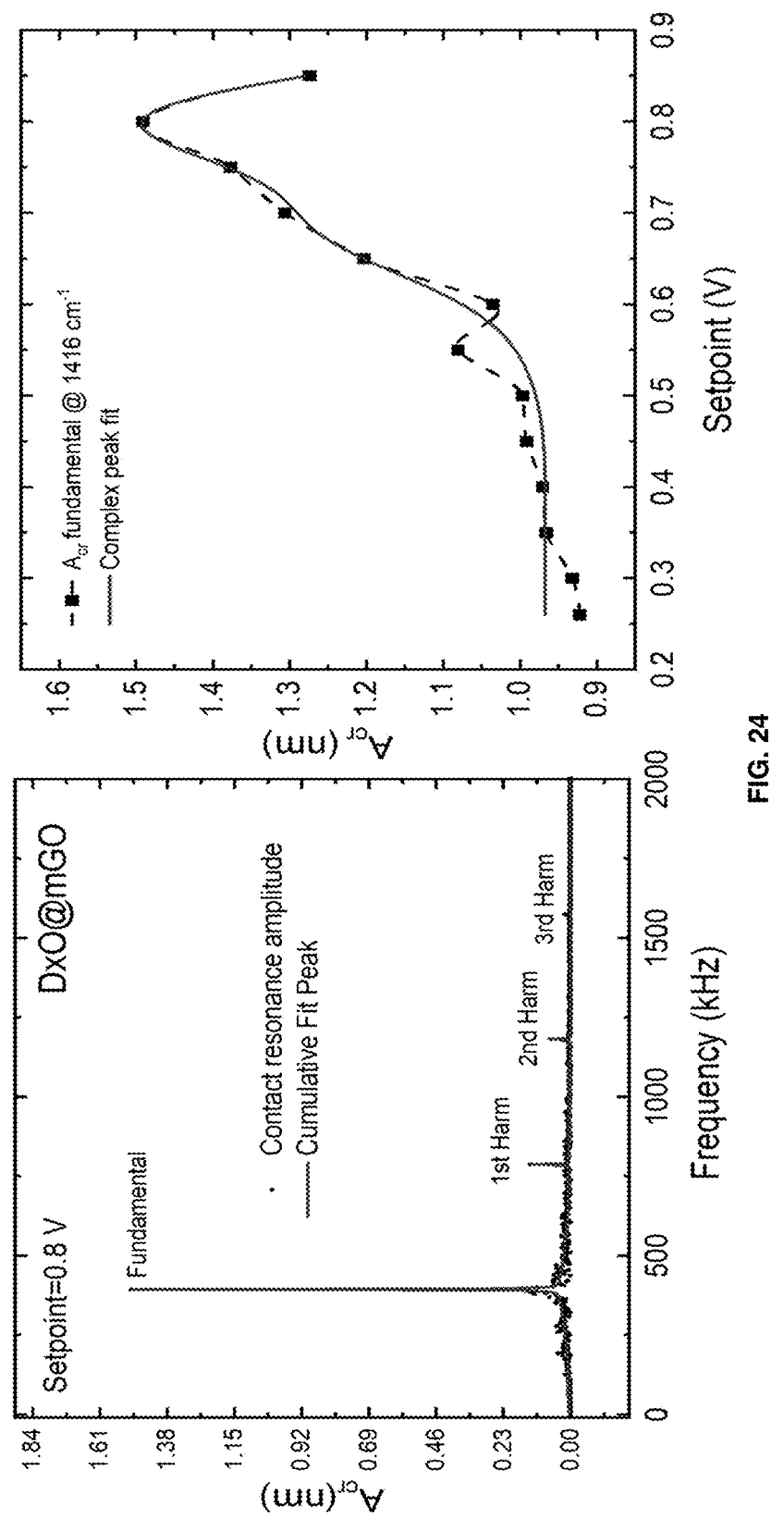
FIG. 24 depicts energy distribution in the higher harmonics and fundamental amplitude variance as a function of setpoint.

Similar detailed studies were run on differentiated CAT-A cancer cells from which were generated composite dissipation images of cancer cells on a soft bio-compatible substrate PDA. This intricate energy dissipation patterns showed a very interesting time evolution characteristic that may have biological relevance (FIG. 22 and FIG. 23). In both cases, the dissipation derivative highlighted the local heterogeneities that originated from the disparate dissipative pathways which the fluctuations appeared to decode from cantilever dynamics.

Example 4—Role of Higher Harmonics in the Dynamics

TM-AFM fundamentally being a mechanical Fourier transform tool, energy losses bleed onto the higher harmonics as well. This is even true in the case of IR enhanced contact resonance AFM imaging. Included herein is a representative response curve at 0.8V setpoint for DxO@mGO sample at 1416 cm$^{-1}$ wavenumber in FIG. 24. The right pane graph in FIG. 24 highlights the change in $A_{cr}$ (fundamental) as a function of setpoint. Similar curves for the higher harmonics and their relative amplitude can generate simultaneous multi-dimensional scan images highlighting further intricacies of energy loss pathways. The present experimental realization of ultra-light tapping mode AFM was restricted to monitoring the fundamental mode characteristics only.

The embodiments described herein are intended to be examples only. Alterations, modifications and variations can be effected to the particular embodiments by those of skill in the art. The scope of the claims should not be limited by the particular embodiments set forth herein, but should be construed in a manner consistent with the specification as a whole.

All publications, patents and patent applications mentioned in this Specification are herein incorporated by reference to the same extent as if each individual publication patent, or patent application was specifically and individually indicated to be incorporated by reference.

What is claimed is:

1. An atomic force microscopy tapping method for imaging a surface of a sample, the method comprising:

determining and setting a free amplitude ($A_0$) of a cantilever of an atomic force microscope (AFM);

determining and setting an operational tapping amplitude (A) of the cantilever based on the free amplitude ($A_0$);

initializing and setting a steady-state timescale ($\tau_c$) of the cantilever interacting with the surface of the sample to be imaged;

determining an average deformation amplitude ($\Delta a$) relative to the operational tapping amplitude (A), the average deformation amplitude ($\Delta a$) resulting from the cantilever tapping and deforming the surface of the sample;

optimizing the steady-state timescale ($\tau_c$) to correspond with a relaxation timescale ($\tau_{surf}$) of the surface following deformation by the cantilever by setting the condition of reaching the set operational tapping amplitude (A) when the average deformation amplitude ($\Delta a$)≠0;

scanning the surface of the sample by tapping the surface with the cantilever; and collecting imaging parameters for generating an image of the surface.

2. The method of claim 1, wherein determining and setting a free amplitude ($A_0$) comprises:

generating a deflection vs. displacement curve from the cantilever tip interacting with the surface of the sample; and determining a cantilever tip-surface distance ($z_c$) from the deflection vs. displacement curve.

3. The method of claim 1, wherein determining and setting an operational tapping amplitude (A) comprises:

enforcing a setpoint amplitude ($A_{sp}$) by setting a setpoint ratio (SPR) having a value between 0 to 1.

4. The method of claim 1, wherein initializing and setting a steady-state timescale ($\tau_c$) comprises:

setting initial proportional gain (P) and integral gain (I) values of a PI controller of the AFM.

5. The method of claim 1, wherein initializing and setting a steady-state timescale ($\tau_c$) comprises:

syncing the timescale ($\tau_c$) with stochastic resonance dynamics of the cantilever for measuring relaxation mechanisms of the surface following deformation by the cantilever.

6. The method of claim 1, wherein optimizing the steady-state timescale ($\tau_c$) comprises:

decreasing by about 1% an initial proportional gain (P) value of a PI controller of the AFM, and increasing by about 1% an initial integral gain (I) value of a PI controller of the AFM.

7. The method of claim 1, wherein collecting imaging parameters comprises:

collecting any one or more of the imaging parameter deflection, amplitude, phase, or frequency under optimized tapping conditions.

8. The method of claim 1, wherein the free amplitude ($A_0$) is set at about 10 nm or <10 nm.

9. The method of claim 1, wherein the operational tapping amplitude (A) is set at about 1 to about 3 nm; is set at and restricted to about 1 nm to 3 nm; or <3 nm.

10. The method of claim 1, wherein the surface of the sample comprises soft-matter that exhibits viscoelasticity.

11. The method of claim 1, wherein the surface of the sample comprises a drug, a drug cluster, a cancer cell, or a cluster of cancer cells to be imaged.

12. The method of claim 1, wherein the atomic force microscopy tapping method comprises an ultra-light tapping method.

13. The method of claim 1, wherein the atomic force microscopy tapping method is a transitional tapping method.

14. The method of claim 1 useful for:

imaging a surface of a sample by AFM-IR;

imaging a drug or a drug cluster, on a surface of a sample;

imaging biological soft-matter on a surface of a sample; and/or imaging cancer cells on a surface of a sample.

15. A computer program product comprising a computer readable memory storing computer executable instructions thereon that when executed by a computer to perform the method steps of claim 1.

16. A computer readable medium having recorded thereon statements and instructions for execution by a computerised atomic force microscope to carry out the method of claim 1.

17. A computer-implemented method of imaging a surface of a sample via atomic force microscopy, comprising:

performing the tapping method of claim 1 on a computerized atomic force microscope;

receiving data from the computerized atomic force microscope;

processing the data on a computer;

optimizing the tapping method on the basis of the processed data;

receiving imaging parameters from the computerized atomic force microscope performing the optimized tapping method;

processing the imaging parameters on a computer; and displaying images of the surface of the sample.

18. The method of claim 17, wherein processing the data on a computer comprises using at least one algorithm.

19. The method of claim 18, wherein the at least one algorithm comprises an optimizing algorithm for optimizing proportional gain (P) and integral gain (I) under a condition of $A \pm \Delta a \cong A_0 - A_{sp}$ and $\Delta a \neq 0$.

20. A system for imaging a surface of a sample via atomic force microscopy, comprising:

an atomic force microscope comprising a cantilever configured for tapping the surface of the sample;

a module configured for receiving data from the cantilever when tapping the surface of the sample;

a processor configured for applying an algorithm to the data received from the cantilever and instructing the atomic force microscope to perform the tapping method steps of claim 1;

a module configured for receiving imaging parameters acquired from the atomic force microscope performing the tapping method;

a processor configured for applying an algorithm to the imaging parameters for generating images of the surface of the sample; and a display configured to present the images of the surface of the sample.

* * * * *